(12) United States Patent
Takahashi et al.

(10) Patent No.: US 10,701,395 B2
(45) Date of Patent: Jun. 30, 2020

(54) IMAGE PROCESSING DEVICE AND METHOD

(71) Applicant: SONY CORPORATION, Tokyo (JP)

(72) Inventors: Yoshitomo Takahashi, Kanagawa (JP); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 14/649,692

(22) PCT Filed: Dec. 9, 2013

(86) PCT No.: PCT/JP2013/082936
§ 371 (c)(1),
(2) Date: Jun. 4, 2015

(87) PCT Pub. No.: WO2014/097912
PCT Pub. Date: Jun. 26, 2014

(65) Prior Publication Data
US 2015/0319460 A1    Nov. 5, 2015

(30) Foreign Application Priority Data

Dec. 21, 2012  (JP) .................................. 2012-279847

(51) Int. Cl.
*H04N 19/597* (2014.01)
*H04N 19/31* (2014.01)
(Continued)

(52) U.S. Cl.
CPC .......... *H04N 19/597* (2014.11); *H04N 19/30* (2014.11); *H04N 19/31* (2014.11); *H04N 19/50* (2014.11); *H04N 19/61* (2014.11)

(58) Field of Classification Search
USPC ....................................................... 375/240
See application file for complete search history.

(56) References Cited

U.S. PATENT DOCUMENTS

2011/0096835 A1\* 4/2011 Lim ..................... H04N 19/597
375/240.12
2012/0314027 A1\* 12/2012 Tian ....................... H04N 7/181
348/43

(Continued)

FOREIGN PATENT DOCUMENTS

JP        2009-532934       9/2009
WO    WO2012/169403 A1    12/2012

OTHER PUBLICATIONS

Kang et al., "Description of scalable video coding technology proposal by ETRI and Kwangwoon Univ. (JCTVC-K0037)", Oct. 2012, JCT-VC, JCTVC-K0037.\*

(Continued)

*Primary Examiner* — Frederick D Bailey
*Assistant Examiner* — Amir Shahnami
(74) *Attorney, Agent, or Firm* — Paratus Law Group, PLLC

(57) ABSTRACT

An image processing device and an image processing method capable of improving the coding efficiency in multi-viewpoint coding, the image processing device being configured to generate a temporal list (RefPicListTemp0[rIdx]) of L0 in order of short-term (before) reference images of indexes 0 and 1, inter-view reference images of indexes 0 to 3, short-term (after) reference images of indexes 0 and 1, and a long-term reference image of index 0. In such a case, according to num_ref_idx_l0_active_minus1=4, a reference list of L0 is generated in order of the short-term (before) reference image of index 0 and the inter-view reference images of indexes 0 to 3.

18 Claims, 28 Drawing Sheets

(51) Int. Cl.
*H04N 19/61* (2014.01)
*H04N 19/50* (2014.01)
*H04N 19/30* (2014.01)

(56) References Cited

U.S. PATENT DOCUMENTS

| | | | | |
|---|---|---|---|---|
| 2013/0114670 A1* | 5/2013 | Chen | ............... | H04N 19/00139 375/240.02 |
| 2013/0114710 A1* | 5/2013 | Park | ................ | H04N 19/00569 375/240.12 |
| 2013/0155184 A1* | 6/2013 | Chen | .................... | H04N 19/597 348/43 |
| 2013/0208792 A1* | 8/2013 | He | ................... | H04N 19/00569 375/240.12 |

OTHER PUBLICATIONS

Zhang et al., "AHG5:MV-HEVC software for HTM", Oct. 2012, ITU Joint Collaborative Team on 3D Video Coding Extension Development of ITU-T SG 16 WP 3 and ISO/IEC JTC 1/SC 29/WG 2nd Meeting: Shanghai, CN.*
Gerhard Tech, et al., MV-HEVC Draft Text 2, Joint Collaborative Team on 3D Video Coding Extension Development of ITU-T SG16 WP3 and ISO/IEC JTC1/SC29/WG11, Oct. 13-19, 2012, pp. i-18, $2^{nd}$ Meeting: Shanghai, CN.
Li Zhang, et al., AHG5: MV-HEVC software for HTM, Joint Collaborative Team on 3D Video Coding Extension Development of ITU-T SG16 WP3 and ISO/IEC JTC1/SC29/WG11, Oct. 13-19, 2012, pp. 1-5, $2^{nd}$ Meeting: Shanghai, CN.
Jung Won Kang, et al., Description of scalable video coding technology proposal by ETRI and Kwangwoon Univ. (JCTVC-K0037), Oct. 2012, pp. 1-18.
Benjamin Bross, et al., High efficiency video coding (HEVC) text specification draft 8, Joint Collaborative Team on Video Coding (JCT-VC) of ITU-T SG16 WP3 and ISO/IEC JTC1/SC29/WG11, Jul. 11-20, 2012, pp. cover and 96-97, $10^{th}$ Meeting: Stockholm, SE.
Gerhard Tech, et al., 3D-HEVC Test Model 1, Joint Collaborative Team on 3D Video Coding Extension Development of ITU-T SG16 WP3 and ISO/IEC JTC1/SC29/WG11, Jul. 16-20, 2012, pp. 1-83, $1^{st}$ Meeting: Stockholm, SE.
Mar. 28, 2016, Singapore Office Action related for SG Application No. 11201504511X.
Vetro, et al., "Overview of the Stereo and Multiview Video Coding Extensions of the H.264/MPEG-4 AVC Standard", Jan. 2011, pp. 1-15, Mitsubishi Electric Research Laboratories.
May 24, 2016, European Search Report for related EP Application No. 13865828.1.
Nakagami, et al., "AHG9: On initialization process of reference picture lists for HEVC extensions", Joint Collaborative Team on Video Coding (JCT-VC) of ITU-T SG16 WP3 and ISO/IEC JTC1/SC29/WG11, Apr. 18-26, 2013, pp. 1-11, $13^{th}$ Meeting: Incheon, KR.
Sjoberg, et al., "Overview of HEVC High-Level Syntax and Reference Picture Management", IEEE Transactions on Circuits and Systems for Video Technology, Dec. 1, 2012, pp. 1858-1870, vol. 22 No. 12.
Jul. 13, 2017, JP communication issued for related JP application No. 2014-553078.
Aug. 1, 2017, CN communication issued for related CN application No. 201380065352.9.
Jan. 18, 2018, Singaporean Search Report issued for related SG application No. 10201606210V.
Mar. 2, 2020, Korean Office Action issued for related KR Application No. 10-2015-7014823.
Tech et al., MV-HEVC Working Draft 1, Joint Collaborative Team on 3D Video Coding Extension Development of ITU-T SG 16 WP 3 and ISO/IEC JTC 1/SC 29/WG 11, Jul. 16-20, 2012, pp. 1-16, 1st Meeting: Stockholm, SE.

* cited by examiner

FIG. 7

| | | CONVENTIONAL TECHNOLOGY 1 | CONVENTIONAL TECHNOLOGY 2 | PRESENT TECHNOLOGY 1 |
|---|---|---|---|---|
| PRESENT TECHNOLOGY 1 | ADVANTAGE | · CODING EFFICIENCY CAN BE IMPROVED FOR SEQUENCE HAVING HIGH INTER-VIEW CORRELATION (GENERAL CASE).<br>· WHEN NUMBER OF STbC AND STaC IS SMALL, NUMBER OF UNIQUE Pictures CAN BE INCREASED IN WHOLE REFERENCE LIST L0/L1. | · ADDITIONAL SYNTAX DOES NOT NEED TO BE TRANSMITTED.<br>· PROCESSING AMOUNT IS SMALL OWING TO NO REARRANGEMENT OF TEMPORAL LIST. | |
| PRESENT TECHNOLOGY 2 | ADVANTAGE | · WHEN TEMPORAL CORRELATION AND INTER-VIEW CORRELATION ARE ALTERNATELY ALIGNED, CODING EFFICIENCY CAN BE IMPROVED.<br>· INTER-VIEW CAN BE ARRANGED AT SECOND POSITION FROM START OF REFERENCE LIST ALSO IN WORST CASE. | · ADDITIONAL SYNTAX DOES NOT NEED TO BE TRANSMITTED.<br>· WHEN TEMPORAL CORRELATION AND INTER-VIEW CORRELATION ARE ALTERNATELY ALIGNED, CODING EFFICIENCY CAN BE IMPROVED. | · WHEN TEMPORAL CORRELATION AND INTER-VIEW CORRELATION ARE ALTERNATELY ALIGNED, CODING EFFICIENCY CAN BE IMPROVED.<br>· INTER-VIEW CAN BE ARRANGED AT SECOND POSITION FROM START OF REFERENCE LIST ALSO IN WORST CASE. |

FIG. 9

```
The following applies:
- for( i = 0; i < NumIvCurr; i++ )
  RefPicSetIvCurr[i] = "inter-view reference picture with layer identifier equal to LayerIdInterView[i]"

- rIdx = 0
  while( rIdx < NumRpsCurrTempList0 ) {
    for( i = 0; i < NumPocStCurrBefore && rIdx < NumRpsCurrTempList0; rIdx++, i++ )
      RefPicListTemp0[rIdx] = RefPicSetStCurrBefore[i]
    for( i = 0; i < NumPocStCurrAfter && rIdx < NumRpsCurrTempList0; rIdx++, i++ )            (F-6)
      RefPicListTemp0[rIdx] = RefPicSetStCurrAfter[i]
    for( i = 0; i < NumPocLtCurr && rIdx < NumRpsCurrTempList0; rIdx++, i++ )
      RefPicListTemp0[rIdx] = RefPicSetLtCurr[i]
    for( i = 0; i < NumIvCurr && rIdx < NumRpsCurrTempList0; rIdx++, i++ )
      RefPicListTemp0[rIdx] = RefPicSetIvCurr[i]
  }

- rIdx = 0
  while( rIdx < NumRpsCurrTempList1 ) {
    for( i = 0; i < NumPocStCurrAfter && rIdx < NumRpsCurrTempList1; rIdx++, i++ )
      RefPicListTemp1[rIdx] = RefPicSetStCurrAfter[i]
    for( i = 0; i < NumPocStCurrBefore && rIdx < NumRpsCurrTempList1; rIdx++, i++ )           (F-8)
      RefPicListTemp1[rIdx] = RefPicSetStCurrBefore[i]
    for( i = 0; i < NumPocLtCurr && rIdx < NumRpsCurrTempList1; rIdx++, i++ )
      RefPicListTemp1[rIdx] = RefPicSetLtCurr[i]
    for( i = 0; i < NumIvCurr && rIdx < NumRpsCurrTempList1; rIdx++, i++ )
      RefPicListTemp1[rIdx] = RefPicSetIvCurr[NumIvCurr-i]
  }
```

IMAGE PROCESSING DEVICE AND METHOD

CROSS REFERENCE TO PRIOR APPLICATION

This application is a National Stage Patent Application of PCT International Patent Application No. PCT/JP2013/082936 (filed on Dec. 9, 2013) under 35 U.S.C. § 371, which claims priority to Japanese Patent Application No. 2012-279847 (filed on Dec. 21, 2012), which are all hereby incorporated by reference in their entirety.

TECHNICAL FIELD

The present disclosure relates to an image processing device and an image processing method, and more particularly, to an image processing device and an image processing method capable of improving the coding efficiency in multi-viewpoint coding.

BACKGROUND ART

In recent years, image information is handled as digital data, and, for the purpose of transmission and accumulation of the information having high-efficiency at that time, devices are widely used which compress and code images by employing a coding system compressing image information through an orthogonal transform such as a discrete cosine transform and motion compression by using the redundancy that is unique to the image information. As examples of such a coding system, there are MPEG (Moving Picture Experts Group), H.264, MPEG-4 Part 10 (Advanced Video Coding, hereinafter, referred to as AVC), and the like.

Currently, for the purpose of further improving the coding efficiency to be higher than that of H.264/AVC, standardization of a coding system called high efficiency video coding (HEVC) has been progressed by a joint collaboration team—video coding (JCTVC) that is a joint standardization organization of the ITU-T and the ISO/IEC. In addition, as an extension thereof, standardization of coding of a multi-viewpoint image has been progressed in parallel therewith, and as a draft for coding a multi-viewpoint image, Non-Patent Document 1 has been issued.

Meanwhile, a reference list that is a list in which candidates for a reference image used for decoding a B picture are aligned in a preferential order is sequentially generated from the start of reference images aligned in a preferential order in a temporal list that is a temporary list.

In Non-Patent Document 1, the temporal list is generated such that, after reference images disposed in the time direction, reference images disposed in the view direction are arranged. Thus, in order to raise the preferential order of the reference images disposed in the view direction within the temporal list, unless a reference list command is used, it is difficult to arrange the reference images disposed in the view direction in the reference list, and accordingly, it is difficult to refer to the reference images disposed in the view direction.

Thus, in Non-Patent Document 2, it is proposed to transmit information designating a position at which a reference image disposed in the view direction is inserted among a plurality of reference images disposed in the time direction using a slice header when a temporal list is generated. Accordingly, in consideration of a view-direction correlation, a reference image disposed in the view direction can be inserted at a preferable position in the temporal list.

CITATION LIST

Non-Patent Document

Non-Patent Document 1: Gerhard Tech, Krzysztof Wegner, Ying Chen, Miska Hannuksela, "MV-HEVC Draft Text2", JCT3V-B1004, 2012, Nov. 7
Non-Patent Document 2: Li Zhang, Ying Chen, Jewon Kang, "AHG5: MV-Hevc software for HTM", JCT3V-B0046, 2012, Oct. 7

SUMMARY OF THE INVENTION

Problems to be Solved by the Invention

However, in the technology disclosed in Non-Patent Document 2, also when it is not necessary to change the insertion position of the reference image disposed in the view direction in the temporal list, the slice header needs to be transmitted, and there is concern that the coding efficiency may decrease.

The present disclosure is in view of such a situation and is capable of improving the coding efficiency in hierarchical coding or multi-viewpoint coding.

Solutions to Problems

According to an aspect of the present disclosure, there is provided an image processing device including: a decoding unit that generates an image by decoding a bit stream; a reference list setting unit that sets a reference list being referred to when the image generated by the decoding unit is predicted by inserting a reference image that can be referred to in a layer direction between a plurality of reference images that can be referred to in a time direction; and a prediction unit that predicts the image generated by the decoding unit by referring to the reference list set by the reference list setting unit.

The above-described reference list setting unit may set the reference list by inserting the reference image that can be referred to in the layer direction between a reference image located before the image in time and a reference image located after the image in time among the plurality of reference images that can be referred to in the time direction.

The above-described reference list setting unit may set the reference list by arranging images in a direction L0 in order of reference images located before the image in time, the reference image that can be referred to in the layer direction, and reference images located after the image in time.

The above-described reference list setting unit may set the reference list by arranging images in a direction L1 in order of reference images located after the image in time, the reference image that can be referred to in the layer direction, and reference images located before the image in time.

The above-described reference list setting unit may set the reference list by alternately arranging the reference image that can be referred to in the time direction and the reference image that can be referred to in the layer direction.

The above-described reference list setting unit may set the reference list by alternately arranging an element of a list of the reference images that can be referred to in the time direction set in order of the reference images located before the image in time and the reference images located after the image in time and an element of a list of the reference images that can be referred to in the layer direction, which is configured by the reference images that can be referred to in the layer direction, in a direction L0.

The above-described reference list setting unit may set the reference list by alternately arranging an element of a list of the reference images that can be referred to in the time direction set in order of the reference images located after the image in time and the reference images located before the image in time and an element of a list of the reference images that can be referred to in the layer direction, which is configured by the reference images that can be referred to in the layer direction, in a direction L1.

The above-described reference list setting unit may set the reference list by inserting the reference images that can be referred to in the layer direction in a direction L1 with order of the reference image that can be referred to in the layer direction being opposite to that of the case of a direction L0.

The above-described reference list setting unit may include: a temporal list setting unit that sets a temporal list that is a temporary list used for setting the reference list by inserting the reference image that can be referred to in the layer direction between the plurality of reference images that can be referred to in the time direction; and a reference image list setting unit that sets the reference list based on the temporal list set by the temporal list setting unit.

According to an aspect of the present disclosure, there is provided an image processing method implemented in an image processing device. The image processing method includes: generating an image by decoding a bit stream; setting a reference list being referred to when the generated image is predicted by inserting a reference image that can be referred to in a layer direction between a plurality of reference images that can be referred to in a time direction; and predicting the generated image by referring to the set reference list.

According to another aspect of the present disclosure, there is provided an image processing device including: a reference list setting unit that sets a reference list being referred to when an image is predicted by inserting a reference image that can be referred to in a layer direction between a plurality of reference images that can be referred to in a time direction; a prediction unit that predicts the image by referring to the reference list set by the reference list setting unit; and an encoding unit that generates a bit stream by performing coding using the image predicted by the prediction unit.

The above-described reference list setting unit may set the reference list by inserting the reference image that can be referred to in the layer direction between a reference image located before the image in time and a reference image located after the image in time among the plurality of reference images that can be referred to in the time direction.

The above-described reference list setting unit may set the reference list by arranging images in a direction L0 in order of reference images located before the image in time, the reference image that can be referred to in the layer direction, and reference images located after the image in time.

The above-described reference list setting unit may set the reference list by arranging images in a direction L1 in order of reference images located after the image in time, the reference image that can be referred to in the layer direction, and reference images located before the image in time.

The above-described reference list setting unit may set the reference list by alternately arranging the reference image that can be referred to in the time direction and the reference image that can be referred to in the layer direction.

The above-described reference list setting unit may set the reference list by alternately arranging an element of a list of the reference images that can be referred to in the time direction set in order of the reference images located before the image in time and the reference images located after the image in time and an element of a list of the reference images that can be referred to in the layer direction, which is configured by the reference images that can be referred to in the layer direction, in a direction L0.

The above-described reference list setting unit may set the reference list by alternately arranging an element of a list of the reference images that can be referred to in the time direction set in order of the reference images located after the image in time and the reference images located before the image in time and an element of a list of the reference images that can be referred to in the layer direction, which is configured by the reference images that can be referred to in the layer direction, in a direction L1.

The above-described reference list setting unit may set the reference list by inserting the reference images that can be referred to in the layer direction in a direction L1 with order of the reference image that can be referred to in the layer direction being opposite to that of the case of a direction L0.

The above-described reference list setting unit may include: a temporal list setting unit that sets a temporal list that is a temporary list used for setting the reference list by inserting the reference image that can be referred to in the layer direction between the plurality of reference images that can be referred to in the time direction; and a reference image list setting unit that sets the reference list based on the temporal list set by the temporal list setting unit.

According to another aspect of the present disclosure, there is provided an image processing method implemented in an image processing device. The image processing method includes: setting a reference list being referred to when an image is predicted by inserting a reference image that can be referred to in a layer direction between a plurality of reference images that can be referred to in a time direction; predicting the image by referring to the set reference list; and generating a bit stream by performing coding using the predicted image.

According to an aspect of the present disclosure, an image is generated by decoding a bit stream, and a reference list being referred to when the image generated is predicted is set by inserting a reference image that can be referred to in a layer direction between a plurality of reference images that can be referred to in a time direction. Then, the generated image is predicted by referring to the set reference list.

According to another aspect of the present disclosure, a reference list being referred to when an image is predicted is set by inserting a reference image that can be referred to in a layer direction between a plurality of reference images that can be referred to in a time direction. Then, the image is predicted by referring to the set reference list, and a bit stream is generated by performing coding using the predicted image.

Here, the above-described image processing device may be an independent device or an internal block that configures one image encoding device or image decoding device.

Effects of the Invention

According to an aspect of the present disclosure, an image can be decoded. Particularly, the coding efficiency can be improved.

According to another aspect of the present disclosure, an image can be coded. Particularly, the coding efficiency can be improved.

BRIEF DESCRIPTION OF DRAWINGS

FIG. 7 is a diagram that illustrates a comparison between the present technology and a conventional technology.

FIG. 9 is a diagram that illustrates a method of changing the arrangement order of inter-view images according to the present technology.

MODE FOR CARRYING OUT THE INVENTION

Figure 1:
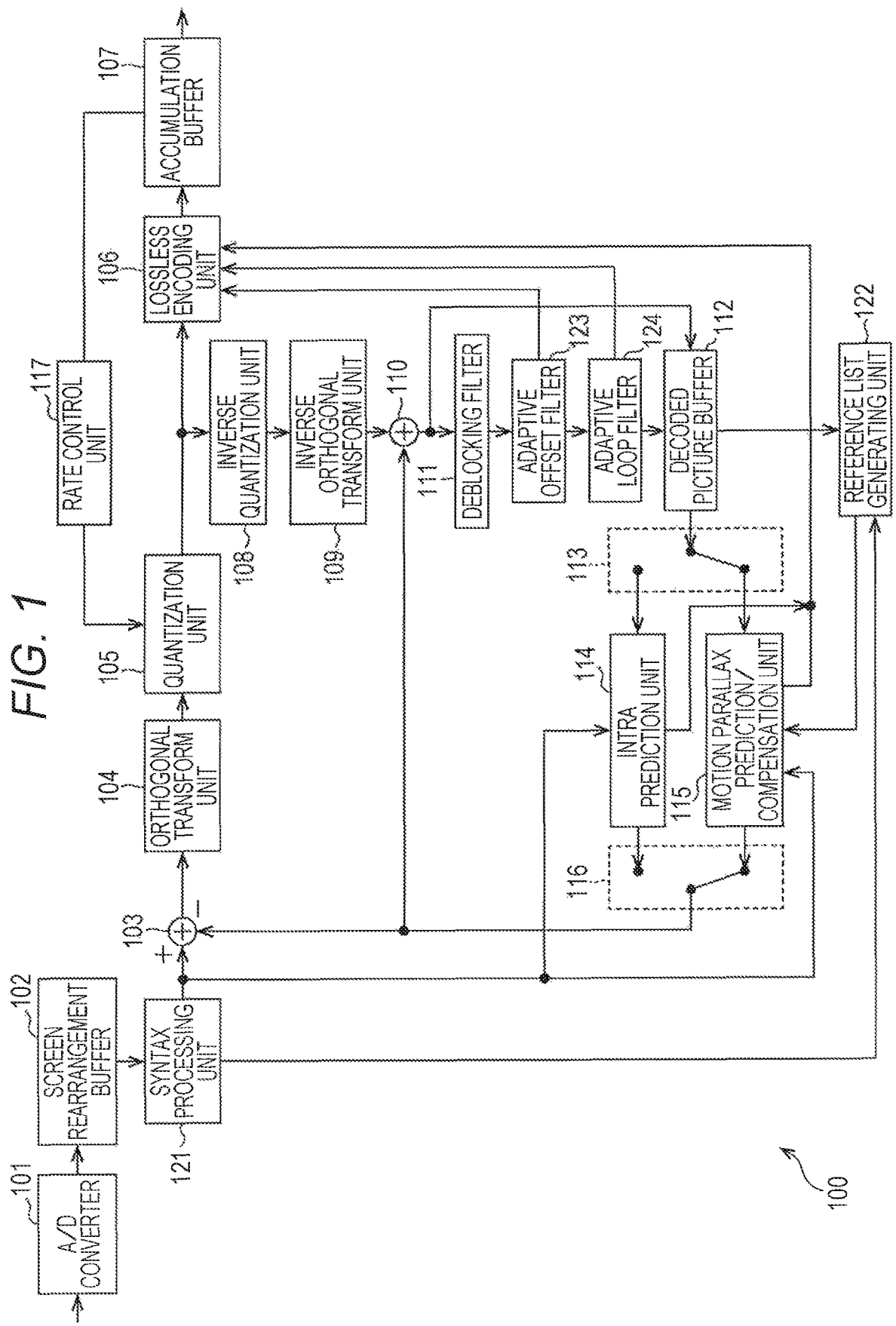
FIG. 1 is a block diagram that illustrates an example of the main configuration of an image encoding device.

Hereinafter, embodiments for executing the present disclosure (hereinafter, referred to as embodiments) will be described. The description will be presented in the following order.

1. First Embodiment (Image Encoding Device)
2. Second Embodiment (Image Decoding Device)
3. Third Embodiment (Image Encoding Device and Image Decoding Device of an AVC System)
4. Fourth Embodiment (Computer)
5. Application Example
6. Fifth Embodiment (Set/Unit/Module/Processor)

First Embodiment

[Description of Hierarchical Coding]

The image coding systems such as MPEG2 and AVC described until now have a scalability function. Scalable coding (hierarchical coding) is a system in which an image is configured by multiple layers (hierarchizing), and coding is performed for each layer.

In hierarchizing an image, one image is divided into a plurality of images (layers) by referring to a predetermined parameter. Basically, each layer is configured by differential data so as to reduce the redundancy. For example, in a case where one image is hierarchized into two layers including a base layer and an enhancement layer, an image having a quality lower than the original image is acquired by using only the data of the base layer, and the original image (in other words, a high-quality image) is acquired by composing the data of the base layer and the data of the enhancement layer.

By hierarchizing the image in this way, images of various qualities can be easily acquired according to the situation. For example, as in a case where, to a terminal having a low processing capability such as a mobile phone, image compression information of only a base layer is transmitted, and a moving image having low spatial/temporal resolution or a low image quality is reproduced, and, to a terminal having a high processing capability such as a television set or a personal computer, image compression information of an enhancement layer in addition to the base layer is transmitted, and a moving image having high spatial/temporal resolution or a high image quality is reproduced, the image compression information according to the capability of the terminal or the network can be transmitted from a server without performing trans-code processing.

As a parameter enabling such scalability, for example, there is spatial resolution (spatial scalability). In the case of this spatial scalability, the resolution is different for each layer. In other words, each picture is hierarchized into two hierarchies of the base layer having spatial resolution lower than the original image and the enhancement layer that can be used for acquiring the original image (original spatial resolution) by being composed with the image of the base layer. It is apparent that the number of hierarchies is an example, and the picture can be hierarchized into an arbitrary number of hierarchies.

As another parameter having such scalability, for example, there is temporal resolution (temporal scalability). In the case of this temporal scalability, the frame rate is different for each layer. In other words, in this case, since an image is hierarchized into layers having mutually-different frame rates, by adding a layer of a high frame rate to a layer of a low frame rate, a moving image having a higher frame rate can be acquired, and, by adding all the layers, the original moving image (the original frame rate) can be acquired. Here, the number of hierarchies is an example, and the image can be hierarchized for an arbitrary number of hierarchies.

In addition, as another parameter enabling such scalability, for example, a signal to noise ratio (SNR) may be applied (SNR scalability). In the case of this SNR scalability, the SN ratio is different for each layer. In other words, each picture is hierarchized into two hierarchies including a base layer having an SNR lower than the original image and an enhancement layer capable of acquiring the original image (original SNR) by being composed with an image of the base layer. In other words, in the base layer image compression information, information relating to an image having a low PSNR is transmitted, and, by adding enhancement layer image compression information thereto, an image having a high PSNR can be rebuilt. It is apparent that the number of hierarchies is an example, and the image can be hierarchized for an arbitrary number of hierarchies.

It is apparent that a parameter having the scalability may be other than those of the examples described above. For example, there is bit-depth scalability in which a base layer is configured by an 8-bit image, and, by adding an enhancement layer thereto, an image of 10 bits is acquired.

In addition, there is chroma scalability in which a base layer is configured by a component image of the 4:2:0 format, and a component image of the 4:2:2 format is acquired by adding an enhancement layer thereto.

Furthermore, as a parameter enabling the scalability, there is a multiview. In this case, each picture is hierarchized into layers of mutually-different views (viewpoints).

The layer described in this embodiment includes the spatial, the temporal SNR, the bit depth, the color, the view, and the like of the scalability coding described above.

The term "layer" used in this specification includes each layer of the scalable (hierarchical) coding described above and each view at the time of considering multiviews of the multi-viewpoints.

Hereinafter, while the view will be described as an example, by substituting the view with another layer, the present technology can be similarly applied to the other layers described above.

[Configuration Example of Image Encoding Device]

FIG. 1 illustrates of the configuration of an image encoding device according to an embodiment as an image processing device to which the present disclosure is applied.

An image encoding device 100 illustrated in FIG. 1 codes image data by using a prediction process. Here, as the coding system, for example, the HEVC system or the like is used. In other words, the image encoding device 100 performs the process in units of CUs (coding units).

In the example illustrated in FIG. 1, the image encoding device 100 includes: an A/D (analog/digital) converter 101; a screen rearrangement buffer 102; a calculation unit 103; an orthogonal transform unit 104; a quantization unit 105; a lossless encoding unit 106; and an accumulation buffer 107. In addition, the image encoding device 100 includes: an inverse quantization unit 108; an inverse orthogonal transform unit 109; a calculation unit 110; a deblocking filter 111; a decoded picture buffer 112; a selection unit 113; an intra prediction unit 114; a motion parallax prediction/compensation unit 115; a selection unit 116; and a rate control unit 117.

Furthermore, the image encoding device 100 includes: a syntax processing unit 121; a reference list generating unit 122; an adaptable offset filter 123; and an adaptive loop filter 124.

The A/D converter 101 performs A/D conversion of input image data and outputs resultant image data to the screen rearrangement buffer 102 so as to be stored therein.

The screen rearrangement buffer 102 rearranges stored images, which are in display order of frames, in order of frames for coding in accordance with a group of picture (GOP). The screen rearrangement buffer 102 supplies the image of which the order of frames has been rearranged to the syntax processing unit 121.

The syntax processing unit 121 sequentially checks the data of an image read from the screen rearrangement buffer 102 and inserts header information, which is supplied from a previous stage not illustrated in the figure, into the data of the image. The header information, for example, includes a video parameter set (VPS), a sequence parameter set (SPS), a picture parameter set (PPS), and the like. In addition, the syntax processing unit 121 adds a slice header (SH) to the start of a slice.

The syntax processing unit 121 supplies the image into which the header information and the like are inserted to the calculation unit 103, the intra prediction unit 114, and the motion parallax prediction/compensation unit 115. In addition, the syntax processing unit 121 supplies each header information and information such as the slice header to the reference list generating unit 122.

The calculation unit 103 subtracts a predicted image supplied from the intra prediction unit 114 or the motion parallax prediction/compensation unit 115 from an image supplied from the syntax processing unit 121 through the selection unit 116 and outputs differential information thereof to the orthogonal transform unit 104.

For example, in the case of an image for which intra coding is performed, the calculation unit 103 subtracts the predicted image supplied from the intra prediction unit 114 from the image supplied from the syntax processing unit 121. On the other hand, for example, in the case of an image for which inter coding is performed, the calculation unit 103 subtracts the predicted image supplied from the motion parallax prediction/compensation unit 115 from the image supplied from the syntax processing unit 121.

The orthogonal transform unit 104 performs an orthogonal transform such as a discrete cosine transform or a Karhunen-Loeve transform for the differential information supplied from the calculation unit 103, and supplies a transform coefficient thereof to the quantization unit 105.

The quantization unit 105 performs quantization of the transform coefficient the orthogonal transform unit 104 outputs. The quantization unit 105 supplies the quantized transform coefficient to the lossless encoding unit 106.

The lossless encoding unit 106 performs lossless coding such as variable-length coding or arithmetic coding for the quantized transform coefficient.

The lossless encoding unit 106 acquires information representing an intra prediction mode and the like from the intra prediction unit 114 and acquires information representing an inter prediction mode, motion vector information, and the like from the motion parallax prediction/compensation unit 115.

The lossless encoding unit 106 codes the quantized transform coefficient and sets the intra prediction mode information, the inter prediction mode information, the motion vector information, and the quantization parameter as a part of the header information of the coded data (multiplexing). The lossless encoding unit 106 supplies the coded data acquired by the coding process to the accumulation buffer 107 so as to be accumulated therein.

For example, the lossless encoding unit 106 performs a lossless coding process such as a variable-length coding process or an arithmetic coding process. As the variable-length coding, for example, there is a context-adaptive variable length coding (CAVLC) or the like. As the arithmetic coding, for example, there is context-adaptive binary arithmetic coding (CABAC) or the like.

The accumulation buffer 107 temporarily stores the coded data supplied from the lossless encoding unit 106 and outputs the stored coded data at predetermined timing, for example, to an image decoding device disposed on a later stage, a recording device, a transmission line, and the like not illustrated in the figure as a coded image that has been coded.

In addition, the transform coefficient quantized by the quantization unit 105 is supplied also to the Inverse quantization unit 108. The inverse quantization unit 108 performs inverse quantization of the quantized transform coefficient by using a method corresponding to the quantization process performed by the quantization unit 105. The inverse quantization unit 108 supplies the acquired transform coefficient to the inverse orthogonal transform unit 109.

The inverse orthogonal transform unit 109 performs an inverse orthogonal transform of the supplied transform coefficient by using a method corresponding to the orthogonal transform process performed by the orthogonal transform unit 104. An output (the differential information that is restored) for which the inverse orthogonal transform has been performed is supplied to the calculation unit 110.

The calculation unit 110 adds the predicted image supplied from the intra prediction unit 114 or the motion parallax prediction/compensation unit 115 through the selection unit 116 to a result of the inverse orthogonal transform that is supplied from the inverse orthogonal transform unit 109, in other words, the restored differential information, thereby acquiring a locally-decoded image (decoded image).

For example, in a case where the differential information corresponds to an image for which the intra coding process is performed, the calculation unit 110 adds the predicted image supplied from the intra prediction unit 114 to the differential information. In addition, for example, in a case where the differential information corresponds to an image for which the inter coding process is performed, the calculation unit 110 adds the predicted image supplied from the motion parallax prediction/compensation unit 115 to the differential information.

The result of the addition is supplied to the deblocking filter 111 and the decoded picture buffer 112.

The deblocking filter 111 appropriately performs a deblocking filter process, thereby eliminating a block distortion of the decoded image. The deblocking filter 111 supplies a result of the filter process to the adaptive offset filter 123.

The adaptive offset filter 123 performs an adaptive offset filter (SAO: Sample adaptive offset) process, which mainly eliminates ringing, for the image after the deblocking filter process performed by the deblocking filter 111.

Described in more detail, the adaptive offset filter 123 determines the type of an adaptive offset filter process for each largest coding unit (LCU) that is a maximal encoding unit and acquires an offset used in the adaptive offset filter process. The adaptive offset filter 123 performs the adaptive offset filter process of the determined type for the image after the adaptive deblocking filter process by using the acquired offset. Then, the adaptive offset filter 123 supplies the image after the adaptive offset filter process to the adaptive loop filter 124.

In addition, the adaptive offset filter 123 includes a butter in which the offset is stored. The adaptive offset filter 123 determines whether or not the offset used in the adaptive deblocking filter process has already been stored in the buffer for each LCU.

In a case where it is determined that the offset used in the adaptive deblocking filter process has already been stored in the buffer, the adaptive offset filter 123 sets a storage flag, which represents whether the offset is stored in the buffer, to a value (here, "1") representing that the offset is stored in the buffer.

Then, the adaptive offset filter 123 supplies the storage flag set to "1", an index that represents a storage position of the offset in the buffer, and type information that represents the type of the performed adaptive offset filter process to the lossless encoding unit 106 for each LCU.

On the other hand, in a case where it is determined that the offset used in the adaptive deblocking filter process has not been stored yet in the buffer, the adaptive offset filter 123 sequentially stores the offset in the buffer. In addition, the adaptive offset filter 123 sets the storage flag to a value (here, "0") representing that the offset is not stored in the buffer. Then, the adaptive offset filter 123 supplies the storage flag set to "0", the offset, and the type information to the lossless encoding unit 106 for each LCU.

The adaptive loop filter 124 performs an adaptive loop filter (ALF) process for the image after the adaptive offset filter process, which is supplied from the adaptive offset filter 123, for example, for each LCU. As the adaptive loop filter process, for example, a process using a two-dimensional Weiner filter is used. It is apparent that a filter other than the Wiener filter may be used.

More specifically, the adaptive loop filter 124, for each LCU, calculates a filter coefficient used in the adaptive loop filter process such that a residual between the original image that is the image output from the syntax processing unit 121 and the image after the adaptive loop filter process is minimal. Then, the adaptive loop filter 124 performs an adaptive loop filter process by using the calculated filter coefficient for the image after the adaptive offset filter process for each LCU.

The adaptive loop filter 124 supplies the image after the adaptive loop filter process to the decoded picture buffer 112. In addition, the adaptive loop filter 124 supplies the filter coefficient to the lossless encoding unit 106.

Here, the adaptive loop filter process is performed for each LCU, the processing unit of the adaptive loop filter process is not limited to the LCU. However, by matching the processing units of the adaptive offset filter 123 and the adaptive loop filter 124, the process can be efficiently performed.

The decoded picture buffer 112 outputs the accumulated reference image at predetermined timing to the intra prediction unit 114 or the motion parallax prediction/compensation unit 115 through the selection unit 113.

For example, in the case of an image for which the intra coding is performed, the decoded picture buffer 112 supplies the reference image to the intra prediction unit 114 through the selection unit 113. On the other hand, for example, in a case where the inter coding is performed, the decoded picture buffer 112 supplies the reference image to the motion parallax prediction/compensation unit 115 through the selection unit 113.

In a case where the reference image supplied from the decoded picture buffer 112 is an image for which the intra coding is performed, the selection unit 113 supplies the reference image to the intra prediction unit 114. On the other hand, in a case where the reference image supplied from the decoded picture buffer 112 is an image for which the inter coding is performed, the selection unit 113 supplies the reference image to the motion parallax prediction/compensation unit 115.

The intra prediction unit 114 performs an intra prediction (in-screen prediction) for generating a predicted image by using an in-screen pixel value of an input image supplied from the syntax processing unit 121. The intra prediction unit 114 performs the intra prediction in a plurality of modes (intra prediction modes).

The intra prediction unit 114 generates predicted images in all the intra prediction modes, evaluates each predicted image, and selects an optimal mode. When the optimal intra prediction mode is selected, the intra prediction unit 114 supplies the predicted image generated in the optical mode to the calculation unit 103 or the calculation unit 110 through the selection unit 116.

In addition, as described above, the intra prediction unit 114 appropriately supplies information such as intra prediction mode information representing the used intra prediction mode to the lossless encoding unit 106.

The motion parallax prediction/compensation unit 115 performs a motion parallax prediction for the image for which the inter coding is performed by using the input image supplied from the syntax processing unit 121 and the reference image supplied from the decoded picture buffer 112 through the selection unit 113. At that time, the motion parallax prediction/compensation unit 115 uses a reference image of a reference image index that is represented in a reference list generated by the reference list generating unit 122. The motion parallax prediction/compensation unit 115 performs a motion parallax compensation process according to a detected motion parallax vector, thereby generating a predicted image (inter predicted image information).

The motion parallax prediction/compensation unit 115 performs the inter prediction process of each of all the inter prediction modes that are candidates, thereby generating predicted images. The motion parallax prediction/compensation unit 115 supplies the generated predicted image to the calculation unit 103 or the calculation unit 110 through the selection unit 116.

In addition, the motion parallax prediction/compensation unit 115 supplies inter prediction mode information representing the used inter prediction mode and motion vector information representing the calculated motion vector to the lossless encoding unit 106.

The selection unit 116 supplies the output of the intra prediction unit 114 to the calculation unit 103 or the calculation unit 110 in the case of an image for which the intra coding is performed and supplies the output of the motion parallax prediction/compensation unit 115 to the calculation unit 103 or the calculation unit 110 in the case of an image for which the inter coding is performed.

The rate control unit 117 controls the rate of the quantization operation of the quantization unit 105 based on a compressed image stored in the accumulation buffer 107 such that overflow or under flow does not occur.

The reference list generating unit 122 generates a reference list that is referred to when the motion parallax prediction/compensation unit 115 predicts a current image by using information (POC information and view information) of a reference image accumulated in the decoded picture buffer 112. At that time, the reference list generating unit 122 generates the reference list by inserting reference images that can be referred to in the view direction between a plurality of reference images that can be referred to in the time direction.

In other words, the reference list generating unit 122 generates a temporal list that is a temporary list used when the reference list is generated by inserting reference images that can be referred to in the view direction between a plurality of reference images that can be referred to in the time direction. Then, the reference list generating unit 122 generates a reference list based on the generated temporal list.

Here, the reference images that can be referred to in the time direction are reference images that can be referred to at different time points, and the reference images that can be referred to in the view (layer) direction are reference images that can be referred to at different views (layers).

[Structure of Reference Image]

Next, the structure of the reference image according to the HEVC system will be described with reference to FIG. 2.

Figure 2:
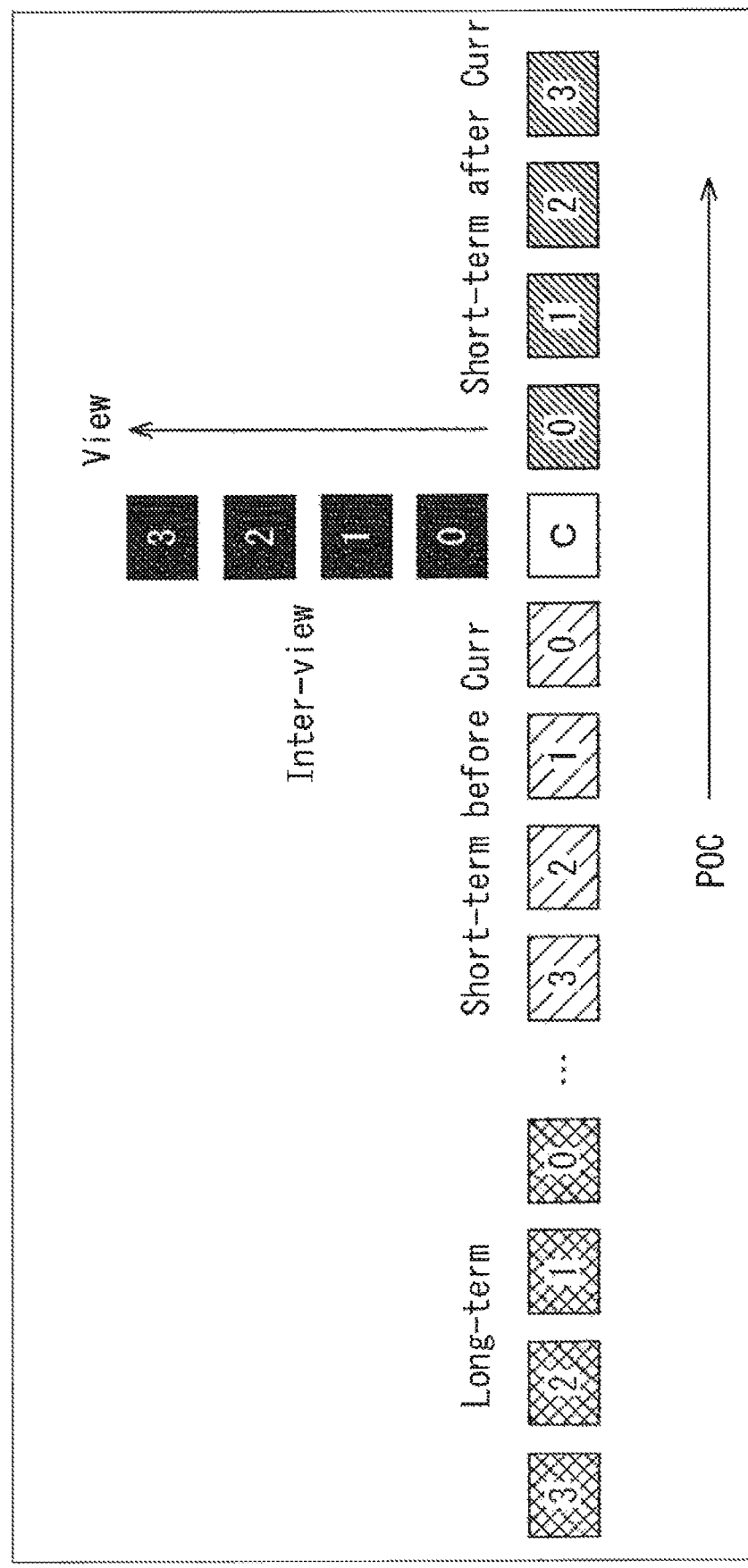
FIG. 2 is an explanatory diagram that illustrates an example of the structure of reference images.

In the example illustrated in FIG. 2, in order of POC from the left side, long-term (LT) reference images, short-term (before) reference images (Short-term before Curr: STbC), a current image in which "C" is represented, and short-term (after) reference images (Short-term after Curr: STaC) are illustrated. In addition, in order of the view (parallax) direction from the lower side, the current image in which "C" is represented, and inter-view (IV) reference images are illustrated. In addition, a number represented in each reference image represents an arrangement index of each reference image in the decoded picture buffer 112.

In the HEVC system, when an inter prediction is performed, four kinds of images including the long-term reference images, the short-term (before) reference images, the short-term (after) reference images, and the inter-view reference images illustrated in FIG. 2 can be set as candidates for a reference image.

The short-term (before) reference images are short-term reference images located before the current image (POC is smaller), in which "C" is represented, in time within the same view, and the short-term (after) reference images are short-term reference images located after the current image (POC is larger) in time within the same view. In addition, the long-term reference images are reference images designated as reference images of a long term within the same view. The inter-view reference images are reference images of different views at the same time.

[Conventional Method 1 of Generating Reference List]

Next, a method of generating a default reference list of the HEVC system will be described as a conventional method 1 with reference to FIG. 3. In an example illustrated in FIG. 3, as the example in which four reference images are referred to, a list (arrangement) (RefPicSetStCurrBefore[i]) of short-term (before) reference images, a list (RefPicSetStCurrAfter[i]) of short-term (after) reference images, a list (RefPicSetLtCurr[i]) of long-term reference images, and a list (RefPicSetIvCurr[i]) (i: index=0 to 3) of inter-view reference images in the decoded picture buffer 112 are illustrated.

For the short-term reference images, in the syntax of the slice header or the RPS (Reference Picture Set), a flag used_by_curr is set to each image having a possibility of being referred to. The RPS is a syntax used for clearly indicating the state of the decoded picture buffer for each picture included in the SPS. For the long-term reference images, in the syntax of the slice header or the SPS, the flag used_by_curr is set to each image having a possibility of being referred to. Only each image of which the flag used_by_curr is "1" is added to the temporal list that is a temporary list used when the reference list is generated. In addition, since the flag used_by_curr is not set to inter-view reference images, all the inter-view reference images arranged in the list of inter-view reference images are added to the temporal list.

Figure 3:
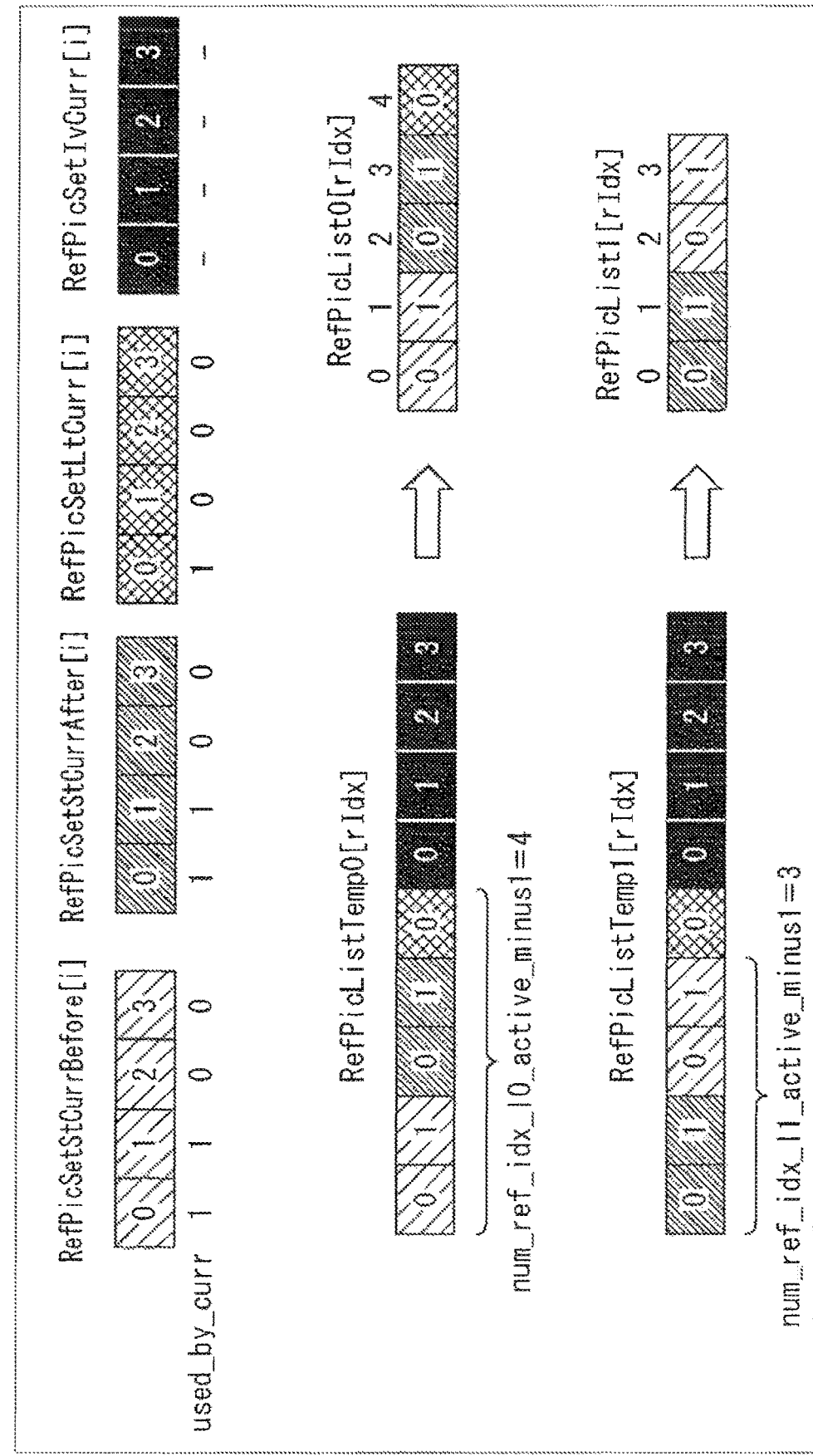
FIG. 3 is a diagram that illustrates an example of a conventional method of generating a reference list.

In the example represented in FIG. 3, a temporal list (RefPicListTemp0[rIdx]) of L0 (direction L0) and a temporal list (RefPicListTemp1[rIdx]) of L1 (direction L1) that are generated from such lists of reference images are illustrated.

The temporal list (RefPicListTemp0[rIdx]) of L0 is generated by adding images of which the flag used_by_curr is set to "1" in order of a short-term (before) reference image, a short-term (after) reference image, a long-term reference image, and an inter-view reference image. Accordingly, the temporal list (RefPicListTemp0[rIdx]) of L0 is generated in order of short-term (before) reference images of indexes "0" and "1", short-term (after) reference images of indexes "0" and "1", a long-term reference image of an index "0", and inter-view reference images of indexes "0" to "3".

The temporal list (RefPicListTemp1[rIdx]) of L1 is generated by adding images of which the flag used_by_curr is set to "1" in order of a short-term (after) reference image, a short-term (before) reference image, a long-term reference image, and an inter-view reference image. Accordingly, the temporal list (RefPicListTemp1[rIdx]) of L1 is generated in order of short-term (after) reference images of indexes "0" and "1", short-term (before) reference images of indexes "0" and "1", a long-term reference image of index "0", and inter-view reference images of indexes "0" to "3".

In addition, in the example represented in FIG. 3, a reference list (RefPicList0[rIdx]) of L0 that is generated based on the temporal list of L0 and a reference list (RefPicList1[rIdx]) of L1 that is generated based on the temporal list of L1 are illustrated.

Here, as the syntax of the slice header or the SPS, in the temporal list, as the number of referable images, num_ref_idx_l0_active_minus1 and num_ref_idx_l1_active_minus1 are set. From the start of the temporal list of L0/L1, the number of reference images is limited thereby, and only the reference images are added to the reference list and can be used as the reference images.

For example, in a case where num_ref_idx_l0_active_minus1 is "4", images of the start (the first from the left side) to the fifth of the temporal list of L0 are added to a reference list (RefPicList0[rIdx]) of L0, whereby the reference list of L0 is generated. In the case of the example illustrated in FIG. 3, the reference list of L0 is generated in order of short-term (before) reference images of indexes "0" and "1", short-term (after) reference images of indexes "0" and "1", and a long-term reference image of index "0".

For example, in a case where num_ref_idx_l1_active_minus1 is "3", images of the start to the fourth of the temporal list of L1 are added to a reference list (RefPicList1[rIdx]) of L1, whereby the reference list of L1 is generated. In the case of the example illustrated in FIG. 3, the reference list of L1 is generated in order of a short-term (after) reference images of indexes "0" and "1" and short-term (before) reference images of indexes "0" and "1".

As above, according to the HEVC system, the temporal list is generated such that, after reference images disposed in the time direction, reference images disposed in the view direction are arranged. Thus, it is difficult to arrange the reference images disposed in the view direction in the reference list.

In addition, according to the HEVC system, a change command for a reference list is defined, and, by transmitting the change command, images that are freely rearranged in the temporal list can be inserted into the reference list. Accordingly, a reference image disposed in the view direction can be referred to. However, since the change command is transmitted in the syntax, an additional bit is generated.

In other words, in the case of the method described above, while there is no problem when the time correlation is extremely higher than the view correlation, in a general sequence, the correlation among views is not markedly low, and thus, it is necessary to use a reference list command for performing a parallax prediction.

Thus, in Non-Patent Document 2, it has been proposed to transmit information designating a position at which a reference image disposed in the view direction is to be inserted among a plurality of reference images disposed in the time direction using a slice header when a temporal list is generated.

[Conventional Method 2 of Generating Reference List]

Figure 4:
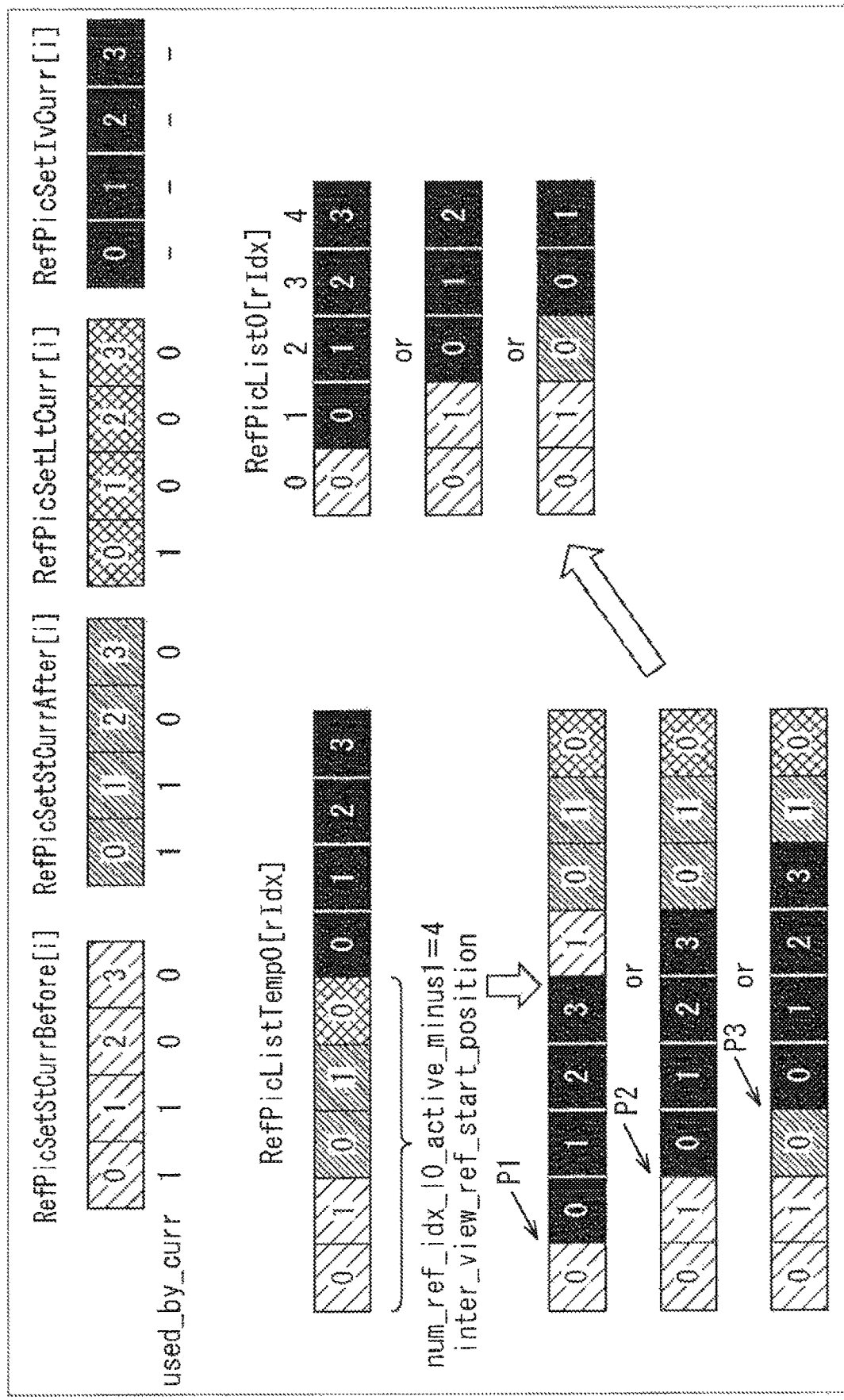
FIG. 4 is a diagram that illustrates another example of a conventional method of generating a reference list.

Next, a method of generating a default reference list described in Non-Patent Document 2 will be described as a conventional method 2 with reference to FIG. 4. In FIG. 4, only an example of L0 is described.

According to the method described in Non-Patent Document 2, until the temporal list is generated, the process is similar to that of the HEVC system, and repetitive description thereof will not be presented here.

In other words, the temporal list (RefPicListTemp0[rIdx]) of L0, similar to the HEVC system, is generated by adding images of which the flag used_by_curr is set to "1" in order of a short-term (before) reference image, a short-term (after) reference image, a long-term reference image, and an inter-view reference image. Accordingly, the temporal list (RefPicListTemp0[rIdx]) of L0 is generated in order of short-term (before) reference images of indexes "0" and "1", short-term (after) reference images of indexes "0" and "1", a long-term reference image of an index "0", and inter-view reference images of indexes "0" to "3".

Here, in the case of the method described in Non-Patent Document 2, a position (inter_view_ref_start_position) at which the inter-view reference image is inserted in the temporal list is set in a slice header extension and is transmitted.

For example, according to the position inter_view_ref_start_position, as denoted by arrow P1, a second position from the start (first) of the temporal list is designated. In such a case, the temporal list (RefPicListTemp0[rIdx]) of L0 is generated in order of a short-term (before) reference image of index "0", inter-view reference images of indexes "0" to "3", a short-term (before) reference image of index "1", short-term (after) reference images of indexes "0" and "1", and a long-term reference image of index "0".

In such a case, the reference list of L0 is generated according to num_ref_idx_l0_active_minus1=4 in order of a short-term (before) reference image of index "0" and inter-view reference images of indexes "0" to "3".

In addition, for example, according to the position inter_view_ref_start_position, as denoted by arrow P2, a third position from the start (first) of the temporal list is designated. In such a case, the temporal list (RefPicListTemp0[rIdx]) of L0 is generated in order of short-term (before) reference images of indexes "0" and "1", inter-view reference images of indexes "0" to "3", short-term (after) reference images of indexes "0" and "1", and a long-term reference image of index "0".

In such a case, the reference list of L0 is generated according to num_ref_idx_l0_active_minus1=4 in order of short-term (before) reference images of indexes "0" and "1" and inter-view reference images of indexes "0" to "2".

In addition, for example, according to the position inter_view_ref_start_position, as denoted by arrow P3, a fourth position from the start (first) of the temporal list is designated. In such a case, the temporal list (RefPicListTemp0

[rIdx]) of L0 is generated in order of short-term (before) reference images of indexes "0" and "1", a short-term (after) reference image of index "0", inter-view reference images of indexes "0" to "3", a short-term (after) reference image of index "1", and a long-term reference image of index "0".

In such a case, the reference list of L0 is generated according to num_ref_idx_l0_active_minus1=4 in order of short-term (before) reference images of indexes "0" and "1", a short-term (after) reference image of index "0", and inter-view reference images of indexes "0" to "1".

As above, according to the method disclosed in Non-Patent Document 2, in the slice header extension, positions at which inter-view reference images are inserted in the temporal list is transmitted in the syntax. Accordingly, in consideration of the view correlation, inter-view reference images can be inserted at a preferred position in the temporal list.

However, in the case of the method disclosed in Non-Patent Document 2, also when the inter-view reference images do not need to be moved, the syntax needs to be transmitted.

In addition, in such a case, a plurality of the inter-view reference images are inserted to the position set in the syntax at once. Accordingly, in the temporal list, when inter-view reference images and short-term reference images or long-term reference image are desired to be mixed, the reference list change command needs to be transmitted.

Thus, according to the present technology, the temporary list is generated by inserting reference images that can be referred to in the view direction among a plurality of reference images that can be referred to in the time direction.

[Method of Generating Reference List According to Present Technology 1]

Figure 5:
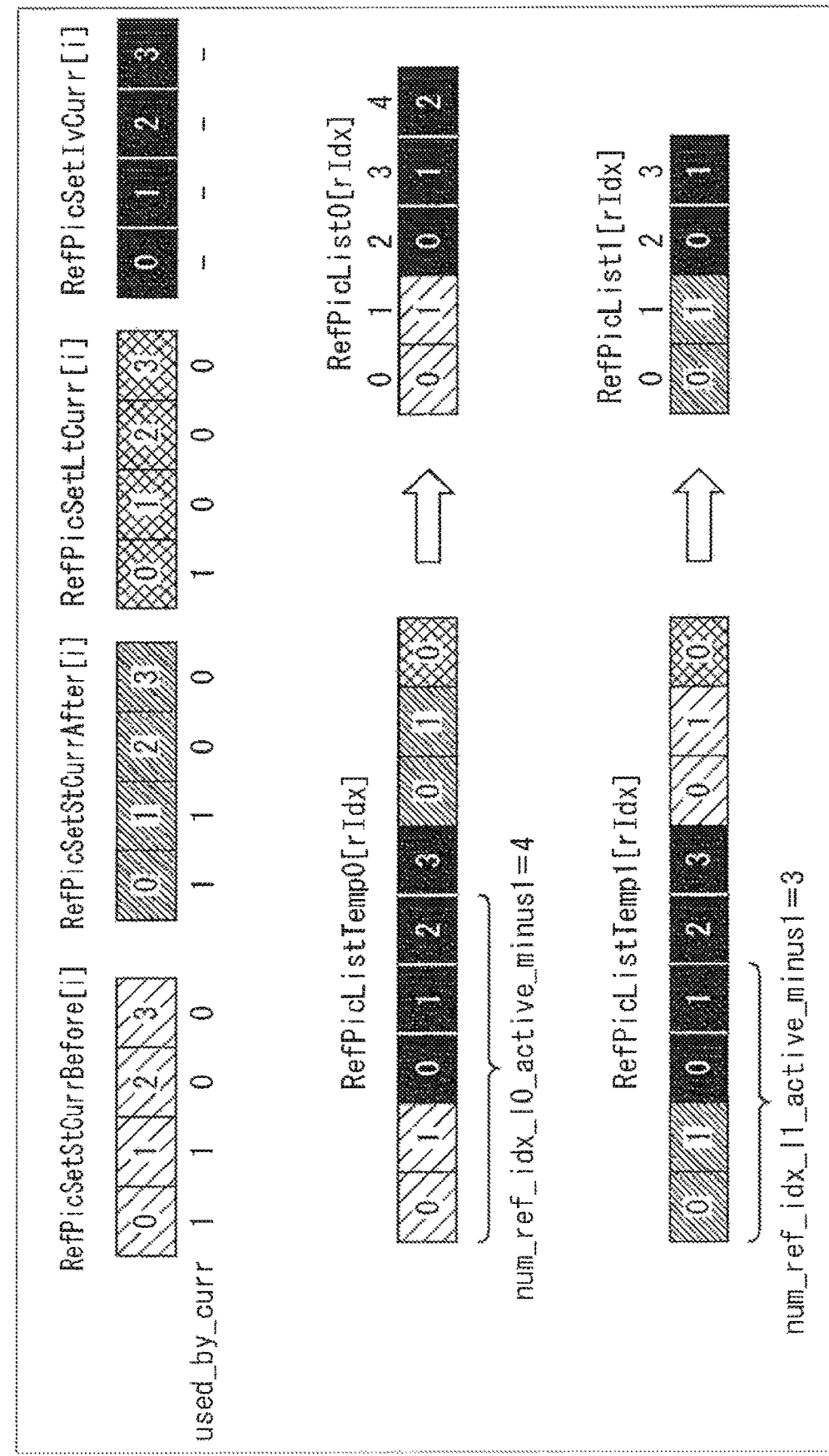
FIG. 5 is a diagram that illustrates an example of a method of generating a reference list according to the present technology.

Next, a method of generating a reference list according to the present technology 1 will be described with reference to FIG. 5. In an example illustrated in FIG. 5, as the example in which four reference images are referred to, a list (arrangement) (RefPicSetStCurrBefore[i]) of short-term (before) reference images, a list (RefPicSetStCurrAfter[i]) of short-term (after) reference images, a list (RefPicSetLtCurr[i]) of long-term reference images, and a list (RefPicSetIvCurr[i]) (i: index=0 to 3) of inter-view reference images in the decoded picture buffer 112 are illustrated.

According to the present technology 1, a temporal list (RefPicListTemp0[rIdx]) of L0 is generated in order of short-term (before) reference images of indexes "0" and "1", inter-view reference images of indexes "0" to "3", short-term (after) reference images of indexes "0" and "1", and a long-term reference image of index "0".

In such a case, the reference list of L0 is generated according to num_ref_idx_l0_active_minus1=4 in order of short-term (before) reference images of indexes "0" and "1" and inter-view reference images of indexes "0" to "2".

According to the present technology 1, a temporal list (RefPicListTemp1[rIdx]) of L1 is generated in order of short-term (before) reference images of indexes "0" and "1", inter-view reference images of indexes "0" to "3", short-term (after) reference images of indexes "0" and "1", and a long-term reference image of index "0".

In such a case, the reference list of L1 is generated according to num_ref_idx_l0_active_minus1=3 in order of short-term (after) reference images of indexes "0" and "1" and inter-view reference images of indexes "0" and "1".

As above, according to the method of present technology 1, in generation of the temporal list, the inter-view images are inserted between the short-term (before) reference images and the short-term (after) reference images.

Since this is a default process, an additional syntax does not need to be transmitted. In addition, since the short-term (after) reference images enters the list with a highest priority level in L1, by inserting the inter-view reference images before the short-term (after) reference images in L0, a duplicate use of the short-term (after) reference images in L0/L1 can be avoided.

However, in the case of L0, when the number of short-term (before) reference images is large, there are inter-view images not entering the reference list. Regarding this, the number of short-term (before) reference images may be limited by using the RPS. In addition, in the case of L1, while the order of the short-term reference images being the target is reversed, the process may be similarly described.

In addition, after the short-term (before/after) reference images, a plurality of inter-view reference images are inserted at once. Thus, in the temporal list, when the inter-view reference images and the short-term reference images or the long-term reference images are desired to be mixed, the reference list change command needs to be transmitted.

In a case where the time correlation is extremely higher than the correlation between views, there is concern that the coding efficiency may decrease.

[Method of Generating Reference List According to Present Technology 2]

Figure 6:
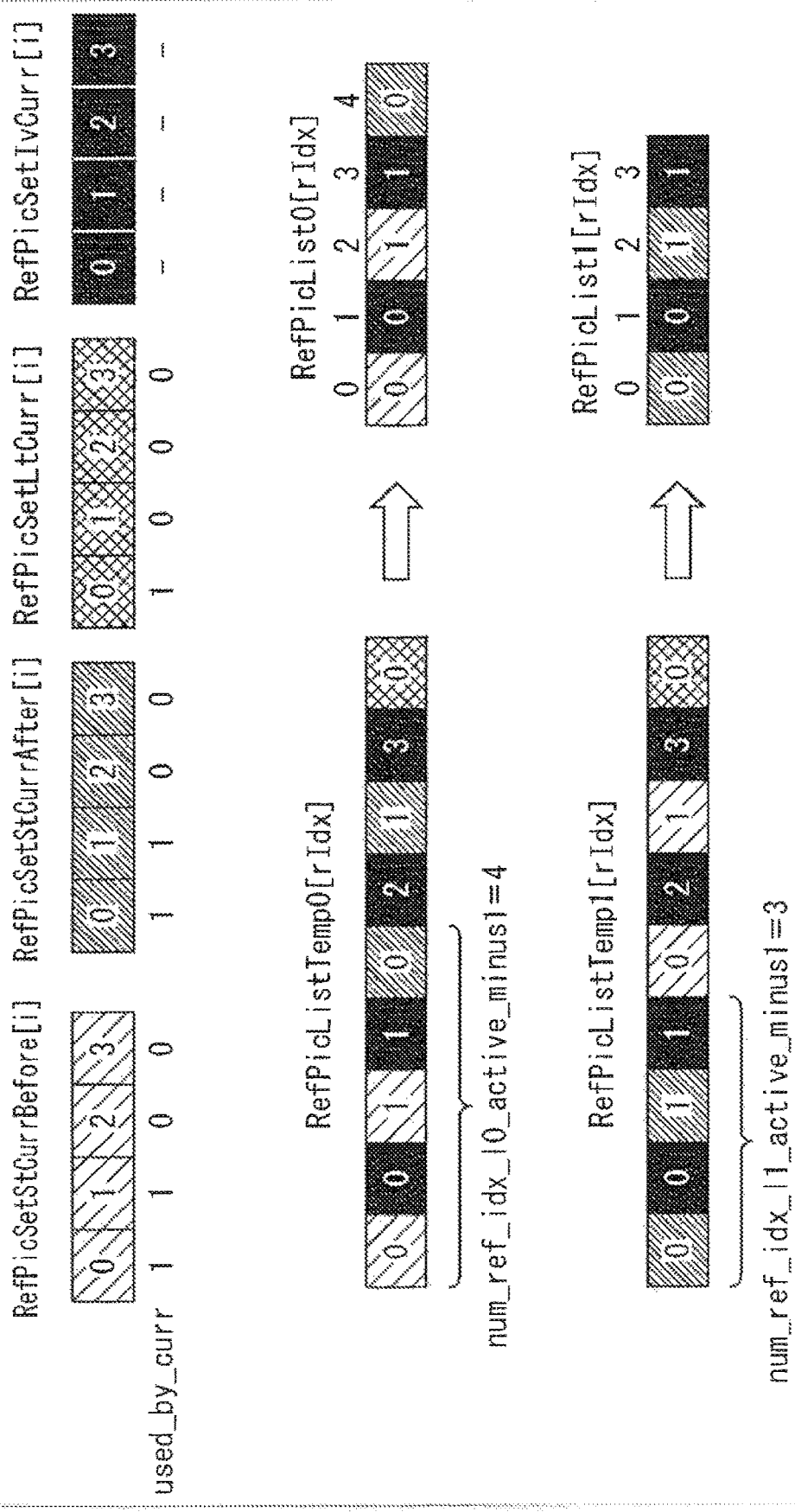
FIG. 6 is a diagram that illustrates another example of a method of generating a reference list according to the present technology.

In addition, the method of generating a reference list according to the present technology 2 will be described with reference to FIG. 6. In an example illustrated in FIG. 6, as the example in which four reference images are referred to, a list (arrangement) (RefPicSetStCurrBefore[i]) of short-term (before) reference images, a list (RefPicSetStCurrAfter[i]) of short-term (after) reference images, a list (RefPicSetLtCurr[i]) of long-term reference images, and a list (RefPicSetIvCurr[i]) (i: index=0 to 3) of inter-view reference images in the decoded picture buffer 112 are illustrated.

According to the present technology 2, a temporal list (RefPicListTemp0[rIdx]) of L0 is generated in order of a short-term (before) reference image of index "0", an inter-view reference image of index "0", a short-term (before) reference image of index "1", an inter-view reference image of index "1", a short-term (after) reference image of index "0", an inter-view reference image of index "2", a short-term (after) reference image of index "1", an inter-view reference image of index 3, and a long-term reference image of index "0".

In such a case, the reference list of L0 is generated according to num_ref_idx_l0_active_minus1=4 in order of the short-term (before) reference image of index "0", the inter-view reference image of index "0", the short-term (before) reference image of index "1", the inter-view reference image of index "1", and the short-term (after) reference image of index "0".

In addition, according to the present technology 2, a temporal list (RefPicListTemp1[rIdx]) of L1 is generated in order of a short-term (after) reference image of index "0", an inter-view reference image of index "0", a short-term (after) reference image of index "1", an inter-view reference image of index "1", a short-term (before) reference image of index "0", an inter-view reference image of index "2", a short-term (before) reference image of index "1", an inter-view reference image of index 3, and a long-term reference image of index "0".

In such a case, the reference list of L1 is generated according to num_ref_idx_l1_active_minus1=3 in order of a short-term (after) reference image of index "0", an inter-view reference image of index "0", a short-term (after) reference image of index "i", and an inter-view reference image of index "1".

As above, according to the method of the present technology 2, in the generation of the temporal list, a reference image disposed in the time direction and a reference image disposed in the view direction are alternately arranged.

When the height of the time correlation and the height of the correlation between views are alternately lined up, an arrangement having high reference efficiency is formed. In addition, in the case of L0, even when the number of short-term (before) reference images is large, it is easy to add inter-view reference images to the reference list as default. In addition, since this is a default process, an additional syntax does not need to be transmitted.

However, in a case where the time correlation is extremely higher than the correlation between views, there is concern that the coding efficiency decreases.

[Comparison between Conventional Technology and Present Technology]

In an example represented in FIG. 7, a table comparing the conventional method described above and the method according to the present technology is illustrated.

There are two advantages of the present technology 1 over the conventional technology 1. The first advantage is that the coding efficiency can be improved for a sequence having a high inter-view correlation (general case). The inter-view correlation represents a correlation between inter-view images. The second advantage is that, when the number of short-term (before) reference images (STbC) and short-term (after) reference images (STaC) is small, the number of unique pictures can be increased in the whole reference list L0/L1.

There are two advantages of the present technology 1 over the conventional technology 2. The first advantage is that an additional syntax does not need to be transmitted. The second advantage is that the processing amount is small owing to no rearrangement of the temporal list.

There are two advantages of the present technology 2 over the conventional technology 1. The first advantage is that, when the temporal correlation and the inter-view correlation are alternately aligned, the coding efficiency can be improved. Here, the temporal correlation is a correlation between inter images of different time points. The inter-view correlation is a correlation between inter-view images. The second advantage is that inter-view reference images can be arranged at the second position from the start of the reference list also in the worst case.

There are two advantages of the present technology 2 over the conventional technology 2. The first advantage is that an additional syntax does not need to be transmitted. The second advantage is that, when the temporal correlation and the inter-view correlation are alternately aligned, the coding efficiency can be improved.

In addition, the present technology 1 and the present technology 2 will be compared with each other.

The present technology 2 has two advantages over the present technology 1. The first advantage is that, when the temporal correlation and the inter-view correlation are alternately aligned, the coding efficiency can be improved. The second advantage is that inter-view reference images can be arranged at the second position from the start of the reference list also in the worst case.

In the description presented above, similar to a conventional case, while the example has been described in which the sequence of adding inter-view images to the reference list (temporal list) is the same for L0 and L1, the order may be changed between L0 and L1.

[Alignment Between Inter-View Images]

Next, the alignment order between inter-view images according to the present technology will be described with reference to FIG. 8.

Conventionally, corresponding inter-view reference images are added to the reference list (temporal list) in order of j=0, 1, 2, . . . based on ref_layer_id[i][j] of the VPS (Video Parameter Set). This process is completely the same between L0 and L1, and, in the temporal lists of L0/L1, the order in which inter-view reference images are aligned is the same.

Thus, according to this technology, the inter-view reference images are added to the temporal list of L0 in order of ref_layer_id[i][j](here, j=0, 1, 2, . . . ). In addition, the inter-view reference images are added to the temporal list of L1 in order of ref_layer_id[i][j] (here, j= . . . , 2, 1, 0).

Figure 8:
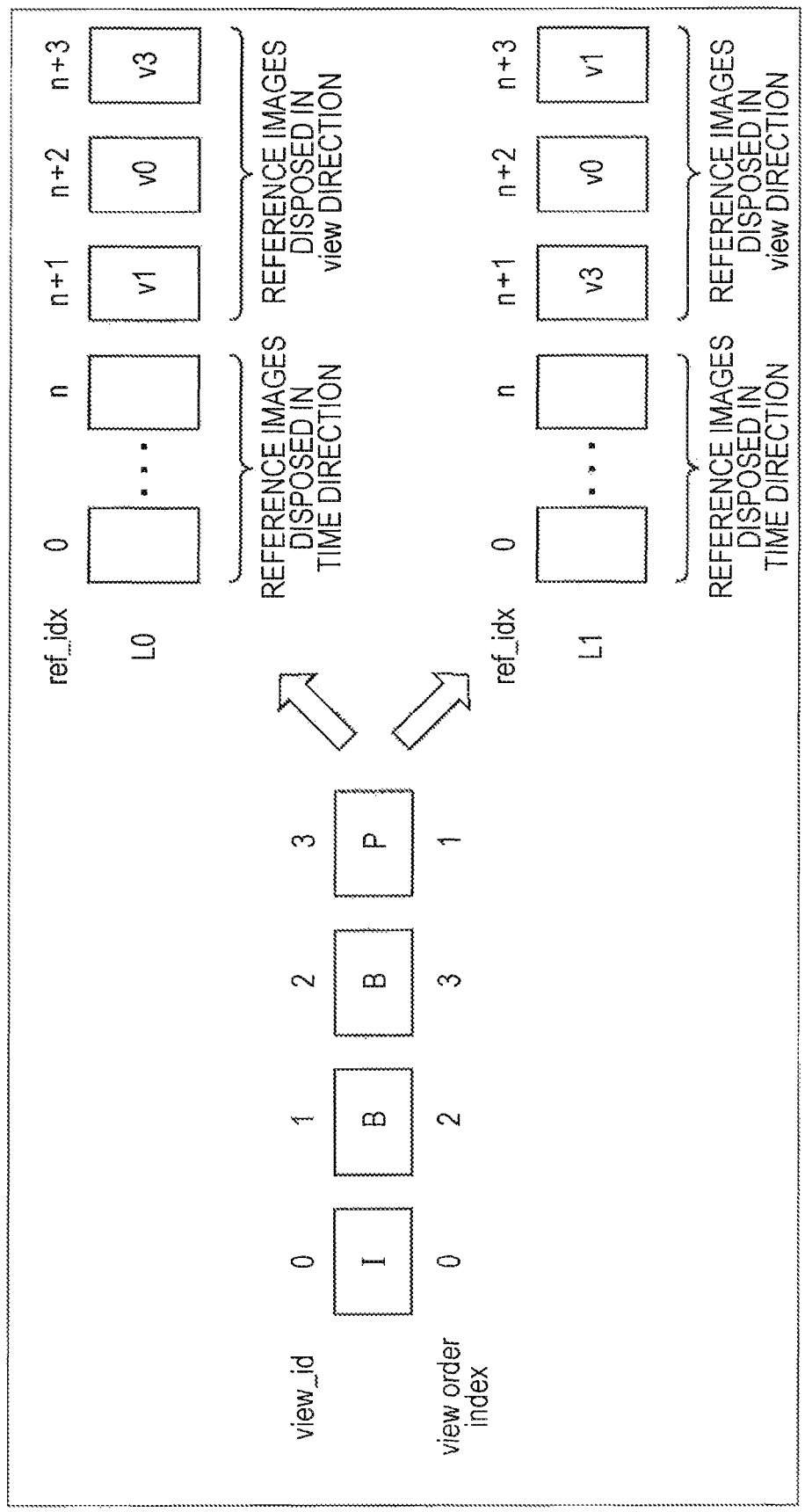
FIG. 8 is a diagram that illustrates the arrangement order of inter-view images according to the present technology.

More specifically, as illustrated on the left side in FIG. 8, for example, in a case where a view image of view_id=2 is to be coded among four views of view_id=0, 1, 2, and 3, it is assumed that the reference relation is described in order of view_id=1, 0, and 3 in the VPS.

In this case, according to the present technology, as illustrated on the right side in FIG. 8, in the temporal list of L0, inter-view reference images are aligned in order of view_id=1, 0, and 3 described in the VPS. In addition, in the temporal list of L1, inter-view reference images are aligned in order of view_id=3, 0, and 1 that is the reverse order of view_id described in the VPS.

By configuring as such, in the temporal lists of L0/L1, in a case where only up to the (ref_id=n+1)-th image is referred to, in other words, in a case where only up to the (ref_id=n+1)-th image is added to the reference list, different inter-view reference images can be referred to in L0 and L1.

More specifically, in the example illustrated in FIG. 8, the (n+1)-th inter-view reference image is an inter-view reference image v1 of view_id=1 in L0, and, the (n+1)-th inter-view reference image is an inter-view reference image v3 of view_id=3 in L1, whereby the (n+1)-th inter-view reference image can be changed between L0 and L1.

In this way, since different inter-view reference images can be referred to in L0 and L1, there is a high possibility of having higher performance of a parallax prediction than that of a case where the same image is referred to, and the coding efficiency can be expected to be improved.

In the example represented in FIG. 8, similar to the conventional example represented in FIG. 3, while the example is illustrated in which, after the reference images disposed in the time direction, the reference images disposed in the view direction are added, the order of the inter-view reference images of the case of the present technology described above with reference to FIGS. 5 and 6 may be employed as well.

In a case where the present technology is applied, according to the technology disclosed in Non-Patent Document 1, as denoted by a solid line in FIG. 9, there is no change for L0, as denoted by a dotted line illustrated in FIG. 9, the inter-view images are changed to be added in reverse order of L0.

The reference list generating unit 122, which is illustrated in FIG. 1, performing the above-described process is configured as illustrated in the following FIG. 10.

[Configuration Example of Reference List Generating Unit]

Figure 10:
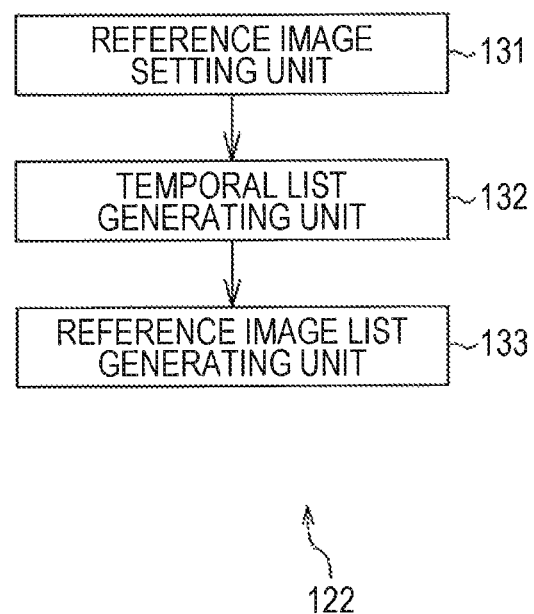
FIG. 10 is a block diagram that illustrates an example of the configuration of a reference list generating unit illustrated in FIG. 1.

FIG. 10 is a block diagram that illustrates an example of the configuration of the reference list generating unit that performs the above-described process.

In the example illustrated in FIG. 10, the reference list generating unit 122 is configured to include: a reference image setting unit 131; a temporal list generating unit 132; and a reference image list generating unit 133.

The reference image setting unit 131 sets short-term (before) reference images by referring to time information (in other words, the POC information) of the reference image supplied from the decoded picture buffer 112 and the flag used_by_curr of the short-term reference image that is set in the slice header or the RPS supplied from the syntax processing unit 121 and generates a short-term (before) reference image list (RefPicSetStCurrBefore[i]). In addition, the reference image setting unit 131 sets short-term (after) reference images by referring to time information of the reference image supplied from the decoded picture buffer 112 and the flag used_by_curr of the short-term reference image that is set in the slice header or the RPS supplied from the syntax processing unit 121 and generates a short-term (after) reference image list (RefPicSetStCurrAfter[i]).

The reference image setting unit 131 sets long-term reference images by referring to time information of the reference image supplied from the decoded picture buffer 112 and the flag used_by_curr of the long-term reference image that is set in the slice header or the SPS supplied from the decoded picture buffer 112 and generates a long-term reference image list (RefPicSetLtCurr[i]). In addition, the reference image setting unit 131 sets inter-view reference images (RefPicSetIvCurr[i]) by referring to view information of the reference image supplied from the decoded picture buffer 112 and generates a list thereof.

The temporal list generating unit 132 combines lists set by the reference image setting unit 131 in predetermined order according to the present technology described above, thereby generating temporal lists (RefPicListTemp0[rIdx] and RefPicListTemp1[rIdx]) of L0 and L1.

The reference image list generating unit 133 refers to the number num_ref_idx_l0_active_minus1 and the number num_ref_idx_l1_active_minus1 set in the slice header or the SPS supplied from the syntax processing unit 121. The reference image list generating unit 133 extracts reference images corresponding to the number num_ref_idx_l0_active_minus1 and the number num_ref_idx_l1_active_minus1 from the temporal lists of L0/L1 generated by the temporal list generating unit 132 and adds the extracted reference images, thereby generating reference lists of L0/L1.

The reference lists of L0/L1 generated by the reference image list generating unit 133 are referred to by the motion parallax prediction/compensation unit 115.

[Flow of Coding Process]

Next, the flow of each process performed by the image encoding device 100 as above will be described. First, an example of the flow of the coding process will be described with reference to a flowchart represented in FIG. 11.

In Step S101, the A/D converter 101 performs A/D conversion of an input image. In Step S102, the screen rearrangement buffer 102 stores the image that is converted from analog to digital and rearranges the image from the display order of pictures to the coding order.

In Step S103, the syntax processing unit 121 sequentially checks data of images read from the screen rearrangement buffer 102 and inserts header information to the data of each image. The syntax processing unit 121 supplies the image into which the header information and the like are inserted to the calculation unit 103, the intra prediction unit 114, and the motion parallax prediction/compensation unit 115. In addition, the syntax processing unit 121 supplies information such as the VPS, the SPS (including the RPS), and the slice header to the reference list generating unit 122.

In Step S104, the calculation unit 103 calculates a difference between the image supplied from the syntax processing unit 121 and the predicted image. The predicted image is supplied to the calculation unit 103 through the selection unit 116 from the motion parallax prediction/compensation unit 115 in the case of the inter prediction or from the intra prediction unit 114 in the case of the intra prediction.

The data amount of the differential data is smaller than that of the original image data. Accordingly, the data amount can be compressed more than that of a case where the image is directly coded.

In Step S105, the orthogonal transform unit 104 performs an orthogonal transform of the differential information generated by the process of Step S104. More specifically, an orthogonal transform such as a discrete cosine transform or a Karhuren-Loeve transform is performed, and a transform coefficient is output.

In Step S106, the quantization unit 105 quantizes the orthogonal transform coefficient acquired by the process of Step S105.

The differential information quantized by the process of Step S106 is locally decoded as below. In Step S107, the inverse quantization unit 108 performs inverse quantization of the quantized orthogonal transform coefficient (also referred to as a quantization coefficient), which is generated by the process of Step S106, according to characteristics corresponding to the characteristics of the quantization unit 105.

In Step S108, the inverse orthogonal transform unit 109 performs an inverse orthogonal transform of the orthogonal transform coefficient, which is acquired by the process of Step S107, according to characteristics corresponding to the characteristics of the orthogonal transform unit 104.

In Step S109, the calculation unit 110 adds the predicted image to the differential information that is locally decoded, thereby generating a locally-decoded image (an image corresponding to the input to the calculation unit 103).

In Step S110, the deblocking filter 111 performs filtering for the image supplied from the calculation unit 110, thereby eliminating a block distortion. Then, the deblocking filter 111 supplies an image acquired as a result thereof to the adaptive offset filter 123.

In Step S111, the adaptive offset filter 123 performs an adaptive offset filter process for the image supplied from the deblocking filter 111 for each LCU. The adaptive offset filter 123 supplies an image acquired as a result thereof to the adaptive loop filter 124. In addition, the adaptive offset filter 123 supplies the storage flag, the index or the offset, and the type information to the lossless encoding unit 106 as offset filter information for each LCU.

In Step S112, the adaptive loop filter 124 performs an adaptive loop filter process for the image supplied from the adaptive offset filter 123 for each LCU. The adaptive loop filter 124 supplies an image acquired as a result thereof to the decoded picture buffer 112. In addition, the adaptive loop filter 124 supplies the filter coefficient used in the adaptive loop filter process to the lossless encoding unit 106.

In Step S113, the decoded picture buffer 112 stores the image for which the filter process has been performed. In addition, an image for which the filter process has not been performed is supplied also to the decoded picture buffer 112 from the calculation unit 110 and is stored therein. The image accumulated in the decoded picture buffer 112 is supplied to the motion parallax prediction/compensation unit 115 or the intra prediction unit 114 through the selection unit 113 as a reference image.

In Step S114, the intra prediction unit 114 performs an intra prediction process of the intra prediction mode.

In Step S115, the reference list generating unit 122 generates a reference list that is referred to when the motion parallax prediction/compensation unit 115 predicts a current image. The process of generating this reference list will be described later in detail with reference to FIG. 12.

By the process of Step S115, the temporal list that is a temporary list used when the reference list is generated is generated by inserting reference images that can be referred to in the view direction among a plurality of reference images that can be referred to in the time direction. Then, a reference list is generated based on the generated temporal list.

In Step S116, the motion parallax prediction/compensation unit 115 performs an inter motion parallax prediction process in which a motion parallax prediction of the inter prediction mode or a motion parallax compensation is performed by using the reference image of a reference image index represented by the reference list generated by the process of Step S115.

In Step S117, the selection unit 116 determines an optimal prediction mode based on cost function values output from the intra prediction unit 114 and the motion parallax prediction/compensation unit 115. In other words, the selection unit 116 selects either the predicted image generated by the intra prediction unit 114 or the predicted image generated by the motion parallax prediction/compensation unit 115.

In addition, selection information representing which predicted image is selected is supplied to the intra prediction unit 114 or the motion parallax prediction/compensation unit 115 of which the predicted image has been selected. In a case where the predicted image of the optimal intra prediction mode is selected, the intra prediction unit 114 supplies information (in other words, intra prediction mode information) representing the optimal intra prediction mode to the lossless encoding unit 106.

In a case where the predicted image of the optimal inter prediction mode is selected, the motion parallax prediction/compensation unit 115 outputs information representing the optimal inter prediction mode and information according to the optimal inter prediction mode as is necessary to the lossless encoding unit 106. As the information according to the optimal inter prediction mode, motion vector information, parallax vector information, flag information, reference frame information, or the like may be provided.

In Step S118, the lossless encoding unit 106 codes the transform coefficient quantized by the process of Step S106. In other words, for a differential image (in the case of the inter prediction, a secondary differential image), lossless coding such as variable-length coding or arithmetic coding is performed.

In addition, the lossless encoding unit 106 adds the information relating to the prediction mode of the prediction image that is selected by the process of Step S117 to the coded data acquired by coding the differential image. In other words, the lossless encoding unit 106 adds the intra prediction mode information supplied from the intra prediction unit 114, the information according to the optimal inter prediction mode supplied from the motion parallax prediction/compensation unit 115, or the like to the coded data.

In Step S119, the accumulation buffer 107 accumulates the coded data output from the lossless encoding unit 106.

The coded data accumulated in the accumulation buffer 107 is appropriately read and is transmitted to the decoding side through a transmission line.

In Step S120, the rate control unit 117 controls the rate of the quantization operation performed by the quantization unit 105 based on the compressed image accumulated in the accumulation buffer 107 by the process of Step S119 such that overflow or underflow does not occur.

When the process of Step S120 ends, the coding process ends.

[Flow of Reference List Generating Process]

Next, an example of the flow of the reference list generating process performed in Step S115 represented in FIG. 11 will be described with reference to a flowchart represented in FIG. 12. By performing this process, the reference lists according to the present technology 1 described above with reference to FIG. 5 are generated. This process is performed only in a case where the decoded image (in other words, a current image for a prediction) is a P picture or a B picture.

Figure 11:
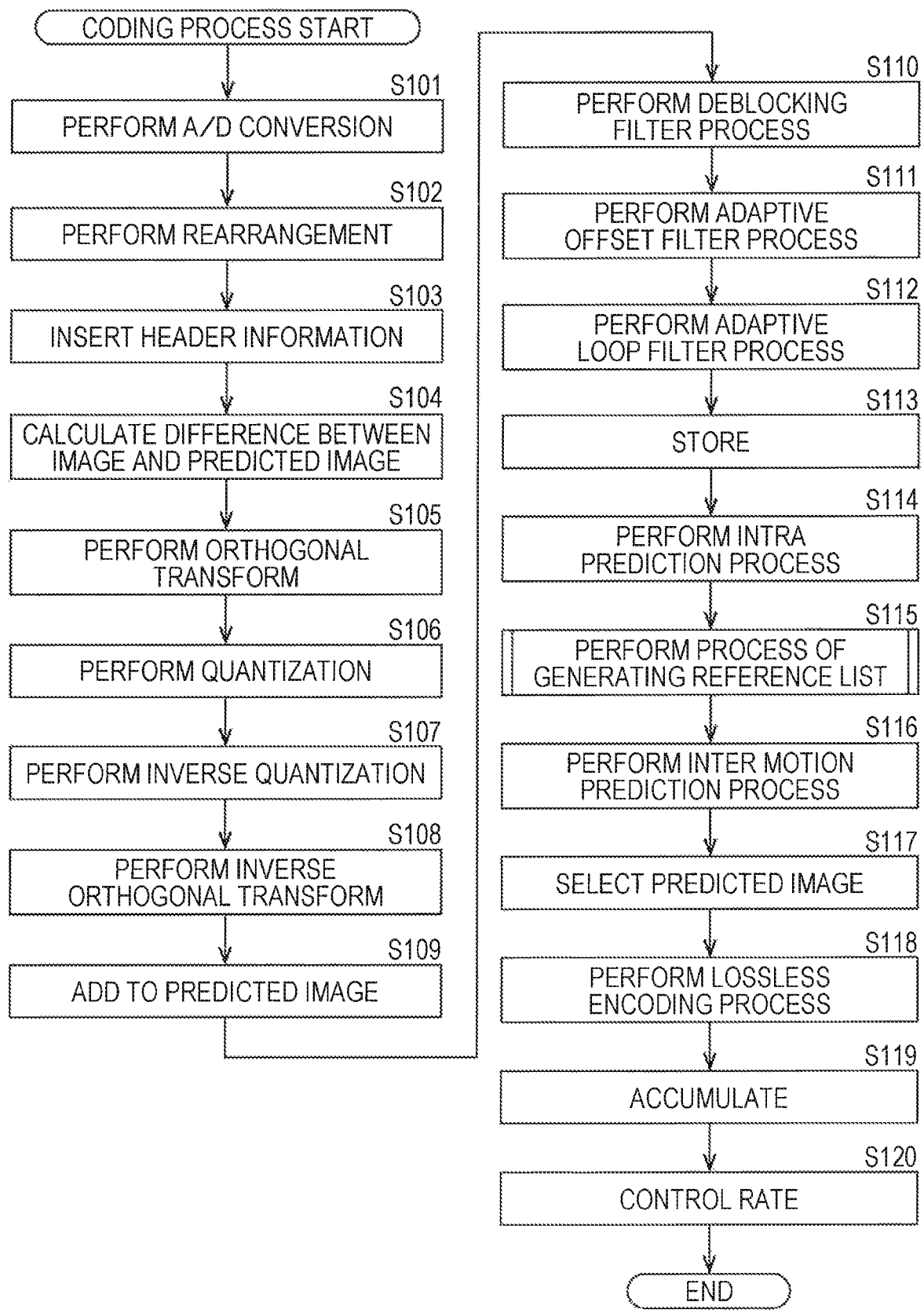
FIG. 11 is a flowchart that illustrates an example of the flow of a coding process.
Figure 12:
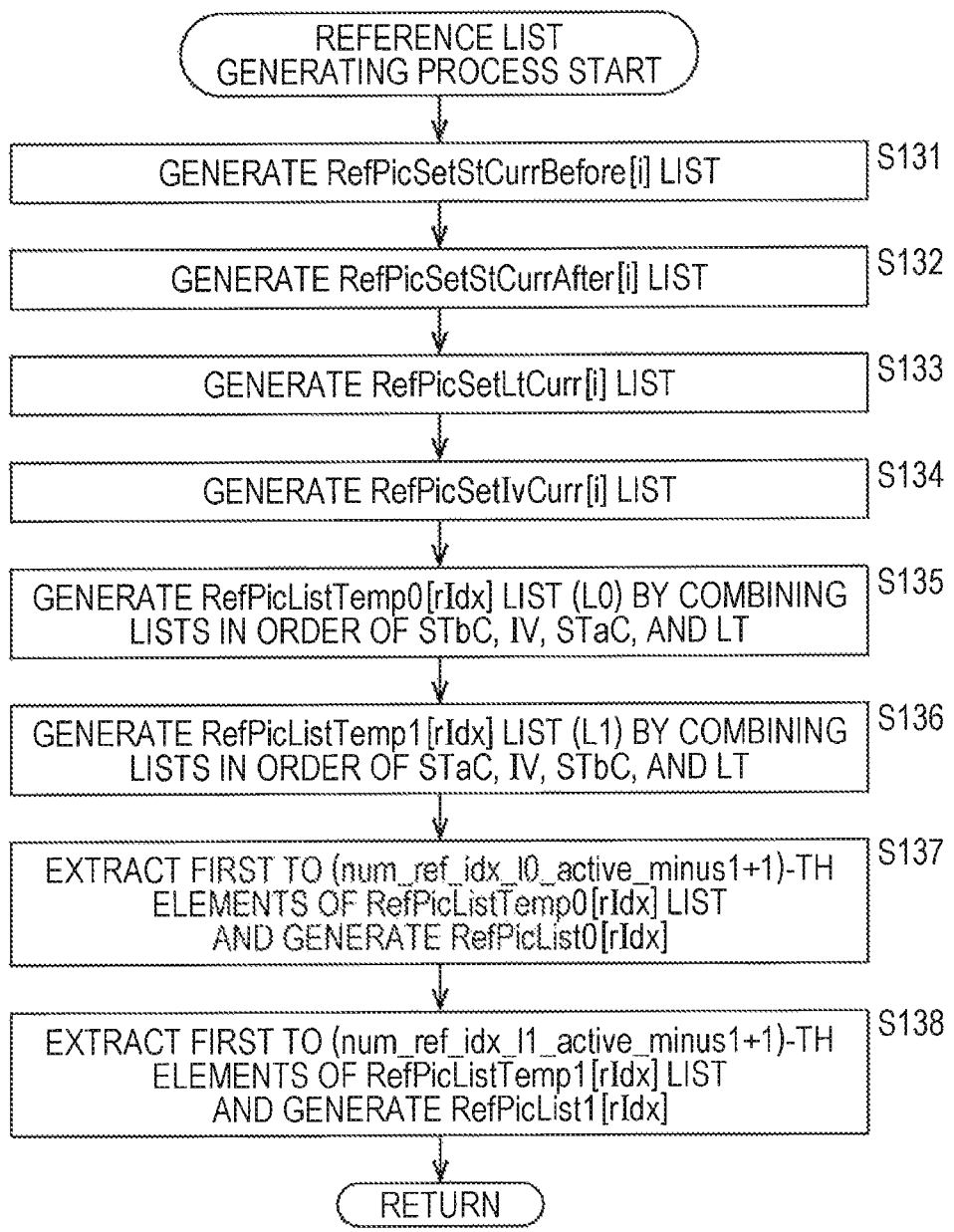
FIG. 12 is a flowchart that illustrates an example of the flow of a reference list generating process.

In Step S103 represented in FIG. 11 described above, information such as the VPS, the SPS (including the RPS) and the slice header of the decoded image is supplied from the syntax processing unit 121 to the reference list generating unit 122. The flag used_by_curr of the short-term reference image is set in the slice header or the RPS supplied from the syntax processing unit 121. The flag used_by_curr of the long-term reference image is set in the slice header or the SPS.

In Step S131, the reference image setting unit 131 of the reference list generating unit 122 sets short-term (before) reference images (STbC) by referring to the time information (in other words, the POC information) of the reference image supplied from the decoded picture buffer 112 and the flag used_by_curr of the short-term reference image of the slice header or the RPS and generates a list RefPicSetStCurrBefore[i].

In Step S132, the reference image setting unit 131 sets short-term (after) reference images (STaC) by referring to the time information of the reference image supplied from the decoded picture buffer 112 and the flag used_by_curr of the short-term reference image of the slice header or the RPS and generates a list RefPicSetStCurrAfter[i].

In Step S133, the reference image setting unit 131 sets long-term reference images (LT) by referring to the time information of the reference image supplied from the decoded picture buffer 112 and the flag used_by_curr of the long-term reference image of the slice header or the SPS and generates a list RefPicSetLtCurr[i].

In Step S134, the reference image setting unit 131 sets inter-view reference images (IV) by referring to the view information of the reference image supplied from the decoded picture buffer 112 and generates a list RefPicSetIvCurr[i].

In Step S135, the temporal list generating unit 132 combines four types of lists set by the reference image setting unit 131 in order of STbC, IV, STaC, and LT, thereby generating a temporal list (RefPicListTemp0[rIdx]) of L0.

In other words, only reference images, of which the flag used_by_curr is "1" in the lists of four types described above are combined in order of STbC, IV, STaC, and LT, whereby a temporal list of L0 is generated. In addition, at that time, all the inter-view reference images (IV) are added.

In Step S136, the temporal list generating unit 132 combines four types of lists set by the reference image setting unit 131 in order of STaC, IV, STbC, and LT, thereby generating a temporal list (RefPicListTemp1[rIdx]) of L1.

In other words, only reference images of which the flag used_by_curr is "1" are combined in order of STaC, IV, STbC, and LT, whereby a temporal list of L1 is generated. In addition, at that time, while all the inter-view reference images (IV) are added, the order, as described above with reference to FIG. 8, may be configured to be reverse order of that of the direction L0.

The numbers num_ref_idx_l0_active_minus1 and num_ref_idx_l1_active_minus1 are set in the slice header or the SPS supplied from the syntax processing unit 121.

In Step S137, the reference image list generating unit 133 extracts the first to the (num_ref_idx_l0_active_minus1+1)-th elements of the temporal list (RefPicListTemp0[rIdx]) of L0 and generates a reference list (RefPicList0[rIdx]) of L0.

In Step S138, the reference image list generating unit 133 extracts the first to the (num_ref_idx_l1_active_minus1+1)-th elements of the temporal list (RefPicListTemp1[rIdx]) of L1 and generates a reference list (RefPicList1[rIdx]) of L1.

As above, the inter-view images are inserted between the short-term (before) reference images and the short-term (after) reference images, whereby reference lists described above with reference to FIG. 5 are generated.

[Another Flow of Reference List Generating Process]

Figure 13:
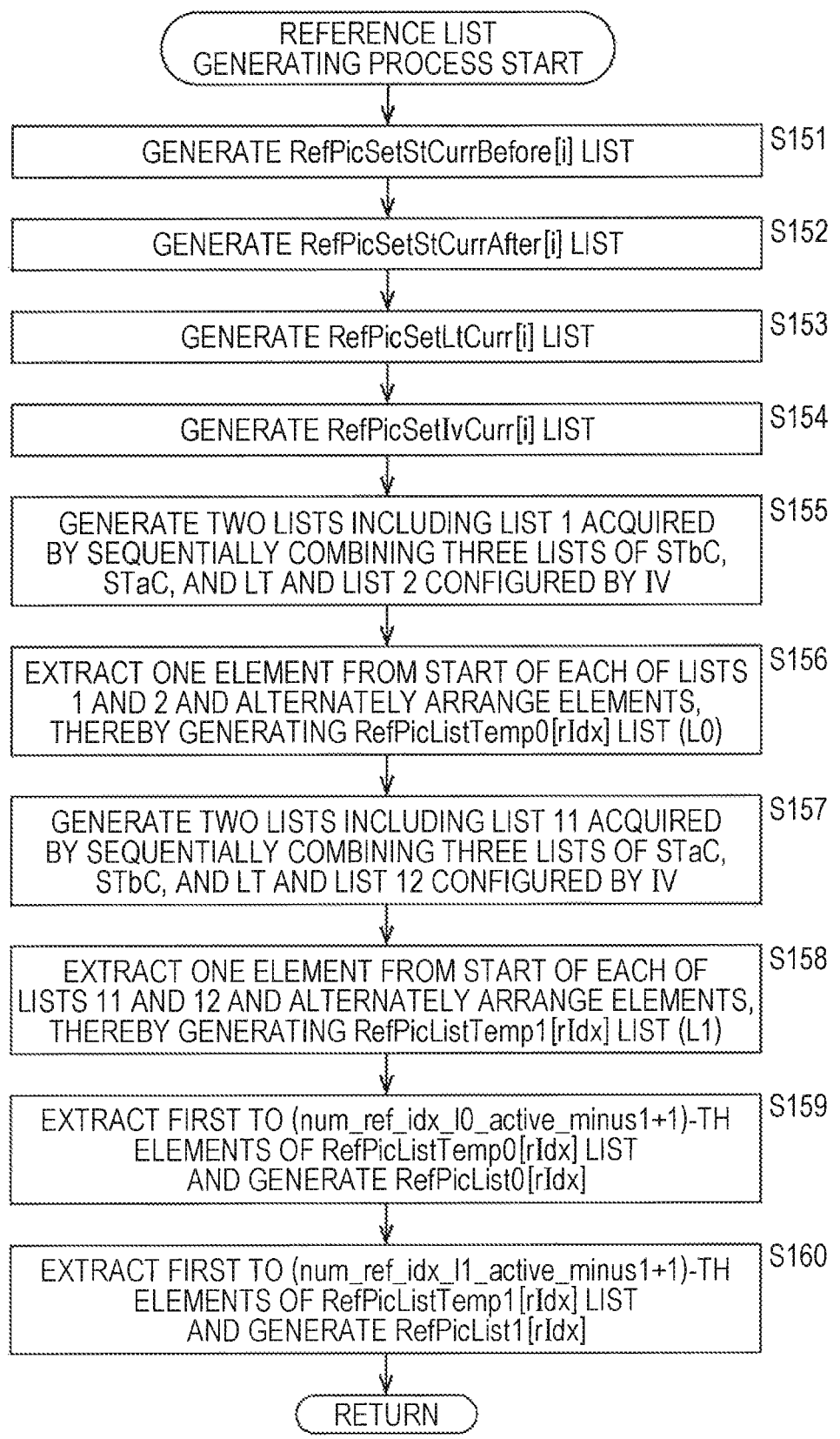
FIG. 13 is a flowchart that illustrates another example of the flow of the reference list generating process.

Next, an example of the flow of the reference list generating process performed in Step S115 represented in FIG. 11 will be described with reference to a flowchart represented in FIG. 13. By performing this process, the reference lists according to the present technology 2 described above with reference to FIG. 6 are generated. This process is performed only in a case where the decoded image (in other words, a current image for a prediction) is a P picture or a B picture.

In Step S103 represented in FIG. 11 described above, information such as the VPS, the SPS (including the RPS) and the slice header of the decoded image is supplied from the syntax processing unit 121 to the reference list generating unit 122. The flag used_by_curr of the short-term reference image is set in the slice header or the RPS supplied from the syntax processing unit 121. The flag used_by_curr of the long-term reference image is set in the slice header or the SPS.

In Step S151, the reference image setting unit 131 of the reference list generating unit 122 sets short-term (before) reference images (STbC) by referring to the time information (in other words, the POC information) of the reference image supplied from the decoded picture buffer 112 and the flag used_by_curr of the short-term reference image of the slice header or the RPS and generates a list RefPicSetStCurrBefore[i].

In Step S152, the reference image setting unit 131 sets short-term (after) reference images (STaC) by referring to the time information of the reference image supplied from the decoded picture buffer 112 and the flag used_by_curr of the short-term reference image of the slice header or the RPS and generates a list RefPicSetStCurrAfter[i].

In Step S153, the reference image setting unit 131 sets long-term reference images (LT) by referring to the time information of the reference image supplied from the decoded picture buffer 112 and the flag used_by_curr of the long-term reference image of the slice header or the SPS and generates a list RefPicSetLtCurr[i].

In Step S154, the reference image setting unit 131 sets inter-view reference images (IV) by referring to the view information of the reference image supplied from the decoded picture buffer 112 and generates a list RefPicSetIvCurr[i].

In Step S155, the temporal list generating unit 132 generates two lists including a list 1 acquired by sequentially combining three lists of STbC, STaC, and LT set by the reference image setting unit 131 and a list 2 configured by the IV. In other words, only reference images, of which the flag used_by_curr is "1" are combined in order of STbC, STaC, and LT, whereby the list 1 is generated. In addition, the list 2 is generated by adding all the IV of the list RefPicSetIvCurr[i] to the list.

In Step S156, the temporal list generating unit 132 extracts one element from the start of each of the lists 1 and 2 generated in Step S155 and alternately aligns the extracted elements, thereby generating a temporal list (RefPicListTemp0[rIdx]) of L0.

In Step S157, the temporal list generating unit 132 generates two lists including a list 11 acquired by sequentially combining three lists STaC, STbC, and LT set by the reference image setting unit 131 and a list 12 configured by the IV. In other words, only the reference images of which the flag used_by_curr is "1" are combined in order of STaC, STbC, and LT, whereby the list 11 is generated. In addition, while the list 12 is generated by adding all the IV of the list RefPicSetIvCurr[i], at that time, as described above with reference to FIG. 8, the inter-view reference images may be added in order that is reverse order of the order of the direction L0.

In Step S158, the temporal list generating unit 132 extracts one element from the start of each of the lists 11 and 12 generated in Step S155 and alternately aligns the extracted elements, thereby generating a temporal list (RefPicListTemp1[rIdx]) of L1.

The numbers num_ref_idx_l0_active_minus1 and num_ref_idx_l1_active_minus1 are set in the slice header or the SPS supplied from the syntax processing unit 121.

In Step S159, the reference image list generating unit 133 extracts the first to the (num_ref_idx_l0_active_minus1+1)-th elements of the temporal list (RefPicListTemp0[rIdx]) of L0 and generates a reference list (RefPicList0[rIdx]) of L0.

In Step S160, the reference image list generating unit 133 extracts the first to the (num_ref_idx_l1_active_minus1+1)-th elements of the temporal list (RefPicListTemp1[rIdx]) of L1 and generates a reference list (RefPicList1[rIdx]) of L1.

As above, in the generation of the temporal lists, the reference images disposed in the time direction and the reference images disposed in the view direction are alternately arranged, whereby the reference lists described above with reference to FIG. 6 are generated.

In addition, while the example of two types of reference lists has been described in the description presented above, for example, it may be configured such that the coding side transmits a reference list selection flag of one bit representing a selected reference list to the decoding side, and the reference list according to the reference list selection flag is generated on the decoding side. This reference list selection flag, for example, may be configured to be transmitted for each slice.

For example, as described above with reference to FIG. 7, a more appropriate list is different depending on the degree of the temporal correlation or the degree of the inter-view correlation in the sequence. Thus, by transmitting the reference list selection flag in this way, for example, the coding efficiency can be improved more than that of a case where the change command is transmitted using an image or that of a case where the syntax is transmitted each time as disclosed in Non-Patent Document 2.

2. Second Embodiment

[Image Decoding Device]

Figure 14:
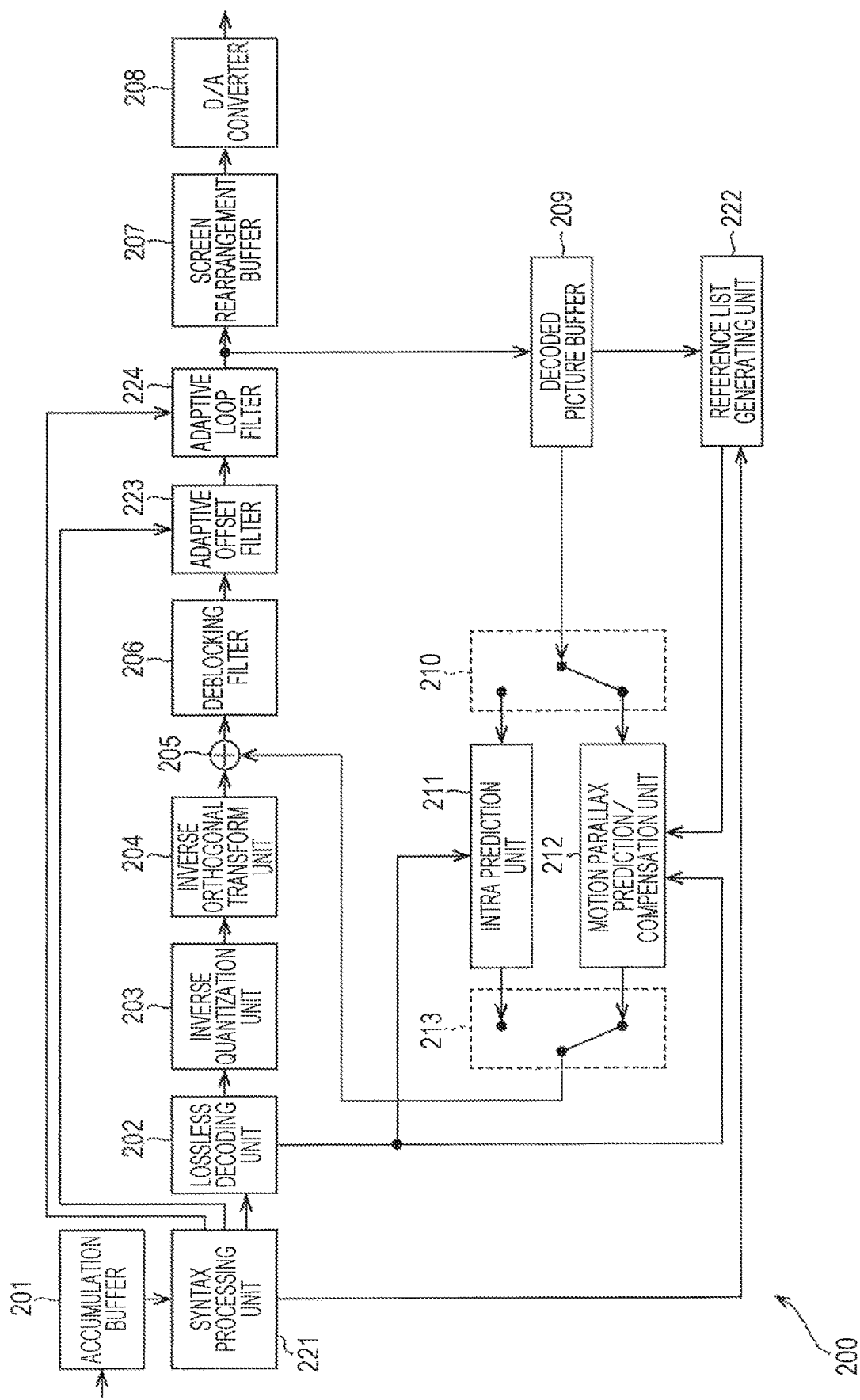
FIG. 14 is a block diagram that illustrates an example of the main configuration of an image decoding device.

FIG. 14 illustrates the configuration of an image decoding device according to an embodiment as an image processing device to which the present disclosure is applied. An image decoding device 200 illustrated in FIG. 14 is a decoding device that corresponds to the image encoding device 100 illustrated in FIG. 1.

The coded data coded by the image encoding device 100 is assumed to be transmitted to the image decoding device 200 corresponding to the image encoding device 100 through a predetermined transmission line and is decoded by using the HEVC system or the like.

As illustrated in FIG. 14, the image decoding device 200 includes: an accumulation buffer 201; a lossless decoding unit 202; an inverse quantization unit 203; an inverse orthogonal transform unit 204; a calculation unit 205; a deblocking filter 206; a screen rearrangement buffer 207; and a D/A converter 208. In addition, the image decoding device 200 includes: a decoded picture buffer 209; a selection unit 210; an intra prediction unit 211; a motion parallax prediction/compensation unit 212; and a selection unit 213.

Furthermore, the image decoding device 200 includes: a syntax processing unit 221; a reference list generating unit 222; an adaptive offset filter 223; and an adaptive loop filter 224.

The accumulation buffer 201 accumulates coded data that is transmitted. This coded data is coded by the image encoding device 100. The syntax processing unit 221 acquires a VPS, an SPS, a slice header, and the like from the coded data read from the accumulation buffer 201 at predetermined timing and supplies each header information that has been acquired to the lossless decoding unit 202 together with the coded data. In addition, the syntax processing unit 221 supplies the header information and the like that have been acquired to the reference list generating unit 222.

The lossless decoding unit 202 decodes the coded data supplied from the syntax processing unit 221 by using a system corresponding to the coding system of the lossless encoding unit 106 illustrated in FIG. 1. The inverse quantization unit 203 performs inverse quantization of coefficient data (quantization coefficient) acquired by the decoding process performed by the lossless decoding unit 202 by using a system corresponding to the quantization system of the quantization unit 105 illustrated in FIG. 1. In other words, the inverse quantization unit 203 performs inverse quantization of the quantization coefficient by using a method similar to that of the inverse quantization unit 108 illustrated in FIG. 1 by using the quantization parameter supplied from the image encoding device 100.

The inverse quantization unit 203 supplies the coefficient data, in other words, the orthogonal transform coefficient for which the inverse quantization process has been performed to the inverse orthogonal transform unit 204. The inverse orthogonal transform unit 204, by using a system corresponding to the orthogonal transform system of the orthogonal transform unit 104 illustrated in FIG. 1, performs an inverse orthogonal transform of the orthogonal transform coefficient, thereby acquiring decoded residual data corresponding to the residual data before the orthogonal transform process performed by the image encoding device 100.

The decoded residual data that is acquired through the inverse orthogonal transform is supplied to the calculation unit 205. In addition, a predicted image is supplied to the calculation unit 205 through the selection unit 213 from the intra prediction unit 211 or the motion parallax prediction/compensation unit 212.

The calculation unit 205 adds the decoded residual data and the predicted image, thereby acquiring decoded image data corresponding to the image data before the subtraction of the predicted image that is performed by the calculation unit 103 of the image encoding device 100. The calculation unit 205 supplies the decoded image data to the deblocking filter 206.

The deblocking filter 206 appropriately performs a deblocking filter process, thereby eliminating a block distortion of the decoded image. The deblocking filter 206 supplies an image acquired as a result thereof to the adaptive offset filter 223.

The adaptive offset filter 223 includes a buffer that sequentially stores an offset supplied from the syntax processing unit 221. In addition, the adaptive offset filter 223 performs an adaptive offset filter process for the image after the adaptive deblocking filter process performed by the deblocking filter 206 based on the offset filter information supplied from the syntax processing unit 221 for each LCU.

More specifically, in a case where the storage flag included in the offset filter information is "0", the adaptive offset filter 223 performs an adaptive offset filter process of a type represented by the type information for the image after the deblocking filter process performed in units of LCUs by using the offset included in the offset filter information.

On the other hand, in a case where the storage flag included in the offset filter information is "1", the adaptive offset filter 223 reads an offset stored at a position represented by the index included in the offset filter information for the image after the deblocking filter process performed in units of LCUs. Then, the adaptive offset filter 223 performs an adaptive offset filter process of a type represented by the type information by using the read offset. The adaptive offset filter 223 supplies the image after the adaptive offset filter process to the adaptive loop filter 224.

The adaptive loop filter 224 performs an adaptive loop filter process for the image supplied from the adaptive offset filter 223 for each LCU by using the filter coefficient supplied from the syntax processing unit 221. The adaptive loop filter 224 supplies an image acquired as a result thereof to the screen rearrangement buffer 207.

The screen rearrangement buffer 207 performs a screen rearrangement process. In other words, the order of frames that are rearranged for the coding order by the screen rearrangement buffer 102 illustrated in FIG. 1 is rearranged to be the original display order. The D/A converter 208 performs a D/A conversion of the image supplied from the screen rearrangement buffer 207 and outputs the converted image to a display not illustrated in the figure so as to be displayed thereon.

In addition, the output of the adaptive loop filter 224 is supplied to the decoded picture buffer 209.

The decoded picture buffer 209, the selection unit 210, the intra prediction unit 211, the motion parallax prediction/compensation unit 212, and the selection unit 213 respectively correspond to the decoded picture buffer 112, the selection unit 113, the intra prediction unit 114, the motion parallax prediction/compensation unit 115, and the selection unit 116 of the image encoding device 100.

The selection unit 210 reads an image for which inter processing is performed and a reference image from the decoded picture buffer 209 and supplies the read images to the motion parallax prediction/compensation unit 212. In addition, the selection unit 210 reads an image used for the intra prediction from the decoded picture buffer 209 and supplies the read image to the intra prediction unit 211.

Information representing an intra prediction mode acquired from the header information and the like are appropriately supplied to the intra prediction unit 211 from the lossless decoding unit 202. The intra prediction unit 211, based on this information, generates a predicted image based on the reference image acquired from the decoded picture buffer 209 and supplies the generated predicted image to the selection unit 213.

Information (the prediction mode information, the motion vector information, the parallax vector information, various parameters, and the like) acquired from the header information is supplied to the motion parallax prediction/compensation unit 212 from the lossless decoding unit 202. In addition, a reference image index assigned by the reference list generating unit 222 is supplied to the motion parallax prediction/compensation unit 212.

The motion parallax prediction/compensation unit 212 generates a predicted image from the reference image acquired from the decoded picture buffer 209 based on such information supplied from the lossless decoding unit 202 and the reference image index represented in the reference list generated by the reference list generating unit 222. The motion parallax prediction/compensation unit 212 supplies the generated predicted image to the selection unit 213.

The selection unit 213 selects the predicted image generated by the motion parallax prediction/compensation unit 212 or the intra prediction unit 211 and supplies the selected predicted image to the calculation unit 205.

The reference list generating unit 222 is basically configured to be similar to the reference list generating unit 122 of the image encoding device 100. The reference list generating unit 222 generates a reference list that is referred to when the motion parallax prediction/compensation unit 212 predicts a current image by using information (the POC information or the view information) of the reference image that is accumulated in the decoded picture buffer 209. At that time, the reference list generating unit 122 generates the reference list by inserting reference images that can be referred to in the view direction among a plurality of reference images that can be referred to in the time direction.

In other words, the reference list generating unit 222 generates a temporal list that is a temporary list used when a reference list is generated by inserting reference images that can be referred to in the view direction among a plurality of reference images that can be referred to in the time direction. Then, the reference list generating unit 222 generates the reference list based on the generated temporal list.

[Configuration Example of Reference List Generating Unit]

Figure 15:
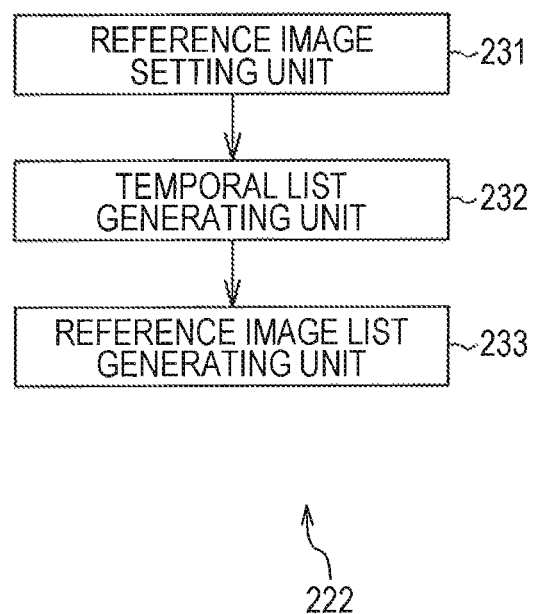
FIG. 15 is a block diagram that illustrates an example of the configuration of a reference list generating unit illustrated in FIG. 14.

FIG. 15 is a block diagram that illustrates an example of the configuration of the reference list generating unit illustrated in FIG. 14.

In the example illustrated in FIG. 15, the reference list generating unit 222 is configured to include: a reference image setting unit 231; a temporal list generating unit 232; and a reference image list generating unit 233.

The reference image setting unit 231 sets short-term (before) reference images by referring to the time information (in other words, the POC information) of the reference image that is supplied from the decoded picture buffer 209 and the flag used_by_curr of the short-term reference image that is set in the slice header or the RPS supplied from the syntax processing unit 221 and generates a short-term (before) reference image list (RefPicSetStCurrBefore[i]). The reference image setting unit 231 sets short-term (after) reference images by referring to the time information of the reference image that is supplied from the decoded picture buffer 209 and the flag used_by_curr of the short-term reference image that is set in the slice header or the RPS supplied from the syntax processing unit 221 and generates a short-term (after) reference image list (RefPicSetStCurrAfter[i]).

The reference image setting unit 231 sets long-term reference images by referring to the time information of the reference image that is supplied from the decoded picture buffer 209 and the flag used_by_curr of the long-term reference image that is set in the slice header or the SPS, and generates a long-term reference image list (RefPicSetLtCurr[i]). The reference image setting unit 231 sets inter-view reference images (RefPicSetIvCurr[i]) by referring to the view information of the reference information supplied from the decoded picture buffer 209 and generates a list thereof.

The temporal list generating unit 232 combines the lists set by the reference image setting unit 231 in predetermined order according to the present technology described above, thereby generating temporal lists (RefPicListTemp0[rIdx] and RefPicListTemp1[rIdx]) of L0 and L1.

The reference image list generating unit 233 refers to the numbers num_ref_idx_l0_active_minus1 and num_ref_idx_l1_active_minus1 set in the slice header or the SPS that is supplied from the syntax processing unit 221. The reference image list generating unit 233 extracts reference images corresponding to the number num_ref_idx_l0_active_minus1 and the number num_ref_idx_l1_active_minus1 from the temporal lists of L0/L1 generated by the temporal list generating unit 232 and adds the extracted reference images, thereby generating reference lists of L0/L1.

The reference lists of L0/L1 generated by the reference image list generating unit 233 are referred to by the motion parallax prediction/compensation unit 212.

[Flow of Decoding Process]

Next, the flow of each process performed by the image decoding device 200 as above will be described. First, an example of the flow of the decoding process will be described with reference to a flowchart represented in FIG. 16.

When a decoding process is started, in Step S201, the accumulation buffer 201 accumulates coded data that is transmitted thereto. In Step S202, the syntax processing unit 221 acquires header information from the coded data read at predetermined timing from the accumulation buffer 201. The syntax processing unit 221 supplies each acquired header information to the lossless decoding unit 202 together with the coded data. In addition, the syntax processing unit 221 supplies the acquire header information (including the VPS, the SPS (including the RPS), and the slice header) and the like to the reference list generating unit 222.

In Step S203, the lossless decoding unit 202 decodes the coded data that is supplied from the syntax processing unit 221. In other words, an I picture, a P picture, and a B picture coded by the lossless encoding unit 106 illustrated in FIG. 1 are decoded.

At this time, information of the motion vector information, the parallax vector information, the reference frame information, the prediction mode information (the intra prediction mode or the inter prediction mode), the flag, the quantization parameter, and the like is acquired from each header information.

In a case where the prediction mode information is the intra prediction mode information, the prediction mode information is supplied to the intra prediction unit 211. In a case where the prediction mode information is the inter prediction mode information, the prediction mode information and the corresponding motion vector information are supplied to the motion parallax prediction/compensation unit 212.

In Step S204, the inverse quantization unit 203 performs inverse quantization of the quantized orthogonal transform coefficient that is acquired through the decoding process performed by the lossless decoding unit 202. In Step S205, the inverse orthogonal transform unit 204 performs an inverse orthogonal transform for the orthogonal transform coefficient that is acquired through the inverse quantization process performed by the inverse quantization unit 203 by using a method corresponding to the orthogonal transform unit 104 illustrated in FIG. 1. In this way, the differential information corresponding to the input (the output of the calculation unit 103) of the orthogonal transform unit 104 illustrated in FIG. 1 is decoded.

In Step S206, the calculation unit 205 adds the predicted image to the differential information acquired by the process of Step S205. Accordingly, the original image data is decoded.

In Step S207, the deblocking filter 206 appropriately filters the decoded image that is acquired by the process of Step S206. Accordingly, a block distortion is appropriately eliminated from the decoded image. The deblocking filter 206 supplies an image acquired as a result thereof to the adaptive offset filter 223.

In Step S208, the adaptive offset filter 223 performs an adaptive offset filter process for the image after the deblocking filter process performed by the deblocking filter 206 for each LCU based on the offset filter information supplied from the syntax processing unit 221. The adaptive offset filter 223 supplies an image after the adaptive offset filter process to the adaptive loop filter 224.

In Step S209, the adaptive loop filter 224 performs an adaptive loop filter process for the image supplied from the adaptive offset filter 223 for each LCU by using the filter coefficient supplied from the syntax processing unit 221. The adaptive loop filter 224 supplies an image acquired as a result thereof to the decoded picture buffer 209 and the screen rearrangement buffer 207.

In Step S210, the decoded picture buffer 209 stores the filtered decoded image.

In Step S211, the reference list generating unit 222 generates a reference list to be referred to when the motion parallax prediction/compensation unit 212 predicts a current image. This process of generating a reference list will be described later in detail with reference to FIG. 17.

Through the process of Step S211, a temporal list that is a temporary list used when the reference list is generated is generated by inserting reference images that can be referred to in the view direction among a plurality of reference images that can be referred to in the time direction. Then, based on the generated temporal list, reference lists are generated.

In Step S212, the intra prediction unit 211 or the motion parallax prediction/compensation unit 212 performs a prediction process of each image in correspondence with the prediction mode information supplied from the lossless decoding unit 202.

In other words, in a case where the intra prediction mode information is supplied from the lossless decoding unit 202, the Intra prediction unit 211 performs an intra prediction process of the intra prediction mode. On the other hand, in a case where the inter prediction mode information is supplied from the lossless decoding unit 202, the motion parallax prediction/compensation unit 212 performs a motion parallax prediction/compensation process of the inter prediction mode by using a reference image of a reference image index represented by the reference list generated by the process of Step S211.

In Step S213, the selection unit 213 selects a predicted image. In other words, the predicted image generated by the intra prediction unit 211 or the predicted image generated by the motion parallax prediction/compensation unit 212 is supplied to the selection unit 213. The selection unit 213 selects the side to which the predicted image is supplied and supplies the predicted image to the calculation unit 205. This predicted image is added to the differential information by the process of Step S206.

In Step 3214, the screen rearrangement buffer 207 rearranges the frames of the decoded image data. In other words, the order of frames of the decoded image data that is rearranged for coding by the screen rearrangement buffer 102 (FIG. 1) of the image encoding device 100 is rearranged in the original display order.

In Step S215, the D/A converter 208 performs D/A conversion of the decoded image data of which frames are rearranged by the screen rearrangement buffer 207. This decoded image data is output to a display not illustrated in the figure, whereby a corresponding image is displayed. When the process of Step S215 ends, the decoding process ends.

[Flow of Reference List Generating Process]

Next, an example of the flow of the reference list generating process performed in Step S211 represented in FIG. 16 will be described with reference to a flowchart illustrated in FIG. 17. In addition, by performing this process, the reference lists according to the present technology 1 described above with reference to FIG. 5 are generated. This process is performed only in a case where the decoded image (in other words, a current image for a prediction) is a P picture or a B picture.

Figure 16:
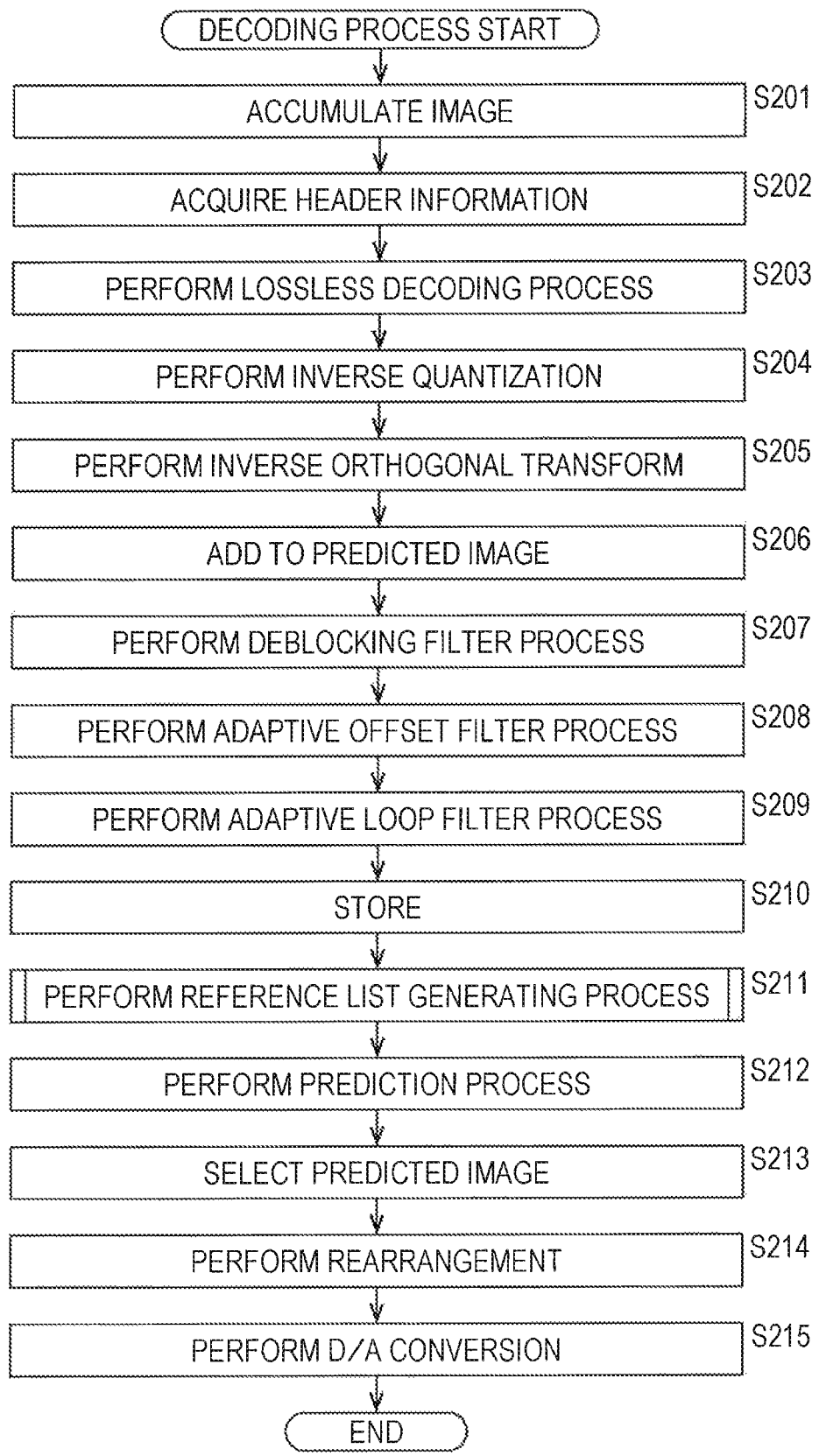
FIG. 16 is a flowchart that illustrates an example of the process of a decoding process.
Figure 17:
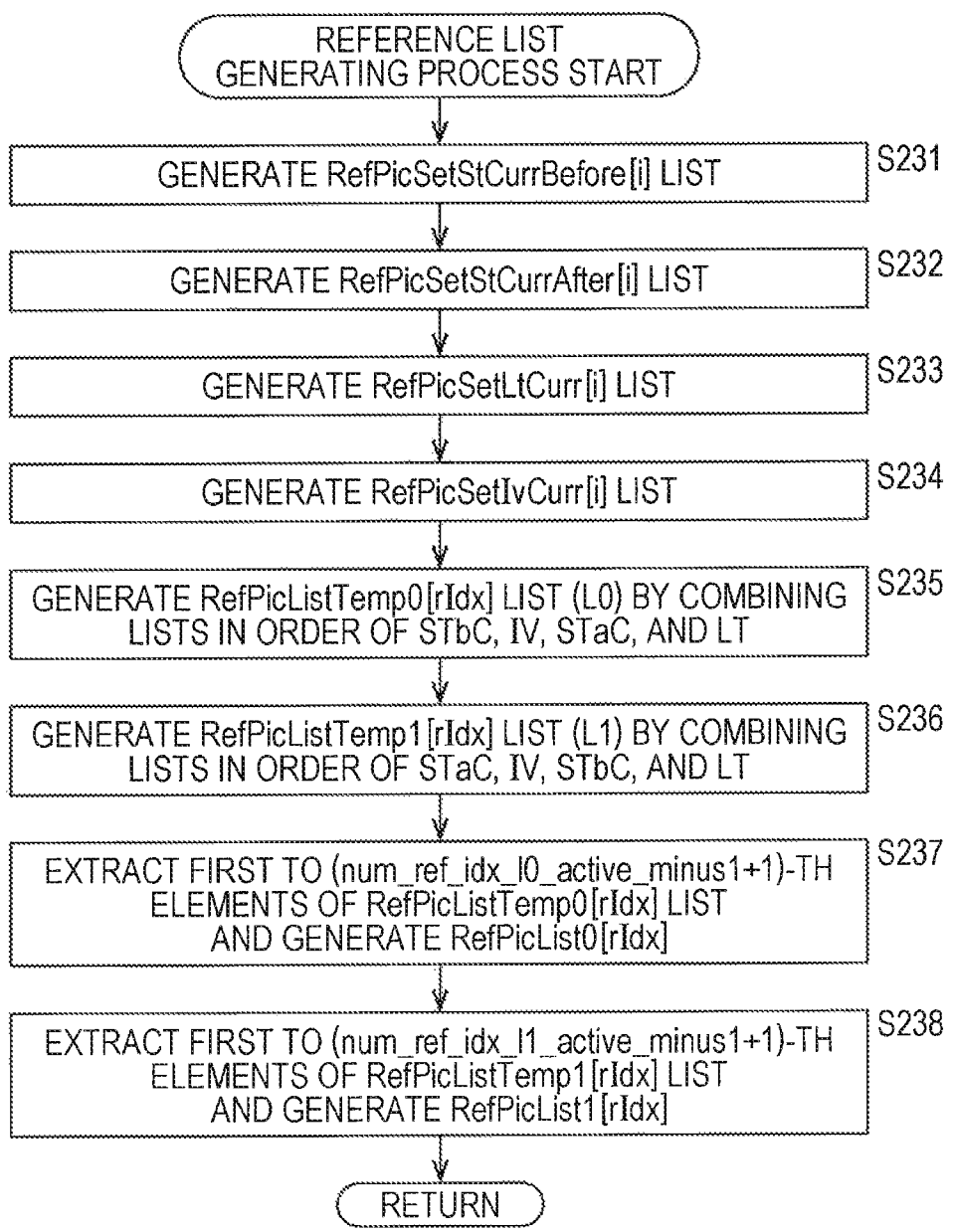
FIG. 17 is a flowchart that illustrates an example of the flow of a reference list generating process.

In Step S203 represented in FIG. 16 described above, information such as the VPS, the SPS (including the RPS), and the slice header of the decoded image is supplied from the syntax processing unit 221 to the reference list generating unit 222. The flag used_by_curr of the short-term reference image is set in the slice header or the RPS supplied from the syntax processing unit 221. The flag used_by_curr of the long-term reference image is set in the slice header or the SPS.

In Step S231, the reference image setting unit 231 of the reference list generating unit 222 sets short-term (before) reference images (STbC) by referring to the time information (in other words, the POC information) of the reference image supplied from the decoded picture buffer 209 and the flag used_by_curr of the short-term reference image of the slice header or the RPS and generates a list RefPicSetStCurrBefore[i].

In Step S232, the reference image setting unit 231 sets short-term (after) reference images (STaC) by referring to the time information of the reference image supplied from the decoded picture buffer 209 and the flag used_by_curr of the short-term reference image of the slice header or the RPS and generates a list RefPicSetStCurrAfter[i].

In Step S233, the reference image setting unit 231 sets long-term reference images (RefPicSetLtCurr[i]:LT) by referring to the time information (in other word, the POC information) of the reference image supplied from the decoded picture buffer 209 and the flag used_by_curr of the long-term reference image of the slice header or the SPS and generates a list RefPicSetLtCurr[i].

In Step S234, the reference image setting unit 231 sets inter-view reference images (IV) by referring to the view information of the reference image supplied from the decoded picture buffer 209 and generates a list RefPicSetIvCurr[i].

In Step S235, the temporal list generating unit 232 combines four types of lists set by the reference image setting unit 231 in order of STbC, IV, STaC, and LT, thereby generating a temporal list (RefPicListTemp0[rIdx]) of L0.

In other words, only reference images, of which the flag used_by_curr is "1" in the lists of four types described above are combined in order of STbC, IV, STaC, and LT, whereby a temporal list of L0 is generated. In addition, at that time, all the inter-view reference images (IV) are added.

In Step S236, the temporal list generating unit 232 combines four types of lists set by the reference image setting unit 231 in order of STaC, IV, STbC, and LT, thereby generating a temporal list (RefPicListTemp1[rIdx]) of L1.

In other words, only reference images of which the flag used_by_curr is "1" are combined in order of STaC, IV, STbC, and LT, whereby a temporal list of L1 is generated. In addition, at that time, while all the inter-view reference images (IV) are added, the order, as described above with reference to FIG. 8, may be configured to be reverse order of that of the direction L0.

The numbers num_ref_idx_l0_active_minus1 and num_ref_idx_l1_active_minus1 are set in the slice header or the SPS supplied from the syntax processing unit 221.

In Step S237, the reference image list generating unit 233 extracts the first to the (num_ref_idx_l0_active_minus1+1)-th elements of the temporal list (RefPicListTemp0[rIdx]) of L0 and generates a reference list (RefPicList0[rIdx]) of L0.

In Step S238, the reference image list generating unit 233 extracts the first to the (num_ref_idx_l1_active_minus1+1)-th elements of the temporal list (RefPicListTemp1[rIdx]) of L1 and generates a reference list (RefPicList1[rIdx]) of L1.

As above, the inter-view images are inserted between the short-term (before) reference images and the short-term (after) reference images, whereby reference lists described above with reference to FIG. 5 are generated.

[Another Flow of Reference List Generating Process]

Figure 18:
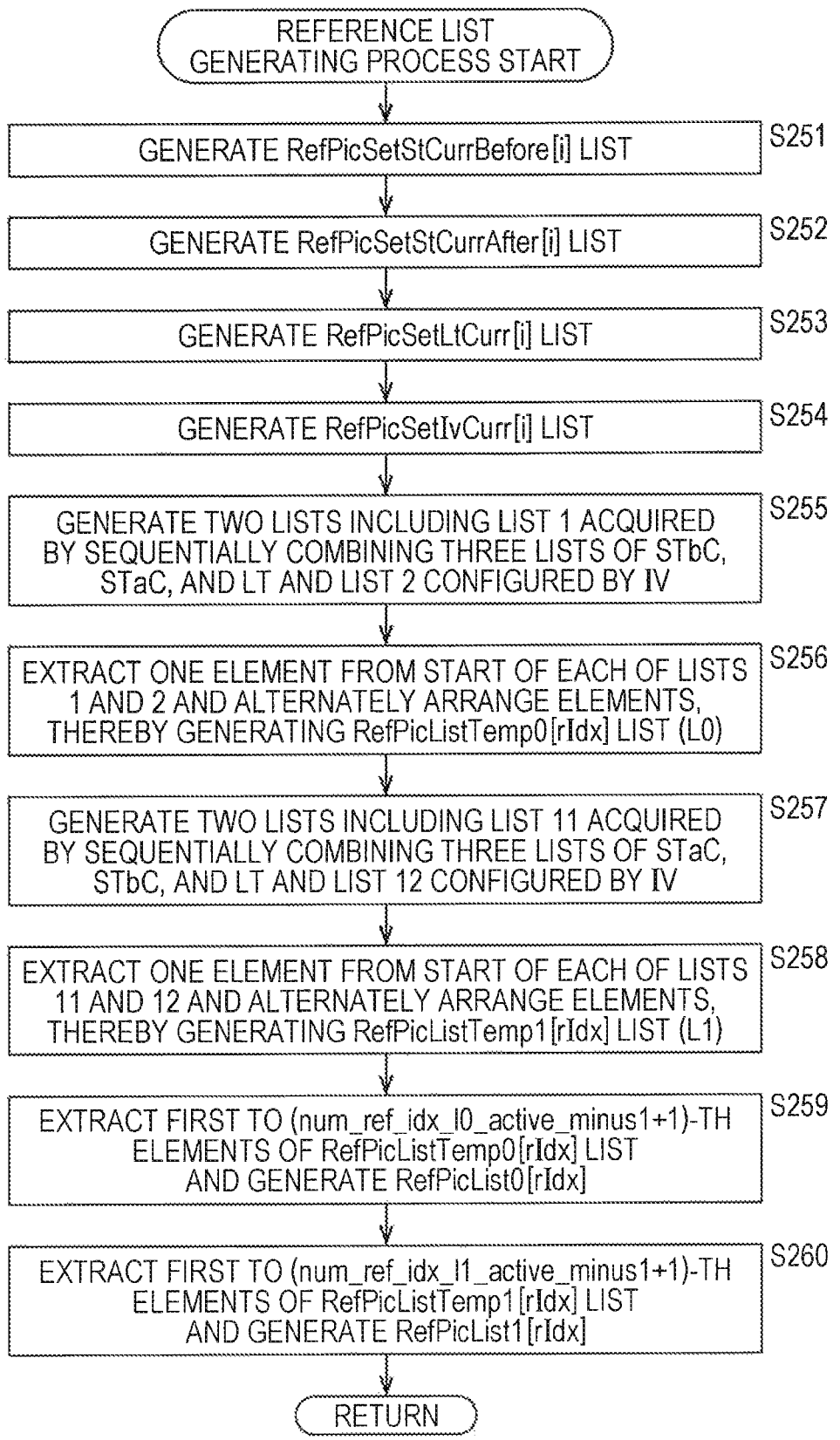
FIG. 18 is a flowchart that illustrates another example of the flow of the reference list generating process.

Next, an example of the flow of the reference list generating process performed in Step S211 represented in FIG. 16 will be described with reference to a flowchart represented in FIG. 18. By performing this process, the reference lists according to the present technology 2 described above with reference to FIG. 6 are generated. This process is performed only in a case where the decoded image (in other words, a current image for a prediction) is a P picture or a B picture.

In Step S203 represented in FIG. 16 described above, information such as the VPS, the SPS (including the RPS), and the slice header of the decoded image is supplied from the syntax processing unit 221 to the reference list generating unit 222. The flag used_by_curr of the short-term reference image is set in the slice header or the RPS supplied from the syntax processing unit 121. The flag used_by_curr of the long-term reference image is set in the slice header or the SPS.

In Step S251, the reference image setting unit 231 of the reference list generating unit 222 sets short-term (before) reference images (STbC) by referring to the time information (in other words, the POC information) of the reference image supplied from the decoded picture buffer 209 and the flag used_by_curr of the short-term reference image of the slice header or the RPS and generates a list RefPicSetStCurrBefore[i].

In Step S252, the reference image setting unit 231 sets short-term (after) reference images (STaC) by referring to the time information of the reference image supplied from the decoded picture buffer 209 and the flag used_by_curr of the short-term reference image of the slice header or the RPS and generates a list RefPicSetStCurrAfter[i].

In Step S253, the reference image setting unit 231 sets long-term reference images (LT) by referring to the time information of the reference image supplied from the decoded picture buffer 209 and the flag used_by_curr of the long-term reference image of the slice header or the SPS and generates a list RefPicSetLtCurr[i].

In Step S254, the reference image setting unit 231 sets inter-view reference images (IV) by referring to the view information of the reference image supplied from the decoded picture buffer 209 and generates a list RefPicSetIvCurr[i].

In Step S255, the temporal list generating unit 232 generates two lists including a list 1 acquired by sequentially combining three lists of STbC, STaC, and LT set by the reference image setting unit 231 and a list 2 configured by the IV. In other words, only reference images, of which the flag used_by_curr is "1" are combined in order of STbC, STaC, and LT, whereby the list 1 is generated. In addition, the list 2 is generated by adding all the IV of the list RefPicSetIvCurr[i] to the list.

In Step S256, the temporal list generating unit 232 extracts one element from the start of each of the lists 1 and 2 generated in Step S255 and alternately aligns the extracted elements, thereby generating a temporal list (RefPicListTemp0[rIdx]) of L0.

In Step S257, the temporal list generating unit 232 generates two lists including a list 11 acquired by sequentially combining three lists STaC, STbC, and LT set by the reference image setting unit 231 and a list 12 configured by the IV. In other words, only the reference images of which the flag used_by_curr is "1" are combined in order of STaC, STbC, and LT, whereby the list 11 is generated. In addition, while the list 12 is generated by adding all the IV of the list RefPicSetIvCurr[i], at that time, as described above with reference to FIG. 8, the inter-view reference images may be added in order that is reverse order of the order of the direction L0.

In Step S258, the temporal list generating unit 232 extracts one element from the start of each of the lists 11 and 12 generated in Step S255 and alternately aligns the extracted elements, thereby generating a temporal list (RefPicListTemp1[rIdx]) of L1.

The numbers num_ref_idx_l0_active_minus1 and num_ref_idx_l1_active_minus1 are set in the slice header or the SPS supplied from the syntax processing unit 221.

In Step S259, the reference image list generating unit 233 extracts the first to the (num_ref_idx_l0_active_minus1+1)-th elements of the temporal list (RefPicListTemp0[rIdx]) of L0 and generates a reference list (RefPicList0[rIdx]) of L0.

In Step S260, the reference image list generating unit 233 extracts the first to the (num_ref_idx_l1_active_minus1+1)-th elements of the temporal list (RefPicListTemp1[rIdx]) of L1 and generates a reference list (RefPicList1[rIdx]) of L1.

As above, in the generation of the temporal lists, the reference images disposed in the time direction and the reference images disposed in the view direction are alternately arranged, whereby the reference lists described above with reference to FIG. 6 are generated.

In addition, in the description presented above, as a coding system, while the HEVC system is used as the base, the present technology is a technology at the time of performing display but is not limited to a specific coding system. Thus, the present technology is not limited to the HEVC system, but any other coding system/decoding system can be used. For example, the present technology may be applied also to a device that performs a coding/decoding process having an AVC system to be described below as its base.

3. Third Embodiment

[Another Configuration of Image Encoding Device]

Figure 19:
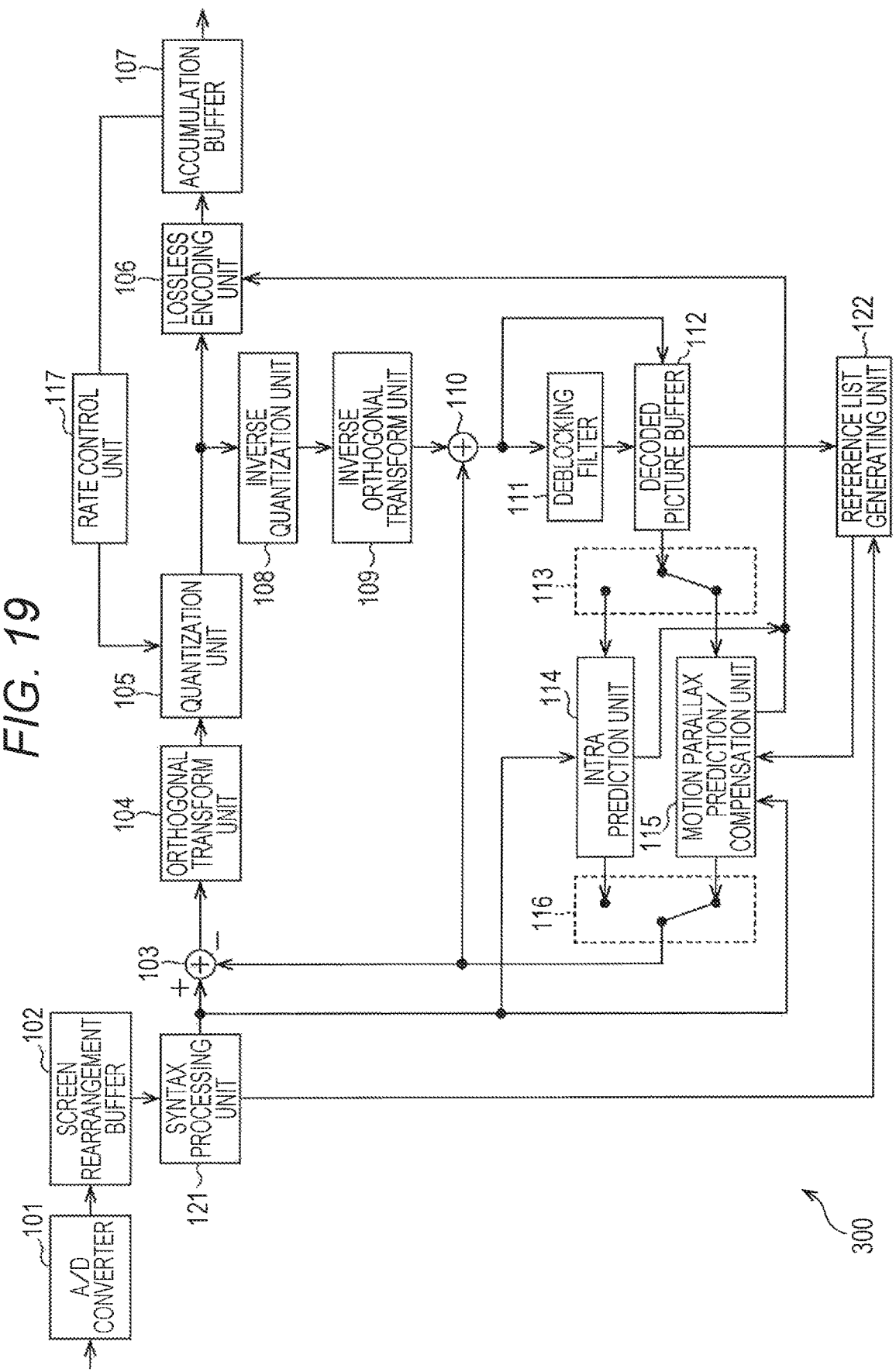
FIG. 19 is a block diagram that illustrates another example of the main configuration of an image encoding device.

FIG. 19 illustrates the configuration of an image encoding device according to another embodiment as an image processing device to which the present disclosure is applied. An image encoding device 300 represented in FIG. 19 is different from the image encoding device 100 represented in FIG. 1 only in that a coding process using an AVC system is performed.

In FIG. 19, the same reference numeral is assigned to the same configuration as that illustrated in FIG. 1. Thus, duplicate description thereof is not presented as is appropriate.

The image encoding device 300 illustrated in FIG. 19 includes: an A/D (analog/digital) converter 101; a screen rearrangement buffer 102; a calculation unit 103; an orthogonal transform unit 104; a quantization unit 105; a lossless encoding unit 106; and an accumulation buffer 107. In addition, the image encoding device 100 includes: an inverse quantization unit 108; an inverse orthogonal transform unit 109; a calculation unit 110; a deblocking filter 111; a decoded picture buffer 112; a selection unit 113; an intra prediction unit 114; a motion parallax prediction/compensation unit 115; a selection unit 116; and a rate control unit 117.

Furthermore, the image encoding device 100 includes: a syntax processing unit 121; and a reference list generating unit 122.

In other words, the configuration of the image encoding device 300 illustrated in FIG. 19 is different from that of the image encoding device 100 illustrated in FIG. 1 only in that the adaptive offset filter 123 and the adaptive loop filter 124 are excluded, and the lossless encoding unit 106 performs coding not by using the HEVC system but by using the AVC system. Thus, the image encoding device 300 performs the coding process not in units of CUs but in units of blocks.

Targets for the coding process performed by the lossless encoding unit 106 are basically the same as those for the lossless encoding unit 106 illustrated in FIG. 1 except for the parameters of the adaptive offset filter and the adaptive loop filter. In other words, the lossless encoding unit 106, similar to the lossless encoding unit 106 illustrated in FIG. 1, acquires the intra prediction mode information from the intra prediction unit 114. In addition, the lossless encoding unit 106 acquires the inter prediction mode information, the motion vector, the information specifying reference images, and the like from the motion parallax prediction/compensation unit 115.

The lossless encoding unit 106, similar to the lossless encoding unit 106 illustrated in FIG. 1, performs a lossless coding process such as a variable-length coding process (for example, the CAVLC) or an arithmetic coding process (for example, the CABAC) for the quantized coefficient supplied from the quantization unit 105.

The lossless encoding unit 106, similar to the lossless encoding unit 106 illustrated in FIG. 1, codes the quantized transform coefficient and sets the intra prediction mode information, the inter prediction mode information, the motion vector information, and the quantization parameter as a part of the header information of the coded data (multiplexing). The lossless encoding unit 106 supplies the coded data acquired by the coding process to the accumulation buffer 107 so as to be accumulated therein.

The deblocking filter 111 filters a locally-decoded image supplied from the calculation unit 110, thereby eliminating a block distortion. The deblocking filter 111 supplies an image acquired as a result thereof to the decoded picture buffer 112 so as to be accumulated therein.

The image accumulated in the decoded picture buffer 112 is output to the intra prediction unit 114 or the motion parallax prediction/compensation unit 115 through the selection unit 113 as a reference image.

The present technology can be applied to such an image encoding device using the AVC system.

[Another Configuration Example of Decoding Unit]

Figure 20:
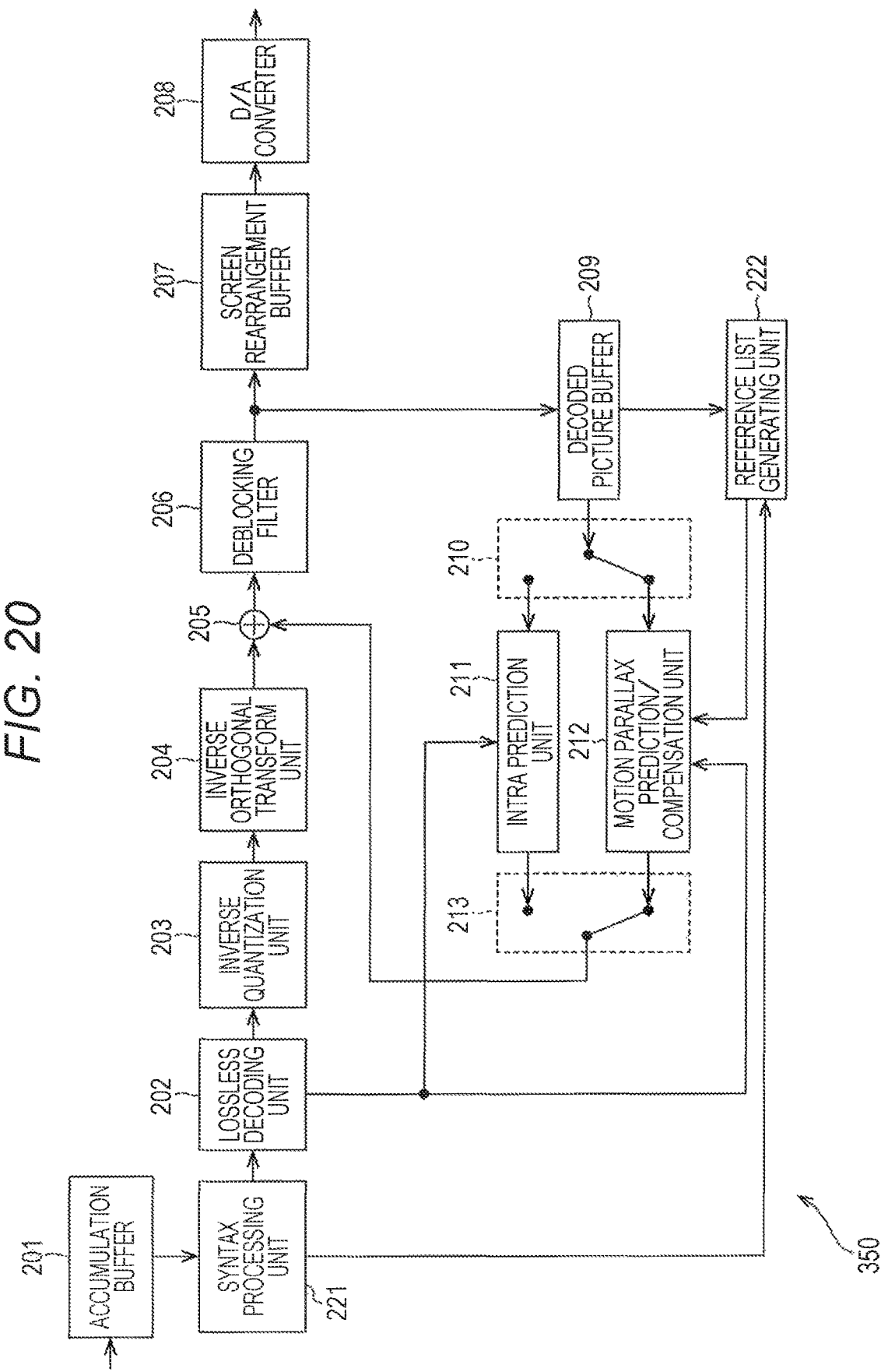
FIG. 20 is a block diagram that illustrates another example of the main configuration of an image decoding device.

FIG. 20 illustrates the configuration of an image decoding device according to another embodiment as an image processing device to which the present disclosure is applied. An image decoding device 350 illustrated in FIG. 20 is a decoding device that corresponds to the image encoding device 300 illustrated in FIG. 19. The image decoding device 350 represented in FIG. 20 is different from the image decoding device 200 illustrated in FIG. 14 only in that a decoding process is performed using the AVC system.

In FIG. 20, the same reference numeral is assigned to the same configuration as that illustrated in FIG. 14. Thus, duplicate description thereof is not presented as is appropriate.

The image decoding device 350 illustrated in FIG. 20 includes: an accumulation buffer 201; a lossless decoding unit 202; an inverse quantization unit 203; an inverse orthogonal transform unit 204; a calculation unit 205; a deblocking filter 206; a screen rearrangement buffer 207; a D/A converter 208; a decoded picture buffer 209; a selection unit 210; an intra prediction unit 211; a motion parallax prediction/compensation unit 212; and a selection unit 213.

The configuration of the image decoding device 350 illustrated in FIG. 20 is different from that of the image decoding device 200 illustrated in FIG. 14 only in that the adaptive offset filter 223 and the adaptive loop filter 224 are excluded, and the lossless decoding unit 202 performs a decoding process not by using the HEVC system but by using the AVC system. Thus, the image decoding device 350 performs the decoding process not in units of CUs but in units of blocks.

Targets for the decoding process performed by the lossless decoding unit 202 are basically the same as those for the lossless decoding unit 202 illustrated in FIG. 14 except for the parameters of the adaptive offset filter and the adaptive loop filter. In other words, accumulation buffer 201 accumulates coded data that has been transmitted thereto. This coded data is coded by the image encoding device 300.

The syntax processing unit 221, similar to the syntax processing unit 221 illustrated in FIG. 14, acquires a sequence parameter set, a picture parameter set, a slice header, and the like from the coded data read from the accumulation buffer 201 at predetermined timing and supplies each header information that has been acquired to the lossless decoding unit 202 together with the coded data. In addition, the syntax processing unit 221 supplies the header information and the like that have been acquired to the reference list generating unit 222.

In addition, the lossless decoding unit 202, similar to the lossless decoding unit 202 illustrated in FIG. 14, performs a lossless decoding process such as a variable-length decoding process or an arithmetic decoding process for the coded data supplied from the syntax processing unit 221, thereby acquiring a quantized coefficient. The lossless decoding unit 202 supplies the quantized coefficient to the inverse quantization unit 203.

The deblocking filter 206 performs filtering for the image supplied from the calculation unit 205, thereby eliminating a block distortion. Then, the deblocking filter 206 supplies an image acquired as a result thereof to the decoded picture buffer 209 and the screen rearrangement buffer 207.

The present technology can be applied also to such an image decoding device using the AVC system.

In addition, the present disclosure, for example, may be applied to an image encoding device and an image decoding device that are used when image information (bit stream) compressed using an orthogonal transform such as a discrete cosine transform and motion compensation, like MPEG, H. 26x, or the like, is received through a network medium such as satellite broadcast, cable television, the Internet, or a mobile phone. In addition, the present disclosure may be applied to an image encoding device and an image decoding device that are used when information is processed on a storage medium such as an optical disc, a magnetic disk, or a flash memory. Furthermore, the present disclosure may be applied also to the motion prediction/compensation device included in the image encoding device and the image decoding device described above, and the like.

4. Fourth Embodiment

[Computer]

The series of processes described above may be performed by hardware or software. In a case where the series of processes is performed by software, a program that configures the software is installed to a computer. Here, the computer includes a computer that is built into dedicated hardware, a computer that can execute various functions by having various programs installed thereto such as a general-purpose computer, and the like.

Figure 21:
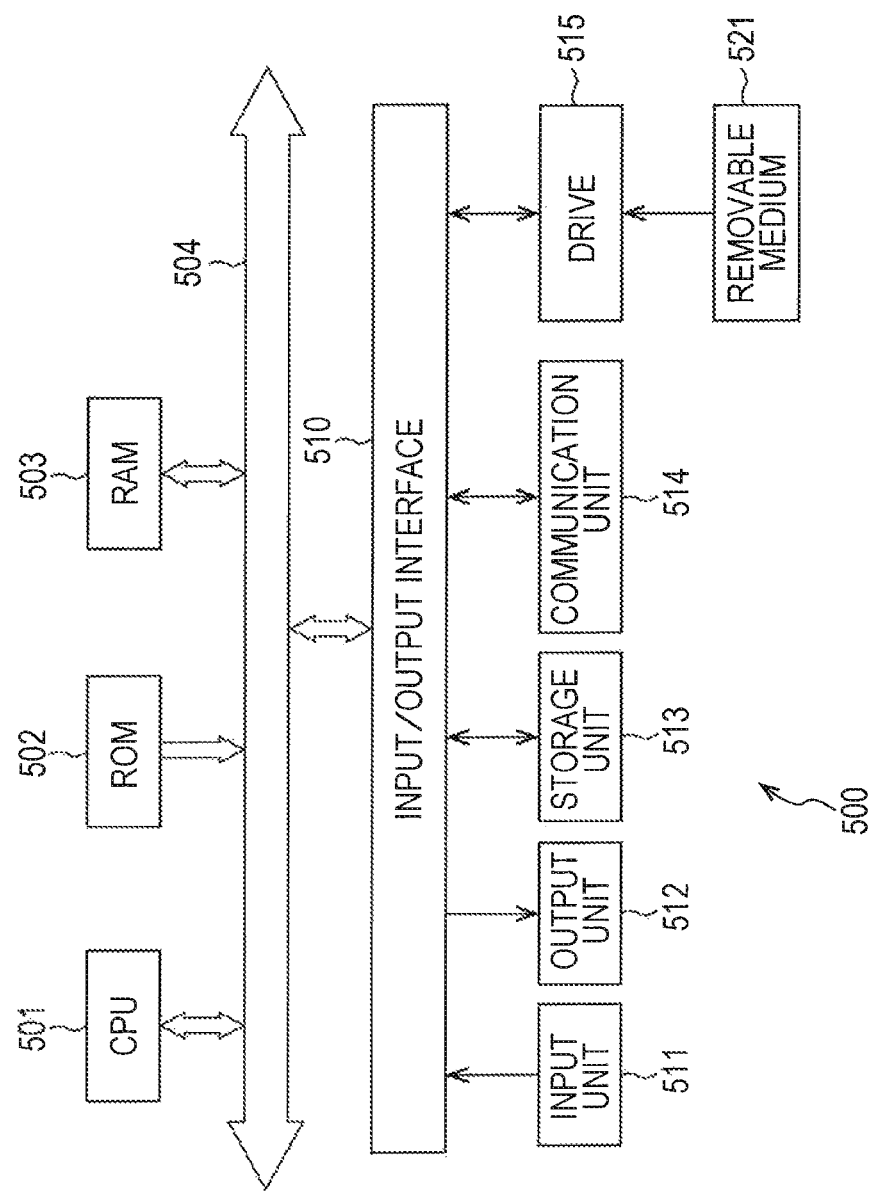
FIG. 21 is a block diagram that illustrates an example of the main configuration of a computer.

FIG. 21 is a block diagram that illustrates an example of the hardware configuration of the computer that executes the series of processes described above in accordance with a program.

In a computer 500, a central processing unit (CPU) 501, a read only memory (ROM) 502, and a random access memory (RAM) 503 are interconnected through a bus 504.

In addition, an input/output interface 510 is connected to the bus 504. To the input/output interface 510, an input unit 511, an output unit 512, a storage unit 513, a communication unit 514, and a drive 515 are connected.

The input unit 511 is configured by a keyboard, a mouse, a microphone, and the like. The output unit 512 is configured by a display, a speaker, and the like. The storage unit 513 is configured by a hard disk, a non-volatile memory, or the like. The communication unit 514 is configured by a network interface or the like. The drive 515 drives a removable medium 521 such as a magnetic disk, an optical disc, a magneto-optical disk, or a semiconductor memory.

In the computer configured as described above, the CPU 501 performs the series of processes described above, for example, by loading a program stored in the storage unit 513 into the RAM 503 through the input/output interface 510 and the bus 504 and executing the program.

The program executed by the computer 500 (CPU 501), for example, may be provided by being recorded on the removable medium 521 as a package medium or the like. In addition, the program may be provided through a wired or wireless transmission medium such as a local area network, the Internet, or digital satellite broadcasting.

In the computer, the program can be installed to the storage unit 513 through the input/output interface 510 by loading the removable medium 521 into the drive 515. In addition, the program may be received by the communication unit 514 through a wired or wireless transmission medium and be installed to the storage unit 513. Furthermore, the program may be installed in advance to the ROM 502 or the storage unit 513.

In addition, the program executed by the computer may be a program that performs the process in a time series in the sequence described here or may be a program that performs the process in a parallel manner or at necessary timing such as timing when the program is called.

Furthermore, in this specification, a step describing the program recorded on a recording medium includes not only a process performed in a time series along the described order but also a process that is performed in a parallel manner or an individual manner without being necessarily processed in a time series.

In addition, in this specification, a system represents a whole apparatus that is configured by a plurality of devices (apparatuses).

Furthermore, a configuration described above as one device (or one processing unit) may be divided so as to be configured as a plurality of devices (or processing units). To the contrary, a configuration described above as a plurality of devices (or processing units) may be arranged to be configured as one device (or one processing unit). In addition, a configuration that has not been described above may be added to the configuration of each device (or each processing unit). Furthermore, as long as the overall configuration and the overall operation of the system are substantially the same, a part of the configuration of a specific device (or a specific processing unit) may be configured to be included in a configuration of another device (or another processing unit). In other words, the present technology is not limited to the embodiments described above, but various changes may be made therein in a range not departing from the concept of the present technology.

The image encoding device and the image decoding device according to the embodiments described above can be applied to various electronic apparatuses such as a transmitter or a receiver for wired broadcasting such as satellite broadcasting or cable TV, transmission on the Internet, transmission to a terminal through cellular communication, or the like, a recording apparatus that records an image on a medium such as an optical disc, a magnetic disk, or a flash memory, or a reproduction apparatus that reproduces an image from the storage medium. Hereinafter, four application examples will be described.

5. Application Examples

[First Application Example: Television Receiver]

Figure 22:
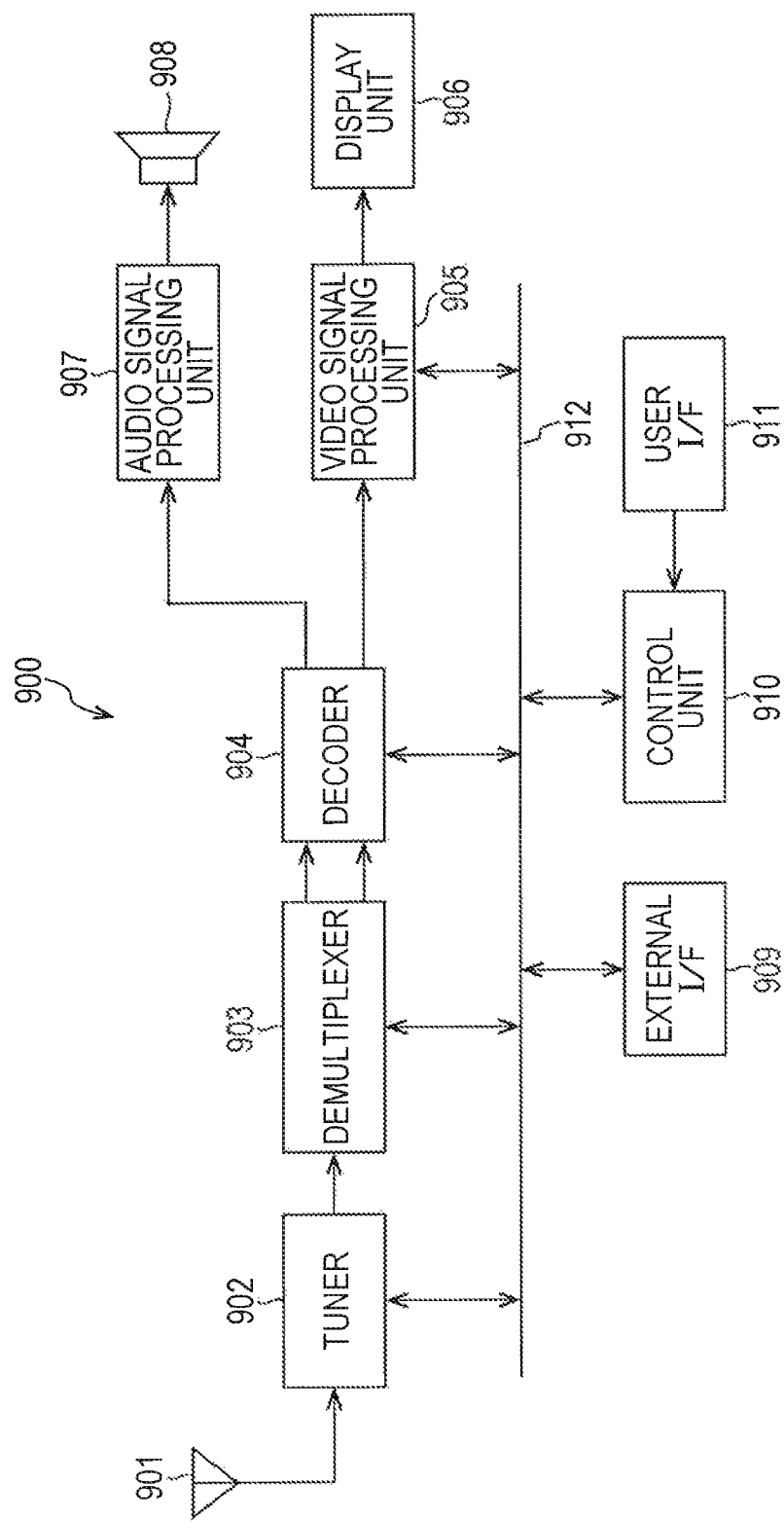
FIG. 22 is a block diagram that illustrates an example of the schematic configuration of a television apparatus.

FIG. 22 illustrates a schematic configuration example of a television apparatus to which the above-described embodiment is applied. A television apparatus 900 includes: an antenna 901; a tuner 902; a demultiplexer 903; a decoder 904; a video signal processing unit 905; a display unit 906;

an audio signal processing unit 907; a speaker 908; an external interface 909; a control unit 910; a user interface 911; and a bus 912.

The tuner 902 extracts a signal of a desired channel from a broadcast signal received through the antenna 901 and demodulates the extracted signal. Then, the tuner 902 outputs a coded bit stream acquired through demodulation to a demultiplexer 903. In other words, the tuner 902 serves as a transmission means of the television apparatus 900 that receives a coded stream in which an image is coded.

The demultiplexer 903 separates a video stream and an audio stream of a program to be watched from the coded bit stream and outputs each separated stream to a decoder 904. In addition, the demultiplexer 903 extracts auxiliary data such as EPG (Electronic Program Guide) from the coded bit stream and supplies the extracted data to a control unit 910. Furthermore, the demultiplexer 903 may perform descrambling in a case where the coded bit stream is scrambled.

The decoder 904 decodes the video stream and the audio stream input from the demultiplexer 903. Then, the decoder 904 outputs video data generated by a decoding process to a video signal processing unit 905. In addition, the decoder 904 outputs audio data generated by the decoding process to an audio signal processing unit 907.

The video signal processing unit 905 reproduces the video data input from the decoder 904 and causes a display unit 906 to display video. The video signal processing unit 905 may also cause the display unit 906 to display an application screen supplied through the network. In addition, the video signal processing unit 905 may perform an additional process such as noise removal for the video data according to a setting. Furthermore, the video signal processing unit 905 may generate a GUI (Graphical User Interface) image such as a menu, a button, and a cursor and superimpose the generated image on an output image.

The display unit 906 is driven according to a drive signal supplied from the video signal processing unit 905 so as to display a video or image on a video screen of a display device (for example, a liquid crystal display, a plasma display, an OELD (Organic ElectroLuminescence Display (organic EL display), or the like).

The audio signal processing unit 907 performs a reproducing process such as D/A conversion and amplification for the audio data input from the decoder 904 and causes a speaker 908 to output the audio. In addition, the audio signal processing unit 907 may perform an additional process such as noise removal for the audio data.

An external interface 909 is an interface for connecting the television apparatus 900 to an external device or the network. For example, a video stream or an audio stream received through the external interface 909 may be decoded by the decoder 904. In other words, the external interface 909 also serves as a transmission means of the television apparatus 900 that receives a coded stream in which an image is coded.

The control unit 910 includes a processor such as a CPU and a memory such as a RAM or a ROM. The memory stores a program executed by the CPU, program data, EPG data, data acquired through the network, and the like. The program stored in the memory, for example, is read by the CPU on activation of the television apparatus 900 and is executed. The CPU controls the operation of the television apparatus 900, for example, according to an operation signal input from a user interface 911 by executing the program.

The user interface 911 is connected to the control unit 910. The user interface 911, for example, includes a button and a switch for a user to operate the television apparatus 900, a reception unit for a remote control signal, and the like. The user interface 911 detects a user's operation through such components, generates an operation signal, and outputs the generated operation signal to the control unit 910.

The bus 912 mutually connects the tuner 902, the demultiplexer 903, the decoder 904, the video signal processing unit 905, the audio signal processing unit 907, the external interface 909, and the control unit 910.

In the television apparatus 900 configured in this way, the decoder 904 has the function of the image decoding device according to the above-described embodiment. Accordingly, when an image is decoded in the television apparatus 900, the coding efficiency in a multi-viewpoint coding process can be improved.

[Second Application Example: Mobile Phone]

Figure 23:
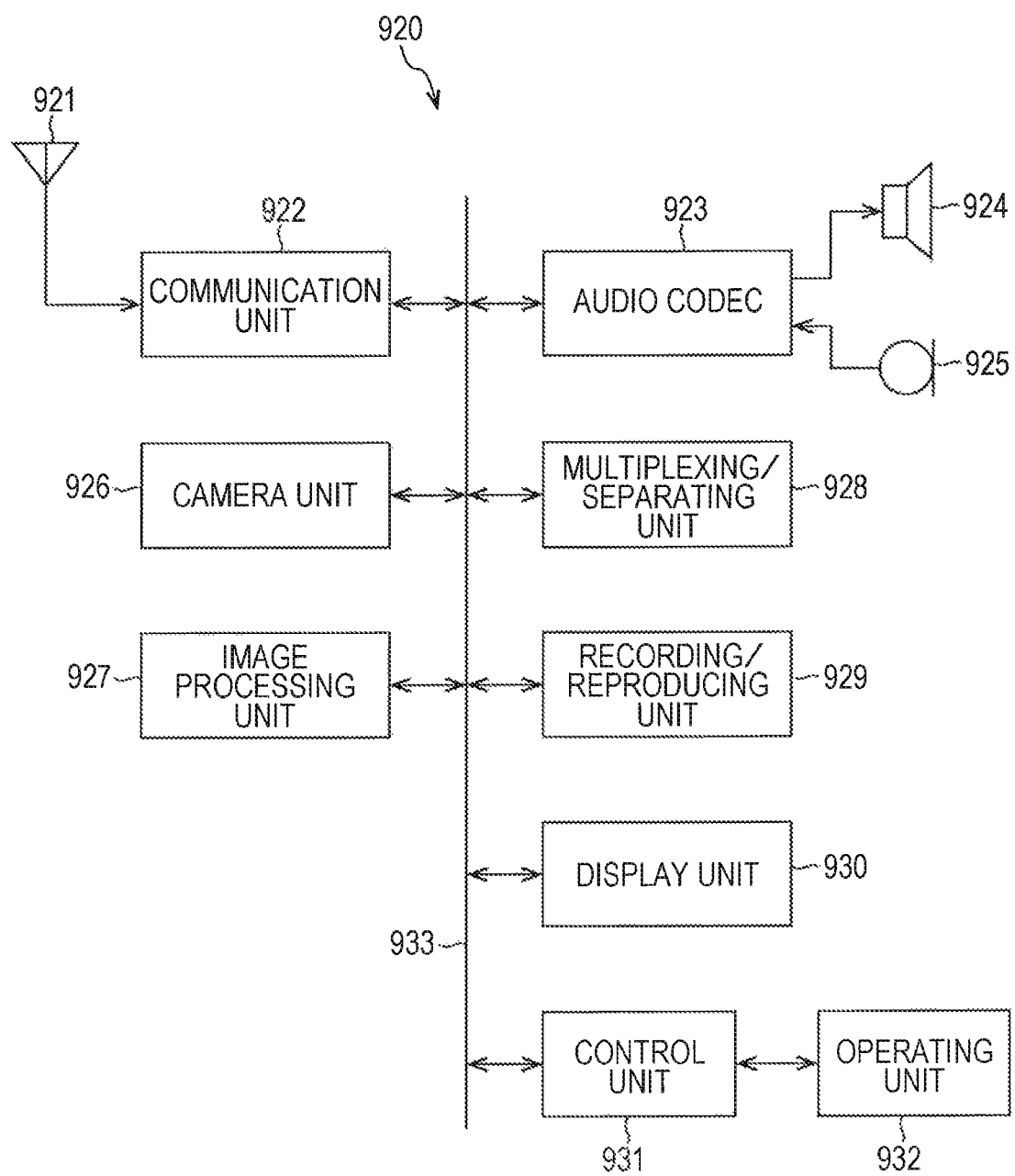
FIG. 23 is a block diagram that illustrates an example of the schematic configuration of a mobile phone.

FIG. 23 illustrates an example of the schematic configuration of a mobile phone to which the above-described embodiment is applied. A mobile phone 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/separating unit 928, the recording/reproducing unit 929, the display unit 930, and the control unit 931.

The mobile phone 920 performs operation such as transmission/reception of an audio signal, transmission/reception of an e-mail or image data, image capturing, and recording of data in various operation modes including a voice call mode, a data communication mode, an imaging mode, and a television-phone mode.

In the voice call mode, an analog audio signal generated by the microphone 925 is supplied to the audio codec 923. The audio codec 923 converts the analog audio signal into audio data, performs A/D conversion of the converted audio data, and compresses the audio data. Then, the audio codec 923 outputs the compressed audio data to the communication unit 922. The communication unit 922 codes and modulates the audio data to generate a transmission signal. Then, the communication unit 922 transmits the generated transmission signal to a base station (not illustrated in the figure) through the antenna 921. In addition, the communication unit 922 amplifies a wireless signal received through the antenna 921 and performs frequency conversion of the wireless signal, thereby acquiring a reception signal. Then, the communication unit 922 generates audio data by demodulating and decoding the reception signal and outputs the generated audio data to the audio codec 923. The audio codec 923 performs decompression and D/A conversion of the audio data, thereby generating an analog audio signal. Then, the audio codec 923 supplies the generated audio signal to the speaker 924 to causes audio to be outputted.

In the data communication mode, for example, the control unit 931 generates character data configuring an e-mail according to a user's operation performed through the operation unit 932. In addition, the control unit 931 causes the display unit 930 to display characters. The control unit 931 generates e-mail data according to a transmission instruction from the user through the operation unit 932 and outputs the generated e-mail data to the communication unit 922. The communication unit 922 codes and modulates the e-mail data, thereby generating a transmission signal. Then, the communication unit 922 transmits the generated transmission signal to a base station (not illustrated in the figure) through the antenna 921. In addition, the communication unit 922 performs amplification and frequency conversion of the wireless signal received through the antenna 921, thereby acquiring a reception signal. Then, the communication unit 922 demodulates and decodes the reception signal to restore the e-mail data and outputs the restored e-mail data to the control unit 931. The control unit 931 causes the display unit 930 to display a content of the e-mail data and stores e-mail data on a recording medium of the recording/reproducing unit 929.

The recording/reproducing unit 929 includes an arbitrary readable and writable storage medium. For example, the storage medium may be a built-in storage medium such as a RAM and a flash memory or may be an external mounting-type storage medium such as a hard disk, a magnetic disk, a magneto-optical disc, an optical disc, a USB (Universal Serial Bus) memory, or a memory card.

In the imaging mode, for example, the camera unit 926 images an object to generate image data and outputs the generated image data to the image processing unit 927. The image processing unit 927 codes the image data input from the camera unit 926 and stores a coded stream on a recording medium of the storing/reproducing unit 929.

In addition, in the television-phone mode, for example, the multiplexing/separating unit 928 multiplexes the video stream coded by the image processing unit 927 and the audio stream input from the audio codec 923 and outputs a resultant multiplexed stream to the communication unit 922. The communication unit 922 codes and modulates the stream, thereby generating a transmission signal. Then, the communication unit 922 transmits the generated transmission signal to a base station (not illustrated in the figure) through the antenna 921. In addition, the communication unit 922 performs amplification and frequency conversion of a wireless signal received through the antenna 921, thereby acquiring a reception signal. The transmission signal and the reception signal are acquired with the coded bit stream being included therein. Then, the communication unit 922 restores the stream by demodulating and decoding the reception signal and outputs the restored stream to the multiplexing/separating unit 928. The multiplexing/separating unit 928 separates a video stream and an audio stream from the input stream and outputs the video stream and the audio stream respectively to the image processing unit 927 and the audio codec 923. The image processing unit 927 decodes the video stream to generate video data. The video data is supplied to the display unit 930, and a series of images is displayed by the display unit 930. The audio codec 923 performs decompression and D/A conversion of the audio stream, thereby generating an analog audio signal. Then, the audio codec 923 supplies the generated audio signal to the speaker 924 to cause an audio to be outputted.

In the mobile phone 920 configured in this way, the image processing unit 927 has the functions of the image encoding device and the image decoding device according to the above-described embodiments. Accordingly, when an image is coded and decoded in the mobile phone 920, the coding efficiency in a multi-viewpoint coding process can be improved.

[Third Application Example: Recording/Reproducing Apparatus]

Figure 24:
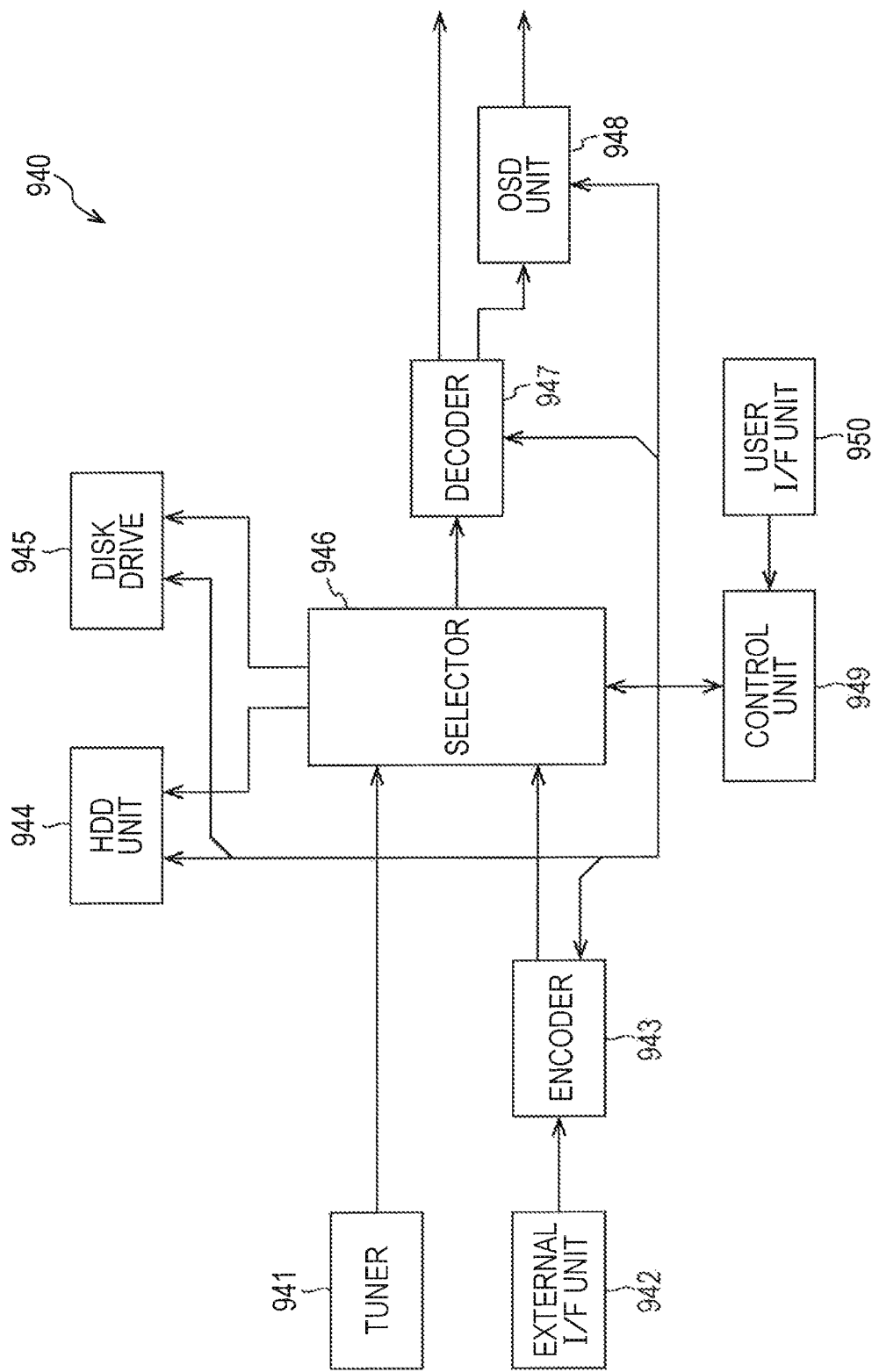
FIG. 24 is a block diagram that illustrates an example of the schematic configuration of a recording/reproducing apparatus.

FIG. 24 is a block diagram that illustrates an example of the schematic configuration of a recording/reproducing apparatus to which the above-described embodiment is applied. A recording/reproducing apparatus 940, for example, codes audio data and video data of a received broadcast program and records the coded data on a recording medium. In addition, the recording/reproducing apparatus 940, for example, may code audio data and video data acquired from another apparatus and record the coded data on a recording medium. Furthermore, the recording/reproducing apparatus 940, for example, reproduces the data recorded on the recording medium using the monitor and the speaker according to a user's instruction. At that time, the recording/reproducing apparatus 940 decodes the audio data and the video data.

The recording/reproducing apparatus 940 includes: a tuner 941; an external interface unit 942; an encoder 943; a hard disk drive (HDD) unit 944; a disk driver 945; a selector 946; a decoder 947; an on-screen display (OSD) unit 948; a control unit 949; and a user interface unit 950.

The tuner 941 extracts a signal of a desired channel from a broadcast signal received through an antenna (not illustrated in the figure) and demodulates the extracted signal. Then, the tuner 941 outputs a coded bit stream acquired by the demodulation process to the selector 946. In other words, the tuner 941 serves as a transmission means of the recording/reproducing apparatus 940.

The external interface unit 942 is an interface used for connecting the recording/reproducing apparatus 940 and an external device or the network. The external interface unit 942, for example, may be an IEEE 1394 interface, a network interface, a USB interface, a flash memory interface or the like. For example, the video data and the audio data received through the external interface unit 942 are input to the encoder 943. In other words, the external interface unit 942 serves as the transmission means of the recording/reproducing apparatus 940.

In a case where the video data and the audio data input from the external interface unit 942 are not coded, the encoder 943 codes the video data and the audio data. Then, the encoder 943 outputs a coded bit stream to the selector 946.

An HDD unit 944 records the coded bit stream in which contents data such as a video and am audio is compressed, various programs, and other data in an internal hard disk. When a video and an audio are reproduced, the HDD unit 944 reads data thereof from the hard disk.

The disk drive 945 records and reads data on/from a loaded recording medium. The recording medium loaded into the disk drive 945, for example, may be a DVD disc (a DVD-Video, a DVD-RAM, a DVD-R, a DVD-RW, DVD+R, a DVD+RW or the like), a Blu-ray (registered trademark) disc, or the like.

When a video and an audio are recorded, the selector 946 selects a coded bit stream input from the tuner 941 or the encoder 943 and outputs the selected coded bit stream to the HDD unit 944 or the disk drive 945. In addition, when the video and the audio are reproduced, the selector 946 outputs the coded bit stream input from the HDD unit 944 or the disk drive 945 to the decoder 947.

The decoder 947 decodes the coded bit stream to generate video data and audio data. Then, the decoder 947 outputs the generated video data to an OSD unit 948. In addition, the decoder 947 outputs the generated audio data to an external speaker.

The OSD unit 948 reproduces the video data input from the decoder 947, thereby displaying the video. The OSD unit 948 may superimpose an image of a GUI such as a menu, a button, a cursor, or the like on the displayed video.

The control unit 949 includes a processor such as a CPU and a memory such as a RAM or a ROM. The memory stores a program executed by the CPU, program data, and the like. The program stored in the memory, for example, is read and executed by the CPU on activation of the recording/reproducing apparatus 940. The CPU controls the operation of the recording/reproducing apparatus 940, for example, according to an operation signal input from the user interface unit 950 by executing the program.

The user interface unit 950 is connected to the control unit 949. The user interface unit 950, for example, includes a button and a switch for the user to operate the recording/reproducing apparatus 940 and a reception unit for a remote control signal. The user interface unit 950 detects a user's operation through the constituent elements to generate an operation signal and outputs the generated operation signal to the control unit 949.

In the recording/reproducing apparatus 940 configured in this way, the encoder 943 has the function of the image encoding device according to the above-described embodiment. In addition, the decoder 947 has the function of the image decoding device according to the above-described embodiment. Accordingly, when an image is coded or decoded in the recording/reproducing apparatus 940, the coding efficiency in a multi-viewpoint coding process can be improved.

[Fourth Application Example: Imaging Apparatus]

Figure 25:
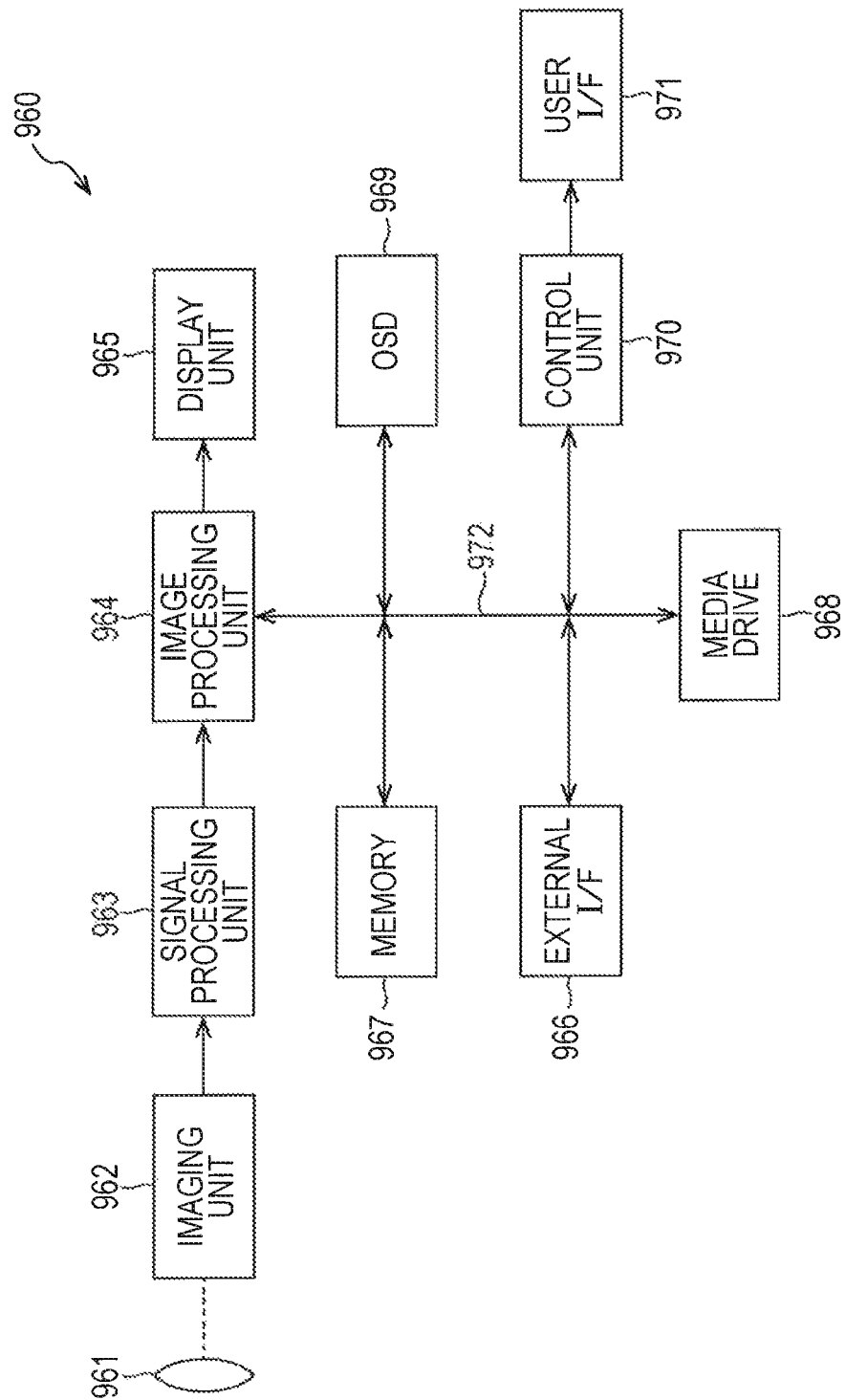
FIG. 25 is a block diagram that illustrates an example of the schematic configuration of an imaging apparatus.

FIG. 25 illustrates an example of the schematic configuration of an imaging apparatus to which the above-described embodiment is applied. An imaging apparatus 960 images an object to generate an image, codes the image data, and records the coded image data on a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens, a diaphragm mechanism, and the like. The optical block 961 forms an optical image of the object on an imaging surface of the imaging unit 962. The imaging unit 962 includes an image sensor such as a charge coupled device (CCD) and a complementary metal oxide semiconductor (CMOS) and converts the optical image formed on the imaging surface into an image signal as an electric signal through photoelectric conversion. Then, the imaging unit 962 outputs the image signal to the signal processing unit 963.

The signal processing unit 963 performs various camera signal processes such as a knee correction, a gamma correction, a color correction, and the like for the image signal input from the imaging unit 962. The signal processing unit 963 outputs the image data after the camera signal processes to the image processing unit 964.

The image processing unit 964 codes the image data input from the signal processing unit 963 to generate coded data. Then, the image processing unit 964 outputs the generated coded data to the external interface 966 or the media drive 968. In addition, the image processing unit 964 decodes the coded data input from the external interface 966 or the media drive 968 to generate image data. Then, the image processing unit 964 outputs the generated image data to the display unit 965. In addition, the image processing unit 964 may output the image data input from the signal processing unit 963 to the display unit 965 to display the image. Furthermore, the image processing unit 964 may superimpose data for display that is acquired from the OSD 969 on the image output to the display unit 965.

The OSD 969, for example, generates an image of a GUI such as a menu, a button, a cursor, or the like and outputs the generated image to the image processing unit 964.

The external interface 966, for example, is configured as an USB input/output terminal. The external interface 966, for example, connects the imaging apparatus 960 and a printer when an image is printed. In addition, a drive is connected to the external interface 966 as is necessary. A removable medium such as a magnetic disk or an optical disc is loaded into the drive, and a program read from the removable medium may be installed to the imaging apparatus 960. Furthermore, the external interface 966 may be configured as a network interface that is connected to a network such as a LAN, the Internet, or the like. In other words, the external interface 966 serves as a transmission means of the imaging apparatus 960.

The recording medium loaded into the media drive 968, for example, may be an arbitrary readable/writable removable medium such as a magnetic disk, a magneto-optical disk, an optical disc, or a semiconductor memory. In addition, it may be configured such that a recording medium is fixedly mounted to the media drive 968 to configure a non-portable storage unit such as a built-in hard disk drive or an solid state drive (SSD).

The control unit 970 includes a processor such as a CPU and a memory such as a RAM or a ROM. The memory stores a program executed by the CPU, program data, and the like. The program stored in the memory is read by the CPU, for example, on activation of the imaging apparatus 960 and is executed. The CPU controls the operation of the imaging apparatus 960, for example, according to an operation signal input from the user interface 971 by executing the program.

The user interface 971 is connected to the control unit 970. The user interface 971, for example includes a button, a switch, and the like for a user to operate the imaging apparatus 960. The user interface 971 detects a user's operation through the constituent elements to generate an operation signal and outputs the generated operation signal to the control unit 970.

In the imaging apparatus 960 configured in this way, the image processing unit 964 has the functions of the image encoding device and the image decoding device according to the above-described embodiments. Accordingly, when an image is coded or decoded in the imaging apparatus 960, the coding efficiency in a multi-viewpoint coding process can be improved.

6. Fifth Embodiment

Other Examples

In the description presented above, while the examples of the devices and system, or the like to which the present technology is applied have been described, the present technology is not limited thereto. Thus, the present technology may be applied as all the configurations mounted to a device configuring such a device or system, for example, a processor as a system large scale integration (LSI) or the like, a module that uses a plurality of processors or the like, a unit that uses a plurality of modules or the like, or a set or the like (in other words, a part of the configuration of the device) acquired by adding other functions to the unit.

[Video Set]

Figure 26:
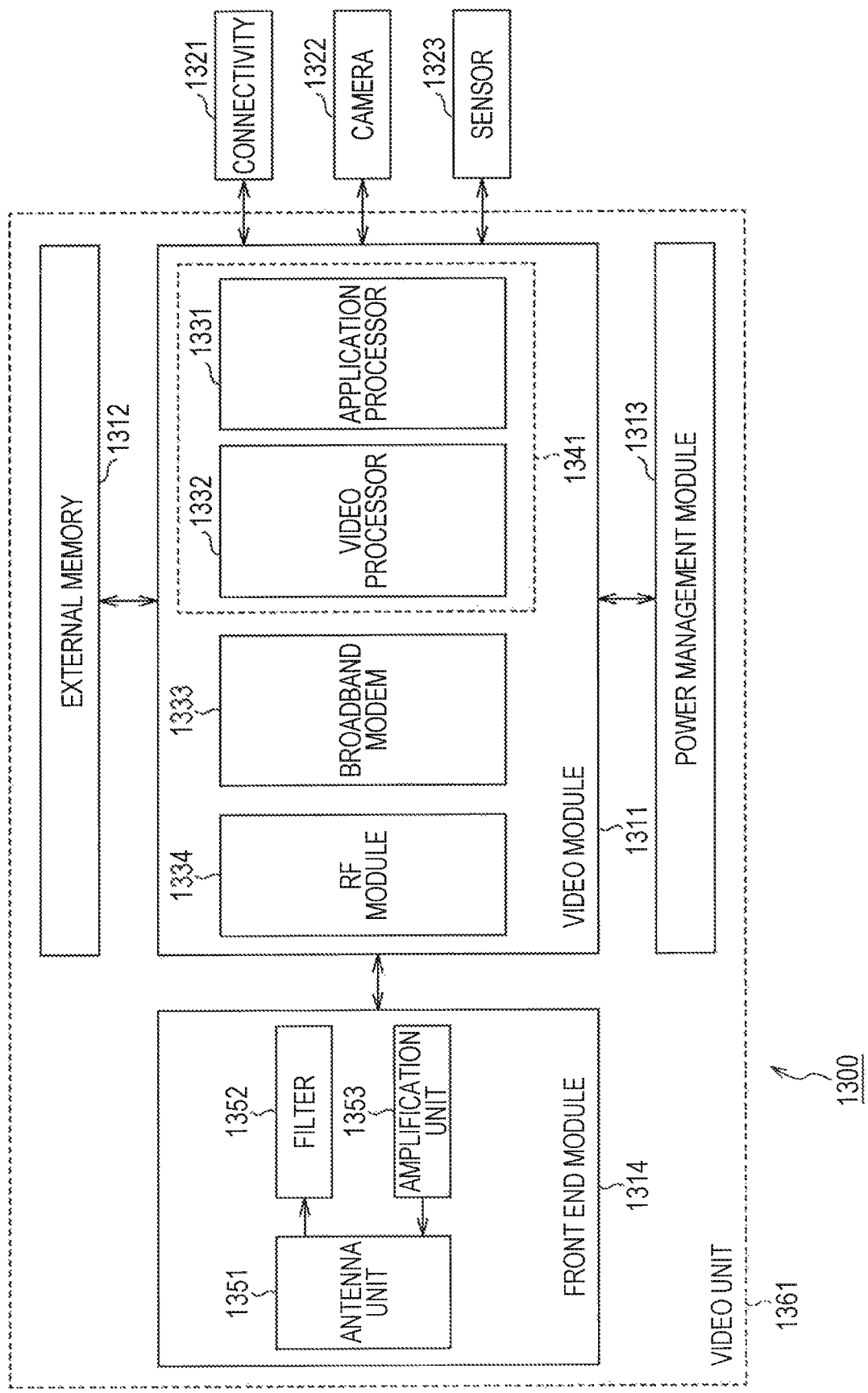
FIG. 26 is a block diagram that illustrates an example of the schematic configuration of a video set.

An example of a case where the present technology is applied as a set will be described with reference to FIG. 26. FIG. 26 illustrates an example of the schematic configuration of a video set to which the present technology is applied.

Recently, the implementation of multiple functions of an electronic device is in progress, and, in the development or the manufacturing thereof, in a case where a part of the configuration is provided for sale, provision, or the like, there are not only a case where the configuration having one function is applied but also a case where one set having a plurality of functions, which is acquired by combining a plurality of configurations having relating function, is applied, which is widely used.

A video set 1300 illustrated in FIG. 26 has such a multi-function configuration and is acquired by combining a device having a function relating to image coding or image decoding (any one thereof or both thereof) with devices having other functions relating to the function.

As illustrated in FIG. 26, the video set 1300 includes a module group that includes a video module 1311, an external memory 1312, a power management module 1313, a front end module 1314, and the like and devices having related functions of a connectivity 1321, a camera 1322, a sensor 1323, and the like.

A module is formed as a component having a function having unity by arranging several component functions relating to each other together. While a specific physical configuration is arbitrary, for example, a module acquired by arranging a plurality of processors each having a function, an electronic circuit component such as a resistor or a capacitor, and other devices or the like on a wiring board or the like so as to be integrated together may be considered. In addition, it may be considered to form a new module by combining a module with other modules, processors, and the like.

In the example illustrated in FIG. 26, the video module 1311 is acquired by combining configurations having functions relating to image processing and includes: an application processor; a video processor; a broadband modem 1333; and an RF module 1334.

The processor is acquired by integrating a configuration having a predetermined function on a semiconductor chip as system on a chip (SoC) and, for example, there is also the processor that is called a system large scale integration (LSI) or the like. The configuration having the predetermined function may be a logic circuit (hardware configuration), a configuration including a CPU, a ROM, a RAM, and the like and a program (software configuration) executed using them, or a configuration combining both the configurations described above. For example, it may be configured such that the processor includes logic circuits, a CPU, a ROM, a RAM, and the like, some functions are realized by the logic circuits (hardware configuration), and the other functions are realized by a program (software configuration) executed by the CPU.

An application processor 1331 illustrated in FIG. 26 is a processor that executes an application relating to image processing. In order to realize predetermined functions, the application executed by the application processor 1331 may not only perform a calculation process but also control the configurations of the inside and the outside of the video module 1311 such as a video processor 1332 as is necessary.

The video processor 1332 is a processor that has a function relating to image coding and image decoding (one thereof or both thereof).

The broadband modem 1333 is a processor (or a module) that performs the process relating to wired or wireless (or both thereof) broadband communication performed through a broadband line such as the Internet or a public telephone network. For example, the broadband modem 1333 converts data (digital signal) to be transmitted into an analog signal through digital modulation or the like or demodulates a received analog signal so as to be converted into data (digital signal). For example, the broadband modem 1333 can perform digital modulation/demodulation of arbitrary information such as image data processed by the video processor 1332, a stream in which the image data is coded, an application program, setting data, and the like.

The RF module 1334 is a module that performs frequency conversion, modulation/demodulation, amplification, a filter process, and the like for an RF (Radio Frequency) signal that is transmitted/received through an antenna. For example, the RF module 1334 generates an RF signal by performing frequency conversion and the like for a baseband signal generated by the broadband modem 1333. In addition, for example, the RF module 1334 generates a baseband signal by performing frequency conversion and the like for an RF signal received through the front end module 1314.

In addition, as denoted by a dotted line 1341 in FIG. 26, the application processor 1331 and the video processor 1332 may be integrated so as to be configured as one processor.

The external memory 1312 is a module that is disposed outside the video module 1311 and includes a storage device used by the video module 1311. The storage device of the external memory 1312 may be realized by a certain physical configuration. However, generally, since the storage device is frequently used for storing data having a large capacity such as image data configured in units of frames, the storage device is preferably realized by a semiconductor memory that has a large capacity at relatively low cost such as a dynamic random access memory (DRAM).

The power management module 1313 manages and controls the supply of power to the video module 1311 (each configuration within the video module 1311).

The front end module 1314 is a module that provides a front end function (a transmission/reception-end circuit on the antenna side) for the RF module 1334. As illustrated in FIG. 26, the front end module 1314, for example, includes an antenna unit 1351, a filter 1352, and an amplification unit 1353.

The antenna unit 1351 includes an antenna that transmits/receives a wireless signal and a peripheral configuration thereof. The antenna unit 1351 transmits a signal supplied from the amplification unit 1353 as a wireless signal and supplies a received wireless signal to the filter 1352 as an electric signal (RF signal). The filter 1352 performs a filter process and the like for the RF signal received through the antenna unit 1351 and supplies the RF signal after the process to the RF module 1334. The amplification unit 1353 amplifies the RF signal supplied from the RF module 1334 and supplies the amplified RF signal to the antenna unit 1351.

The connectivity 1321 is a module that has a function relating to a connection to the outside. The physical configuration of the connectivity 1321 is arbitrary. For example, the connectivity 1321 includes a configuration having a communication function other than the communication specification to which the broadband modem 1333 corresponds, external input/output terminals, and the like.

For example, the connectivity 1321 may be configured to include a module having communication functions that are compliant with radio communication specifications such as Bluetooth (registered trademark), IEEE 802.11 (for example, wireless fidelity (Wi-Fi; registered trademark)), near field communication (NFC), and InfraRed data association (IrDA) and an antenna that transmits/receives signals that are compliant with the specifications. In addition, for example, the connectivity 1321 may be configured to include a module having communication functions that are compliant with wired communication specifications such as universal serial bus (USB) and high-definition multimedia interface (registered trademark) (HDMI) and terminals that are compliant with the specifications. Furthermore, for example, the connectivity 1321 may be configured to have an additional data (signal) transmission function and the like of analog input/output terminals or the like.

In addition, the connectivity 1321 may be configured to include a device that is the transmission destination of data (signal). For example, the connectivity 1321 may be configured to include a drive (including not only a drive of a removable medium but also a hard disk, a solid state drive (SSD), a network attached storage (NAS), and the like) that performs data reading or data writing for a recording medium such as a magnetic disk, an optical disc, a magneto-optical disk, or a semiconductor memory. Furthermore, the connectivity 1321 may be configured to include an output device (a monitor, a speaker, or the like) of an image or an audio.

The camera 1322 is a module that has a function for acquiring image data of a subject by imaging the subject. The image data acquired by an imaging process performed by the camera 1322, for example, is supplied to the video processor 1332 and is coded.

The sensor 1323 is a module that has the function of an arbitrary sensor such as an audio sensor, an ultrasonic sensor, an optical sensor, an illuminance sensor, an infrared sensor, an image sensor, a rotation sensor, an angle sensor, an angular velocity sensor, a speed sensor, an acceleration sensor, a tilt sensor, a magnetic identification sensor, an impact sensor, or a temperature sensor. Data that is detected by the sensor 1323, for example, is supplied to the application processor 1331 and is used by the application and the like.

In the description presented above, each configuration described as a module may be realized by a processor, and each configuration described as a processor may be realized by a module.

As will be described later, the present technology may be applied to the video processor 1332 of the video set 1300 having the configuration as described above. Accordingly, the video set 1300 may be configured as the set to which the present technology is applied.

[Configuration Example of Video Processor]

Figure 27:
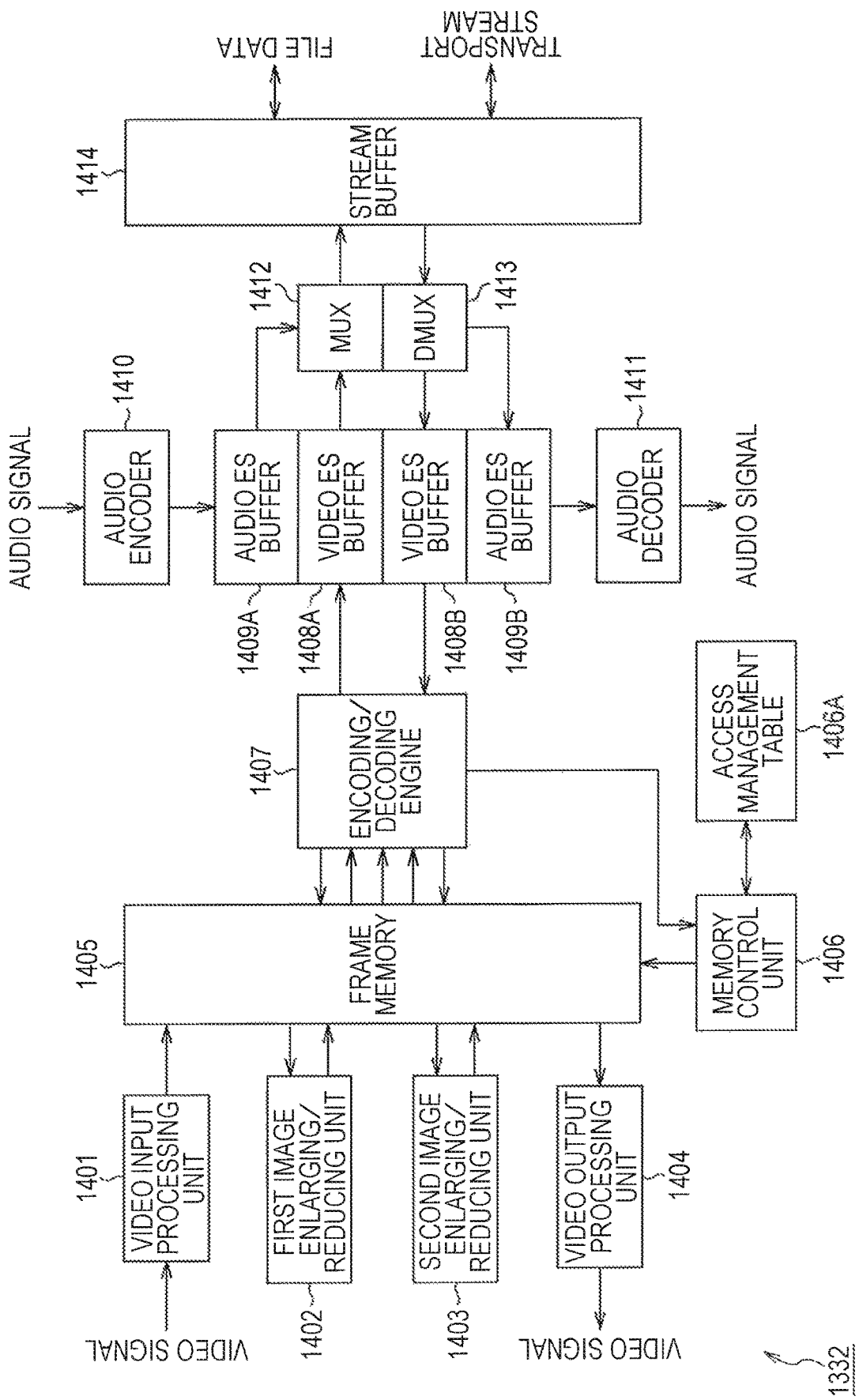
FIG. 27 is a block diagram that illustrates an example of the schematic configuration of a video processor.

FIG. 27 illustrates an example of the schematic configuration of the video processor 1332 (FIG. 26) to which the present technology is applied.

In the example illustrated in FIG. 27, the video processor 1332 has a function for receiving an input of a video signal and an audio signal and coding the received signals in accordance with a predetermined system and a function for decoding coded video data and coded audio data and reproducing and outputting a video signal and an audio signal.

As illustrated in FIG. 27, the video processor 1332 includes: a video input processing unit 1401; a first image enlargement/reduction unit 1402; a second image enlargement/reduction unit 1403; a video output processing unit 1404; a frame memory 1405; and a memory control unit 1406. In addition, the video processor 1332 includes: an encoding/decoding engine 1407; video elementary stream (ES) buffers 1408A and 1408B, and audio ES buffers 1409A and 1409B. In addition, the video processor 1332 includes: an audio encoder 1410; an audio decoder 1411; a multiplexer (MUX) 1412; a demultiplexer (DMUX) 1413; and a stream buffer 1414.

The video input processing unit 1401, for example, acquires a video signal input from the connectivity 1321 (FIG. 26) or the like and converts the acquired video signal into digital image data. The first image enlargement/reduction unit 1402 performs format conversion and an image enlargement/reduction process for the image data. The second image enlargement/reduction unit 1403, for the image data, performs an image enlargement/reduction process in accordance with a format of the output destination through the video output processing unit 1404 or performs format conversion, an image enlargement/reduction process, which are similar to those of the first image enlargement/reduction unit 1402, and the like. The video output processing unit 1404 performs format conversion, conversion into an analog signal, and the like for the image data and outputs a resultant signal, for example, to the connectivity 1321 (FIG. 26) or the like as a reproduced video signal.

The frame memory 1405 is a memory for image data that is shared by the video input processing unit 1401, the first image enlargement/reduction unit 1402, the second image enlargement/reduction unit 1403, the video output processing unit 1404, and the encoding/decoding engine 1407. The frame memory 1405 is realized as a semiconductor memory such as a DRAM.

The memory control unit 1406 receives a synchronization signal supplied from the encoding/decoding engine 1407 and controls an access to the frame memory 1405 for writing/reading in accordance with an access schedule for the frame memory 1405 that is written into an access management table 1406A. The access management table 1406A is updated by the memory control unit 1406 in accordance with the process that is performed by the encoding/decoding engine 1407, the first image enlargement/reduction unit 1402, the second image enlargement/reduction unit 1403, and the like.

The encoding/decoding engine 1407 performs an encoding process of image data and performs a decoding process of a video stream that is acquired by coding the image data. For example, the encoding/decoding engine 1407 codes the image data read from the frame memory 1405 and sequentially writes the read image data into the video ES buffer 1408A as a video stream. In addition, for example, the encoding/decoding engine 1407 sequentially reads the video stream from the video ES buffer 1408B, decodes the read video stream, and sequentially writes the decoded video stream into the frame memory 1405 as image data. The encoding/decoding engine 1407 uses the frame memory 1405 as a work area in such coding or decoding processes. In addition, the encoding/decoding engine 1407, for example, at the timing of starting the process of each macroblock, outputs a synchronization signal to the memory control unit 1406.

The video ES buffer 1408A buffers the video stream generated by the encoding/decoding engine 1407 and supplies the video stream to the multiplexer (MUX) 1412. The video ES buffer 1408B buffers the video stream supplied from the demultiplexer (DMUX) 1413 and supplies the video stream to the encoding/decoding engine 1407.

The audio ES buffer 1409A buffers the audio stream generated by the audio encoder 1410 and supplies the audio stream to the multiplexer (MUX) 1412. The audio ES buffer 1409B buffers the audio stream supplied from the demultiplexer (DMUX) 1413 and supplies the audio stream to the audio decoder 1411.

The audio encoder 1410 converts an audio signal, for example, input from the connectivity 1321 (FIG. 26) or the like, for example, into a digital signal and codes the converted audio signal in accordance with a predetermined system such as an MPEG audio system or an AudioCode number 3 (AC3) system. The audio encoder 1410 sequentially writes audio streams that are data acquired by coding the audio signals into the audio ES buffer 1409A. The audio decoder 1411 decodes the audio stream supplied from the audio ES buffer 1409B, performs conversion of the decoded audio stream, for example, into an analog signal and the like, and supplies the converted signal, for example, to the connectivity 1321 (FIG. 26) and the like as a reproduced audio signal.

The multiplexer (MUX) 1412 multiplexes the video stream and the audio stream. The multiplexing method (in other words, the format of a bitstream generated by the multiplexing) is arbitrary. In addition, at the time of multiplexing, the multiplexer (MUX) 1412 may add predetermined header information or the like to the bit stream. In other words, the multiplexer (MUX) 1412 can convert the format of the stream through the multiplexing process. For example, by multiplexing the video stream and the audio stream, the multiplexer (MUX) 1412 converts the video stream and the audio stream into a transport stream that is a bitstream having a format for transmission. In addition, for example, by multiplexing the video stream and the audio stream, the multiplexer (MUX) 1412 converts the video stream and the audio stream into data (file data) having a format for recording.

The demultiplexer (DMUX) 1413 demultiplexes the bit stream in which the video stream and the audio stream are multiplexed using a method corresponding to the multiplexing process performed by the multiplexer (MUX) 1412. In other words, the demultiplexer (DMUX) 1413 extracts a video stream and an audio stream from the bitstream read from the stream buffer 1414 (the video stream and the audio stream are separated). In other words, the demultiplexer (DMUX) 1413 can convert (inverse conversion of the conversion performed by the multiplexer (MUX) 1412) the format of the stream through the demultiplexing process. For example, the demultiplexer (DMUX) 1413 acquires the transport stream, for example, supplied from the connectivity 1321 (FIG. 26), the broadband modem 1333, or the like (FIG. 26) through the stream buffer 1414 and demultiplexes the acquired transport stream, thereby converting the transport stream into a video stream and an audio stream. In addition, for example, the demultiplexer (DMUX) 1413 acquires file data read from various recording media, for example, by the connectivity 1321 (FIG. 26) through the stream buffer 1414 and demultiplexes the acquired file data, thereby converting the file data into a video stream and an audio stream.

The stream buffer 1414 buffers the bitstream. For example, the stream buffer 1414 buffers the transport stream supplied from the multiplexer (MUX) 1412 and supplies the transport stream, for example, to the connectivity 1321 (FIG. 26), the broadband modem 1333 (FIG. 26), and the like at predetermined timing or based on a request transmitted from the outside.

In addition, for example, the stream buffer 1414 buffers the file data supplied from the multiplexer (MUX) 1412 and supplies the file data, for example, to the connectivity 1321 (FIG. 26) and the like at predetermined timing or based on a request transmitted from the outside so as to be recorded in any one of various recording media.

Furthermore, the stream buffer 1414 buffers the transport stream acquired, for example, through the connectivity 1321 (FIG. 26), the broadband modem 1333 (FIG. 26), or the like and supplies the transport stream to the demultiplexer (DMUX) 1413 at predetermined timing or based on a request from the outside, and the like.

In addition, the stream buffer 1414 buffers the file data read from various recording media, for example, by the connectivity 1321 (FIG. 26) or the like and supplies the file data to the demultiplexer (DMUX) 1413 at predetermined timing or based on a request from the outside or the like.

Next, an example of the operation of the video processor 1332 having such a configuration will be described. For example, a video signal input to the video processor 1332 from the connectivity 1321 (FIG. 26) or the like is converted into digital image data according to a predetermined system such as the 4:2:2Y/Cb/Cr system by the video input processing unit 1401 and is sequentially written into the frame memory 1405. This digital image data is read by the first image enlargement/reduction unit 1402 or the second image enlargement/reduction unit 1403, and a format conversion into a predetermined system such as the 4:2:0Y/Cb/Cr system or the like and the enlargement/reduction process is performed for the digital image data, and the processed digital image data is written again into the frame memory 1405. This image data is coded by the encoding/decoding engine 1407 and is written into the video ES buffer 1408A as a video stream.

In addition, the audio signal input from the connectivity 1321 (FIG. 26) or the like to the video processor 1332 is coded by the audio encoder 1410 and is written into the audio ES buffer 1409A as an audio stream.

The video stream stored in the video ES buffer 1408A and the audio stream stored in the audio ES buffer 1409A are read by the multiplexer (MUX) 1412, are multiplexed, and are converted into a transport stream, file data, or the like. The transport stream generated by the multiplexer (MUX) 1412 is buffered into the stream buffer 1414 and then is output to the external network, for example, through the connectivity 1321 (FIG. 26), the broadband modem 1333 (FIG. 26), or the like. In addition, the file data generated by the multiplexer (MUX) 1412 is buffered into the stream buffer 1414, then is output, for example, to the connectivity 1321 (FIG. 26) or the like, and is recorded in any one of various recording media.

In addition, the transport stream that is input from the external network to the video processor 1332, for example, through the connectivity 1321 (FIG. 26), the broadband modem 1333 (FIG. 26), or the like is buffered into the stream buffer 1414 and then is demultiplexed by the demultiplexer (DMUX) 1413. In addition, the file data that is read from any one of the various recording media, for example, by the connectivity 1321 (FIG. 26) or the like and is input to the video processor 1332 is buffered into the stream buffer 1414 and then is demultiplexed by the demultiplexer (DMUX) 1413. In other words, the transport stream or the file data input to the video processor 1332 is separated into a video stream and an audio stream by the demultiplexer (DMUX) 1413.

The audio stream is supplied to the audio decoder 1411 through the audio ES buffer 1409B and is decoded, and the audio signal is reproduced. In addition, the video stream is written into the video ES buffer 1408B, then is sequentially read by the encoding/decoding engine 1407, is decoded, and is written into the frame memory 1405. The decoded image data is processed to be enlarged or reduced by the second image enlargement/reduction unit 1403 and is written into the frame memory 1405. Then, the decoded image data is read by the video output processing unit 1404, has the format converted into a predetermined system such as the 4:2:2Y/Cb/Cr system, and is further converted into an analog signal, and the video signal is reproduced and output.

In a case where the present technology is applied to the video processor 1332 configured as such, the present technology according to each embodiment described above may be applied to the encoding/decoding engine 1407. In other words, for example, an encoding/decoding engine 1407 may be configured to have the functions of the image encoding device 100 (FIG. 1) according to the first embodiment and the image decoding device 200 (FIG. 14) according to the second embodiment. In addition, for example, the encoding/decoding engine 1407 may be configured to have the functions of the image encoding device 300 (FIG. 19) and the image decoding device 350 (FIG. 20) according to the third embodiment. Furthermore, for example, the encoding/decoding engine 1407 may be configured to have the functions of the image encoding device 200 (FIG. 14) and the image decoding device 350 (FIG. 20) according to the second embodiment. By configuring as such, the video processor 1332 can acquire the same advantages as the advantages described above with reference to FIGS. 1 to 18.

In addition, in the encoding/decoding engine 1407, the present technology (in other words, the functions of the image encoding device and the image decoding device according to each embodiment described above) may be realized by hardware such as logic circuits, may be realized by software such as a built-in program, or may be realized by both the hardware and the software.

[Another Configuration Example of Video Processor]

Figure 28:
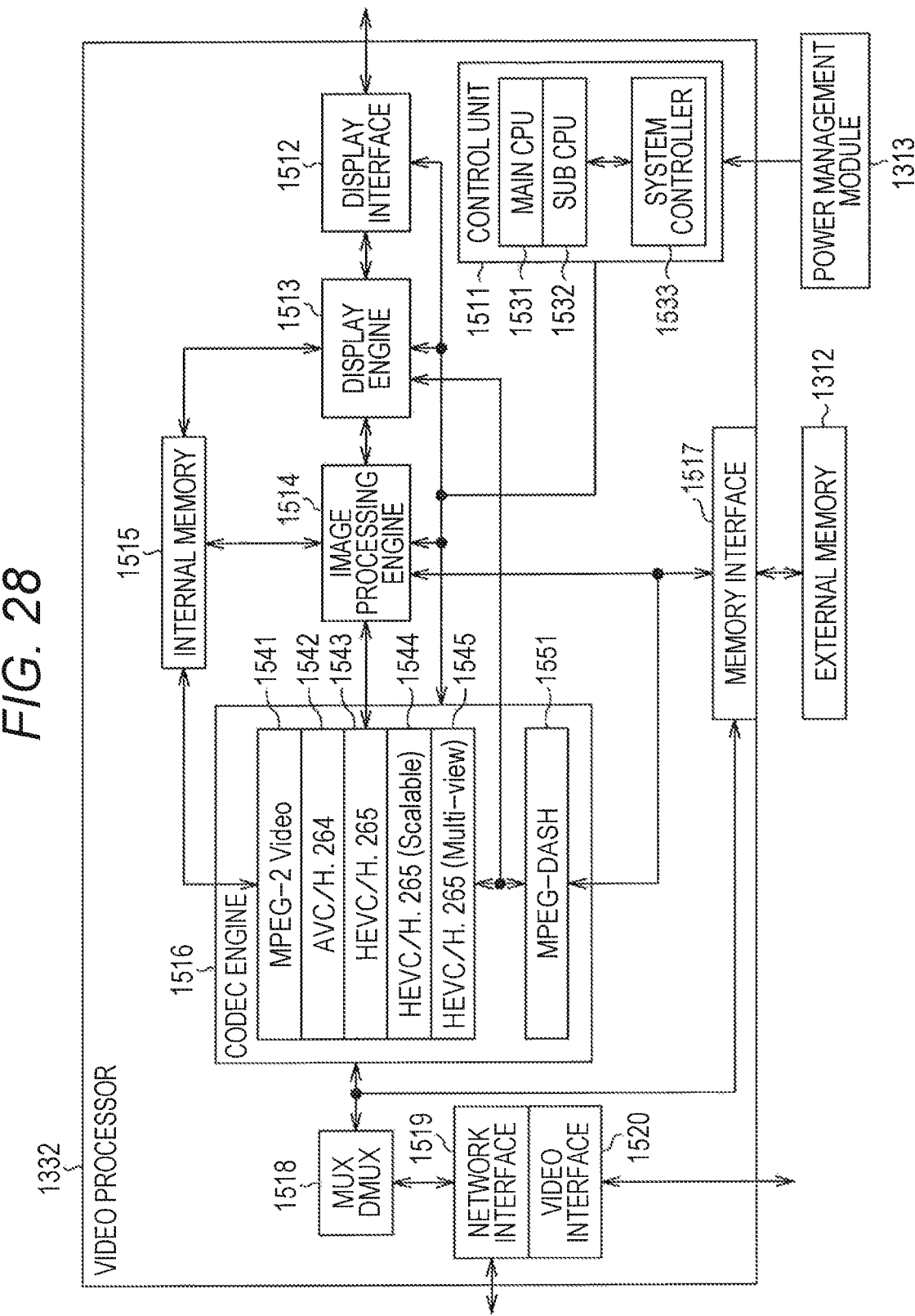
FIG. 28 is a block diagram that illustrates another example of the schematic configuration of the video processor.

FIG. 28 is a diagram that illustrates another example of the schematic configuration of the video processor 1332 (FIG. 26) to which the present technology is applied. In the case of the example illustrated in FIG. 28, the video processor 1332 has a function for coding/decoding the video data in accordance with a predetermined system.

More specifically, as illustrated in FIG. 28, the video processor 1332 includes: a control unit 1511; a display interface 1512; a display engine 1513; an image processing engine 1514; and an internal memory 1515. In addition, the video processor 1332 includes: a codec engine 1516; a memory interface 1517; a multiplexer/demultiplexer (MUX DMUX) 1518; a network interface 1519; and a video interface 1520.

The control unit 1511 controls the operations of processing units arranged within the video processor 1332 such as the display interface 1512, the display engine 1513, the image processing engine 1514, and the codec engine 1516.

As illustrated in FIG. 28, the control unit 1511, for example, includes a main CPU 1531, a sub CPU 1532, and a system controller 1533. The main CPU 1531 executes a program that is used for controlling the operation of each processing unit disposed within the video processor 1332. The main CPU 1531 generates a control signal in accordance with the program or the like and supplies the control signal to each processing unit (in other words, controls the operation of each processing unit). The sub CPU 1532 achieves an auxiliary role for the main CPU 1531. For example, the sub CPU 1532 executes a child process, a sub routine, and the like of the program or the like executed by the main CPU 1531. The system controller 1533 controls the operations of the main CPU 1531 and the sub CPU 1532 such as designation of programs to be executed by the main CPU 1531 and the sub CPU 1532.

The display interface 1512 outputs the image data, for example, to the connectivity 1321 (FIG. 26) or the like under the control of the control unit 1511. For example, the display interface 1512 converts the image data that is digital data into an analog signal and outputs the image data to the monitoring device or the like of the connectivity 1321 (FIG. 26) as a reproduced video signal or the image data that is the digital data.

The display engine 1513, under the control of the control unit 1511, performs various conversion processes such as a format conversion, a size conversion, and a color gamut conversion for the image data so as to be adjusted to the hardware specifications of the monitoring device displaying the image or the like.

The image processing engine 1514, under the control of the control unit 1511, performs predetermined image processing such as a filter process for improving the image quality or the like for the image data.

The internal memory 1515 is a memory disposed inside the video processor 1332 that is shared by the display engine 1513, the image processing engine 1514, and the codec engine 1516. The internal memory 1515, for example, is used for data interchange performed among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as is necessary (for example, in accordance with a request). While this internal memory 1515 may be realized by any storage device, generally, the internal memory 1515 is frequently used for storing data having a small capacity such as image data configured in units of blocks or parameters, and accordingly, it is preferably realized by a semiconductor memory having a relatively small capacity (for example, compared to the external memory 1312) and a high response speed such as a SRAM (Static Random Access Memory).

The codec engine 1516 performs the process relating to coding or decoding image data. The coding/decoding system to which the codec engine 1516 corresponds is arbitrary, and the number thereof may be one or two or more. For example, the codec engine 1516 may include a codec function of a plurality of coding/decoding systems and perform the coding of image data or the decoding of coded data by using selected one of the plurality of coding/decoding systems.

In the example illustrated in FIG. 28, the codec engine 1516, for example, includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as functional blocks of the process relating to the codec.

The MPEG-2 Video 1541 is a functional block used for coding or decoding image data in accordance with the MPEG-2 system. The AVC/H.264 1542 is a functional block used for coding or decoding image data in accordance with the AVC system. In addition, the HEVC/H.265 1543 is a functional block used for coding or decoding image data in accordance with the HEVC system. The HEVC/H.265 (Scalable) 1544 is a functional block used for scalable coding or scalable decoding image data in accordance with the HEVC system. The HEVC/H.265 (Multi-view) 1545 is a functional block used for multiple viewpoint coding or multiple viewpoint decoding image data in accordance with the HEVC system.

The MPEG-DASH1551 is a functional block used for transmitting/receiving image data in accordance with an MPEG-dynamic adaptive streaming over HTTP (MPEG-DASH) system. The MPEG-DASH is a technology for streaming a video by using a HyperText transfer protocol (HTTP) and has a feature that one is selected from among a plurality of pieces of coded data having mutually-different resolutions and the like, which are prepared in advance, in units of segments and is transmitted. The MPEG-DASH 1551 performs generation of a stream, transmission control of the stream, and the like that are compliant with the specification, and, for coding/decoding image data, uses MPEG-2 Video 1541 or HEVC/H.265 (Multi-view) 1545 described above.

The memory interface 1517 is an interface used for the external memory 1312. Data supplied from the image processing engine 1514 or the codec engine 1516 is supplied to the external memory 1312 through the memory interface 1517. In addition, the data read from the external memory 1312 is supplied to the video processor 1332 (the image processing engine 1514 or the codec engine 1516) through the memory interface 1517.

The multiplexer/demultiplexer (MUX DMUX) 1518 multiplexes or demultiplexes various kinds of data relating to an image such as a bitstream of coded data, image data, or a video signal. The multiplexing/demultiplexing method is arbitrary. For example, at the time of the multiplexing process, the multiplexer/demultiplexer (MUX DMUX) 1518 may not only arrange a plurality of pieces of data into one but also add predetermined header information or the like to the data. In addition, at the time of the demultiplexing process, the multiplexer/demultiplexer (MUX DMUX) 1518 may not only divide one piece of data into a plurality of parts but add predetermined header information or the like to the divided data. In other words, the multiplexer/demultiplexer (MUX DMUX) 1518 can convert the format of data through a multiplexing/demultiplexing process. For example, the multiplexer/demultiplexer (MUX DMUX) 1518 can convert the bitstream into a transport stream that is a bitstream in the format for transmission or data (file data) that is in the file format for recording by multiplexing the bitstream. It is apparent that the inverse conversion can be performed through a demultiplexing process.

The network interface 1519 is a dedicated interface such as the broadband modem 1333 (FIG. 26) or the connectivity 1321 (FIG. 26). The video interface 1520 is a dedicated interface such as the connectivity 1321 (FIG. 26) or the camera 1322 (FIG. 26).

Next, an example of the operation of such a video processor 1332 will be described. For example, when a transport stream is received from the external network, for example, through the connectivity 1321 (FIG. 26), the broadband modem 1333 (FIG. 26), or the like, the transport stream is supplied to the multiplexer/demultiplexer (MUX DMUX) 1518 through the network interface 1519, is demultiplexed, and is decoded by the codec engine 1516. For the image data acquired by the decoding process performed by the codec engine 1516, for example, predetermined image processing is performed by the image processing engine 1514, and predetermined conversion is performed by the display engine 1513, the resultant image data is supplied, for example, to the connectivity 1321 (FIG. 26) or the like through the display interface 1512, and the image is displayed on the monitor. In addition, for example, the image data acquired by the decoding process performed by the codec engine 1516 is re-coded by the codec engine 1516, is multiplexed by the multiplexer/demultiplexer (MUX DMUX) 1518, is converted into file data, is output, for example, to the connectivity 1321 (FIG. 26) or the like through the video interface 1520, and is recorded on any one of the various recording media.

In addition, for example, file data of coded data that is acquired by coding the image data read from a recording medium not illustrated in the figure by the connectivity 1321 (FIG. 26) or the like is supplied to the multiplexer/demultiplexer (MUX DMUX) 1518 through the video interface 1520, is demultiplexed, and is decoded by the codec engine 1516. For the image data acquired by the decoding process performed by the codec engine 1516, predetermined image processing is performed by the image processing engine 1514, and a predetermined conversion is performed by the display engine 1513, and the resultant image data is supplied, for example, to the connectivity 1321 (FIG. 26) or the like through the display interface 1512, and the image is displayed on the monitor. Furthermore, for example, the image data acquired by the decoding process performed by the codec engine 1516 is re-coded by the codec engine 1516, is multiplexed by the multiplexer/demultiplexer (MUX DMUX) 1518, is converted into a transport stream, is supplied, for example, to the connectivity 1321 (FIG. 26), the broadband modem 1333 (FIG. 26), or the like through the network interface 1519, and is transmitted to another device not illustrated in the figure.

In addition, the interchange of image data or other data between processing units disposed within the video processor 1332, for example, is performed using the internal memory 1515 or the external memory 1312. In addition, the power management module 1313, for example, controls the supply of power to the control unit 1511.

In a case where the present technology is applied to the video processor 1332 configured as such, the present technology according to each embodiment described above may be applied to the codec engine 1516. In other words, for example, the codec engine 1516 may be configured to include the functional blocks realizing the image encoding device 100 (FIG. 1) according to the first embodiment and the image decoding device 200 (FIG. 14) according to the second embodiment. In addition, for example, the codec engine 1516 may be configured to include the functional blocs realizing the image encoding device 300 (FIG. 19) and the image decoding device 350 (FIG. 20) according to the third embodiment. By configuring as such, the video processor 1332 can acquire the same advantages as the advantages described above with reference to FIGS. 1 to 18.

In addition, in the codec engine 1516, the present technology (in other words, the functions of the image encoding device and the image decoding device according to each embodiment described above) may be realized by hardware such as logic circuits, may be realized by software such as a built-in program, or may be realized by both the hardware and the software.

As above, while two configurations of the video processor 1332 have been described as examples, the configuration of the video processor 1332 is arbitrary and may be a configuration other than the two configurations described above. In addition, this video processor 1332 may be configured by either one semiconductor chip or a plurality of semiconductor chips. For example, the video processor 1332 may be configured by a three-dimensional laminated LSI in which a plurality of semiconductors are laminated. In addition, the video processor 1332 may be realized by a plurality of LSI's.

[Example of Application to Device]

The video set 1300 may be built in various devices that process image data. For example, the video set 1300 may be built in the television apparatus 900 (FIG. 22), the mobile phone 920 (FIG. 23), the recording/reproducing apparatus 940 (FIG. 24), the imaging apparatus 960 (FIG. 25), and the like. By building the video set 1300 therein, the devices can acquire advantages that are the same as the advantages described above with reference to FIGS. 1 to 18.

In addition, some of the configurations of the video set 1300 described above may be configurations to which the present technology is applied in a case where the video processor 1332 is included therein. For example, only the video processor 1332 may be configured as a video processor to which the present technology is applied. In addition, for example, as described above, the processor, the video module 1311, and the like denoted by the dotted line 1341 may be configured as a processor, a module, and the like to which the present technology is applied. Furthermore, for example, the video module 1311, the external memory 1312, the power management module 1313, and the front end module 1314 may be combined so as to be configured as a video unit 1361 to which the present technology is applied. In any of the configurations, the same advantages as those described above with reference to FIGS. 1 to 18 can be acquired.

In other words, any configuration that includes the video processor 1332, similar to the case of the video set 1300, may be built in various devices that process image data. For example, the video processor 1332, the processor denoted by the dotted line 1341, the video module 1311, or the video unit 1361 may be built in the television apparatus 900 (FIG. 22), the mobile phone 920 (FIG. 23), the recording/reproducing apparatus 940 (FIG. 24), the imaging apparatus 960 (FIG. 25), and the like. By building any configuration to which the present technology is applied therein, similar to the case of the video set 1300, the devices can acquire the same advantages as those described above with reference to FIGS. 1 to 18.

In this specification, an example has been described in which various kinds of information such as the reference list selection flag is multiplexed in a coded stream and is transmitted from the coding side to the decoding side. However, a technique for transmitting such information is not limited to such a technique. For example, such information may be transmitted or recorded as individual data associated with a coded bit stream without being multiplexed in the coded stream. Here, the term "associated" represents that an image (it may be a part of an image such as a slice, block, or the like) included in a bit stream and information corresponding to the image may be linked to each other at the time of decoding the image and the information. In other words, the information may be transmitted in a transmission line other than that of the image (or the bit stream). In addition, the information may be recorded on a recoding medium other than that for the image (or the bit stream) (or a different recording area of the same recording medium). Furthermore, the information and the image (or the bit stream), for example, may be associated with each other in units of arbitrary parts such as multiple frames, one frame, or a part of the frame.

While preferred embodiments of the present disclosure have been described in detail with reference to the accompanying drawings, the technical scope of the present disclosure is not limited to such examples. It is apparent that a person having ordinary knowledge in the technical field of the present disclosure can devise various changes or modifications within the scope of the technical idea described in the claims, and, naturally, it is understood that such changes and modifications belong to the technical scope of the present disclosure.

In addition, the present technology may employ a configuration described as below.

(1) An image processing device including:

a decoding unit that generates an image by decoding a bit stream;

a reference list setting unit that sets a reference list being referred to when the image generated by the decoding unit is predicted by inserting a reference image that can be referred to in a layer direction between a plurality of reference images that can be referred to in a time direction; and a prediction unit that predicts the image generated by the decoding unit by referring to the reference list set by the reference list setting unit.

(2) The image processing device according to (1), wherein the reference list setting unit sets the reference list by inserting the reference image that can be referred to in the layer direction between a reference image located before the image in time and a reference image located after the image in time among the plurality of reference images that can be referred to in the time direction.

(3) The image processing device according to (2), wherein the reference list setting unit sets the reference list by arranging images in a direction L0 in order of reference images located before the image in time, the reference image that can be referred to in the layer direction, and reference images located after the image in time.

(4) The image processing device according to (2), wherein the reference list setting unit sets the reference list by arranging images in a direction L1 in order of reference images located after the image in time, the reference image that can be referred to in the layer direction, and reference images located before the image in time.

(5) The image processing device according to (1), wherein the reference list setting unit sets the reference list by alternately arranging the reference image that can be referred to in the time direction and the reference image that can be referred to in the layer direction.

(6) The image processing device according to (5), wherein the reference list setting unit sets the reference list by alternately arranging an element of a list of the reference images that can be referred to in the time direction set in order of the reference images located before the image in time and the reference images located after the image in time and an element of a list of the reference images that can be referred to in the layer direction, which is configured by the reference images that can be referred to in the layer direction, in a direction L0.

(7) The image processing device according to (5), wherein the reference list setting unit sets the reference list by alternately arranging an element of a list of the reference images that can be referred to in the time direction set in order of the reference images located after the image in time and the reference images located before the image in time and an element of a list of the reference images that can be referred to in the layer direction, which is configured by the reference images that can be referred to in the layer direction, in a direction L1.

(8) The image processing device according to any of (1) to (7), wherein the reference list setting unit sets the reference list by inserting the reference images that can be referred to in the layer direction in a direction L1 with order of the reference image that can be referred to in the layer direction being opposite to that of the case of a direction L0.

(9) The image processing device according to any of (1) to (8), wherein the reference list setting unit includes:
a temporal list setting unit that sets a temporal list that is a temporary list used for setting the reference list by inserting the reference image that can be referred to in the layer direction between the plurality of reference images that can be referred to in the time direction; and
a reference image list setting unit that sets the reference list based on the temporal list set by the temporal list setting unit.

(10) An image processing method implemented in an image processing device, the image processing method including:
generating an image by decoding a bit stream;
setting a reference list being referred to when the generated image is predicted by inserting a reference image that can be referred to in a layer direction between a plurality of reference images that can be referred to in a time direction; and
predicting the generated image by referring to the set reference list.

(11) An image processing device including:
a reference list setting unit that sets a reference list being referred to when an image is predicted by inserting a reference image that can be referred to in a layer direction between a plurality of reference images that can be referred to in a time direction;
a prediction unit that predicts the image by referring to the reference list set by the reference list setting unit; and
an encoding unit that generates a bit stream by performing coding using the image predicted by the prediction unit.

(12) The image processing device according to (11), wherein the reference list setting unit sets the reference list by inserting the reference image that can be referred to in the layer direction between a reference image located before the image in time and a reference image located after the image in time among the plurality of reference images that can be referred to in the time direction.

(13) The image processing device according to (12), wherein the reference list setting unit sets the reference list by arranging images in a direction L0 in order of reference images located before the image in time, the reference image that can be referred to in the layer direction, and reference images located after the image in time.

(14) The image processing device according to (12), wherein the reference list setting unit sets the reference list by arranging images in a direction L1 in order of reference images located after the image in time, the reference image that can be referred to in the layer direction, and reference images located before the image in time.

(15) The image processing device according to (11), wherein the reference list setting unit sets the reference list by alternately arranging the reference image that can be referred to in the time direction and the reference image that can be referred to in the layer direction.

(16) The image processing device according to (15), wherein the reference list setting unit sets the reference list by alternately arranging an element of a list of the reference images that can be referred to in the time direction set in order of the reference images located before the image in time and the reference images located after the image in time and an element of a list of the reference images that can be referred to in the layer direction, which is configured by the reference images that can be referred to in the layer direction, in a direction L0.

(17) The image processing device according to (15), wherein the reference list setting unit sets the reference list by alternately arranging an element of a list of the reference images that can be referred to in the time direction set in order of the reference images located after the image in time and the reference images located before the image in time and an element of a list of the reference images that can be referred to in the layer direction, which is configured by the reference images that can be referred to in the layer direction, in a direction L1.

(18) The image processing device according to any of (11) to (17), wherein the reference list setting unit sets the reference list by inserting the reference images that can be referred to in the layer direction in a direction L1 with order of the reference image that can be referred to in the layer direction being opposite to that of the case of a direction L0.

(19) The image processing device according to any of (11) to (18), wherein the reference list setting unit includes:
a temporal list setting unit that sets a temporal list that is a temporary list used for setting the reference list by inserting the reference image that can be referred to in the layer direction between the plurality of reference images that can be referred to in the time direction; and
a reference image list setting unit that sets the reference list based on the temporal list set by the temporal list setting unit.

(20) An image processing method implemented in an image processing device, the image processing method including:
setting a reference list being referred to when an image is predicted by inserting a reference image that can be referred to in a layer direction between a plurality of reference images that can be referred to in a time direction;
predicting the image by referring to the set reference list; and
generating a bit stream by performing coding using the predicted image.

REFERENCE SIGNS LIST

100 Image encoding device
106 Lossless encoding unit
115 Motion parallax prediction/compensation unit
121 Syntax processing unit
122 Reference list generating unit
131 Reference image setting unit
132 Temporal list generating unit
133 Reference image list generating unit
200 Image decoding device
202 Lossless decoding unit
212 Motion parallax prediction/compensation unit
221 Syntax processing unit
222 Reference list generating unit
231 Reference image setting unit
232 Temporal list generating unit
233 Reference image list generating unit
300 Image encoding device
350 Image decoding device

The invention claimed is:
1. An image processing device comprising:
circuitry configured to:
generate an image by decoding a bit stream;
set a reference list being referred to when the generated image is predicted, wherein the reference list is set by extracting, from a temporal list that is a temporary list used for setting the reference list, a sequence of images starting from a first image positioned at a start of the temporal list and through an $n^{th}$ image of the temporal list, the temporal list having been set by inserting a plurality of sequential inter-view reference images that are referred to in a layer direction between a plurality of reference images that are referred to in a time direction; and predict the generated image by referring to the set reference list, wherein the reference list is set and utilized without reliance on any received syntax element having insertion position information associated with the insertion of the plurality of sequential inter-view reference images that are referred to in the layer direction, wherein the temporal list is set by inserting the plurality of sequential inter-view reference images that are referred to in the layer direction directly between a reference image located before the image in time and a reference image located after the image in time among the plurality of reference images that are referred to in the time direction, and wherein the plurality of sequential inter-view reference images are inserted so as to be both directly adjacent to the reference image located before the image in time and directly adjacent to the reference image located after the image in time.

2. The image processing device according to claim 1, wherein the temporal list is set by arranging images in a forward direction in order of reference images located before the image in time, the plurality of sequential inter-view reference images that are referred to in the layer direction, and reference images located after the image in time.

3. The image processing device according to claim 1, wherein the temporal list is set by arranging images in a reverse direction in order of reference images located after the image in time, the plurality of sequential inter-view reference images that are referred to in the layer direction, and reference images located before the image in time.

4. The image processing device according to claim 1, wherein the temporal list is set by alternately arranging the reference image that is referred to in the time direction and the plurality of sequential inter-view reference images that are referred to in the layer direction.

5. The image processing device according to claim 4, wherein the temporal list is set by alternately arranging an element of a list of the reference images that are referred to in the time direction set in order of the reference images located before the image in time and the reference images located after the image in time and an element of a list of the plurality of sequential inter-view reference images that are referred to in the layer direction, which is configured by the plurality of sequential inter-view reference images that are referred to in the layer direction, in a forward direction.

6. The image processing device according to claim 4, wherein the temporal list is set by alternately arranging an element of a list of the reference images that are referred to in the time direction set in order of the reference images located after the image in time and the reference images located before the image in time and an element of a list of the plurality of sequential inter-view reference images that are referred to in the layer direction, which is configured by the plurality of sequential inter-view reference images that are referred to in the layer direction, in a reverse direction.

7. The image processing device according to claim 1, wherein the temporal list is set by inserting the plurality of sequential inter-view reference images that are referred to in the layer direction in a reverse direction with order of the plurality of sequential inter-view reference images that is referred to in the layer direction being opposite to that of the case of a forward direction.

8. An image processing method implemented in an image processing device, the image processing method comprising:

generating an image by decoding a bit stream;

setting a reference list being referred to when the generated image is predicted, wherein the reference list is set by extracting, from a temporal list that is a temporary list used for setting the reference list, a sequence of images starting from a first image positioned at a start of the temporal list and through an $n^{th}$ image of the temporal list, the temporal list having been set by inserting a plurality of sequential inter-view reference images that are referred to in a layer direction between a plurality of reference images that are referred to in a time direction; and predicting the generated image by referring to the set reference list, wherein the reference list is set and utilized without reliance on any received syntax element having insertion position information associated with the insertion of the plurality of sequential inter-view reference images that are referred to in the layer direction, wherein the temporal list is set by inserting the plurality of sequential inter-view reference images that are referred to in the layer direction directly between a reference image located before the image in time and a reference image located after the image in time among the plurality of reference images that are referred to in the time direction, and wherein the plurality of sequential inter-view reference images are inserted so as to be both directly adjacent to the reference image located before the image in time and directly adjacent to the reference image located after the image in time.

9. An image processing device comprising:
circuitry configured to:
   set a reference list being referred to when an image is predicted, wherein the reference list is set by extracting, from a temporal list that is a temporary list used for setting the reference list, a sequence of images starting from a first image positioned at a start of the temporal list and through an $n^{th}$ image of the temporal list, the temporal list having been set by inserting a plurality of sequential inter-view reference images that are referred to in a layer direction between a plurality of reference images that are referred to in a time direction;

predict the image by referring to the set reference list; and generate a bit stream by performing coding using the predicted image, wherein the reference list is set and utilized without reliance on any received syntax element having insertion position information associated with the insertion of the plurality of sequential inter-view reference images that are referred to in the layer direction, wherein the temporal list is set by inserting the plurality of sequential inter-view reference images that are referred to in the layer direction directly between a reference image located before the image in time and a reference image located after the image in time among the plurality of reference images that are referred to in the time direction, and wherein the plurality of sequential inter-view reference images are inserted so as to be both directly adjacent to the reference image located before the image in time and directly adjacent to the reference image located after the image in time.

10. The image processing device according to claim 9, wherein the temporal list is set by arranging images in a forward direction in order of reference images located before the image in time, the plurality of sequential inter-view reference images that are referred to in the layer direction, and reference images located after the image in time.

11. The image processing device according to claim 9, wherein the temporal list is set by arranging images in a reverse direction in order of reference images located after the image in time, the plurality of sequential inter-view reference images that are referred to in the layer direction, and reference images located before the image in time.

12. The image processing device according to claim 9, wherein the temporal list is set by alternately arranging the reference image that is referred to in the time direction and the plurality of sequential inter-view reference images that are referred to in the layer direction.

13. The image processing device according to claim 12, wherein the temporal list is set by alternately arranging an element of a list of the reference images that are referred to in the time direction set in order of the reference images located before the image in time and the reference images located after the image in time and an element of a list of the plurality of sequential inter-view reference images that are referred to in the layer direction, which is configured by the plurality of sequential inter-view reference images that are referred to in the layer direction, in a forward direction.

14. The image processing device according to claim 12, wherein the temporal list is set by alternately arranging an element of a list of the reference images that are referred to in the time direction set in order of the reference images located after the image in time and the reference images located before the image in time and an element of a list of the plurality of sequential inter-view reference images that are referred to in the layer direction, which is configured by the plurality of sequential inter-view reference images that are referred to in the layer direction, in a reverse direction.

15. The image processing device according to claim 9, wherein the temporal list is set by inserting the plurality of sequential inter-view reference images that are referred to in the layer direction in a reverse direction with order of the plurality of sequential inter-view reference images that are referred to in the layer direction being opposite to that of the case of a forward direction.

16. An image processing method implemented in an image processing device, the image processing method comprising:

setting a reference list being referred to when an image is predicted, wherein the reference list is set by extracting, from a temporal list that is a temporary list used for setting the reference list, a sequence of images starting from a first image positioned at a start of the temporal list and through an $n^{th}$ image of the temporal list, the temporal list having been set by inserting a plurality of sequential inter-view reference images that are referred to in a layer direction between a plurality of reference images that are referred to in a time direction;

predicting the image by referring to the set reference list; and generating a bit stream by performing coding using the predicted image, wherein the reference list is set and utilized without reliance on any received syntax element having insertion position information associated with the insertion of the plurality of sequential inter-view reference images that are referred to in the layer direction, wherein the temporal list is set by inserting the plurality of sequential inter-view reference images that are referred to in the layer direction directly between a reference image located before the image in time and a reference image located after the image in time among the plurality of reference images that are referred to in the time direction, and wherein the plurality of sequential inter-view reference images are inserted so as to be both directly adjacent to the reference image located before the image in time and directly adjacent to the reference image located after the image in time.

17. The image processing device according to claim 1, wherein the reference list is set as a default process that is performed by the image processing device without reliance on insertion position information transmitted by another device.

18. The image processing device according to claim 1, wherein the plurality of sequential inter-view reference images are inserted, as a default process that is performed by the image processing device without reliance on insertion position information transmitted by another device, so that an inter-view reference image that is positioned on one end of the sequential inter-view reference images is directly adjacent to the reference image located before the image in time, and an inter-view reference image that is positioned on another end of the sequential inter-view reference images opposite to the one end is directly adjacent to the reference image located after the image in time.

* * * * *